United States Patent [19]

Iwasa et al.

[11] Patent Number: 5,241,641
[45] Date of Patent: Aug. 31, 1993

[54] HIERARCHICAL CACHE MEMORY APPARATUS

[75] Inventors: Shigeaki Iwasa, Kawasaki; Satoru Hashimoto, Tokyo; Shigehiro Asano, Yokohama, all of Japan

[73] Assignee: Kabushiki Kaisha Toshiba, Kawasaki, Japan

[21] Appl. No.: 501,256

[22] Filed: Mar. 28, 1990

[30] Foreign Application Priority Data

Mar. 28, 1989 [JP] Japan .................................. 1-73876

[51] Int. Cl.[5] ...................... G06F 12/00; G06F 12/08; G06F 13/00
[52] U.S. Cl. ............................ 395/425; 364/DIG. 1; 364/964.343; 364/243.41
[58] Field of Search ................. 395/425; 364/DIG. 1, 364/243, 243.41, 243.43, 964, 964.34, 964.343, 243.45

[56] References Cited

U.S. PATENT DOCUMENTS 4,755,930 7/1988 Wilson, Jr. et al. ................ 364/200
4,928,225 5/1990 McCarthy et al. ................. 364/200

OTHER PUBLICATIONS

"Using Cache Memory to Reduce Processor-Memory Traffic", by James Goodman, Sigarch Newsletter vol. 11, No. 3, Jun. 13–17, 1983.
"Cache Memories", by Jay Smith, Computing Surveys vol. 14, No. 3, Sep. 1982.
Cache Coherence Protocols: Evaluation Using a Multiprocesser Simulation Method, Archibald et al. ACM Transactions vol. 4, No. 4, Nov. 1986, pp 273–298.
Gaetano Borriello et al., Report No. UCB/CSD 84/199 Sep. 1984, pp. 1–89, "Design and Implementation of an Integrated Snooping Data Cache".
Wilson, Jr., 14th I.S.C.A., vol. 15, No. 2, Jun. 1987, pp. 244–252 "Hierarchical Cache/Bus Architecture for Shared Memory Multiprocessors".

Primary Examiner—Alyssa H. Bowler
Attorney, Agent, or Firm—Oblon, Spivak, McClelland, Maier & Neustadt

[57] ABSTRACT

A hierarchical cache memory apparatus assembled in a multiprocessor computer system including a plurality of processors and a memory device, includes a plurality of first cache memory devices arranged in correspondence with the plurality of processors and each including a controller including a first status identification section for identifying status of each of a plurality of pieces of address information, a plurality of first connection devices for connecting the plurality of first cache memory devices in units of a predetermined number of devices to constitute a plurality of mini-cluster devices a plurality of second cache memory devices respectively connected to the first connection devices in correspondence with the plurality of mini-cluster devices, having all the addresses of address information of the plurality of first cache memory devices in the mini-cluster devices, and each comprising a controller including a second status identification section for identifying status of each of the plurality of address information, and a memory device connected to the second connection devices and having all the addresses of the plurality of address information of the plurality of second cache memory devices.

23 Claims, 26 Drawing Sheets

CACHE ENTRY RECORD FORMAT

| TAG SECTION | | | DATA SECTION |
|---|---|---|---|
| STATUS INFO. | ADDRESS INFO. | REPLACING INFO. | DATA |

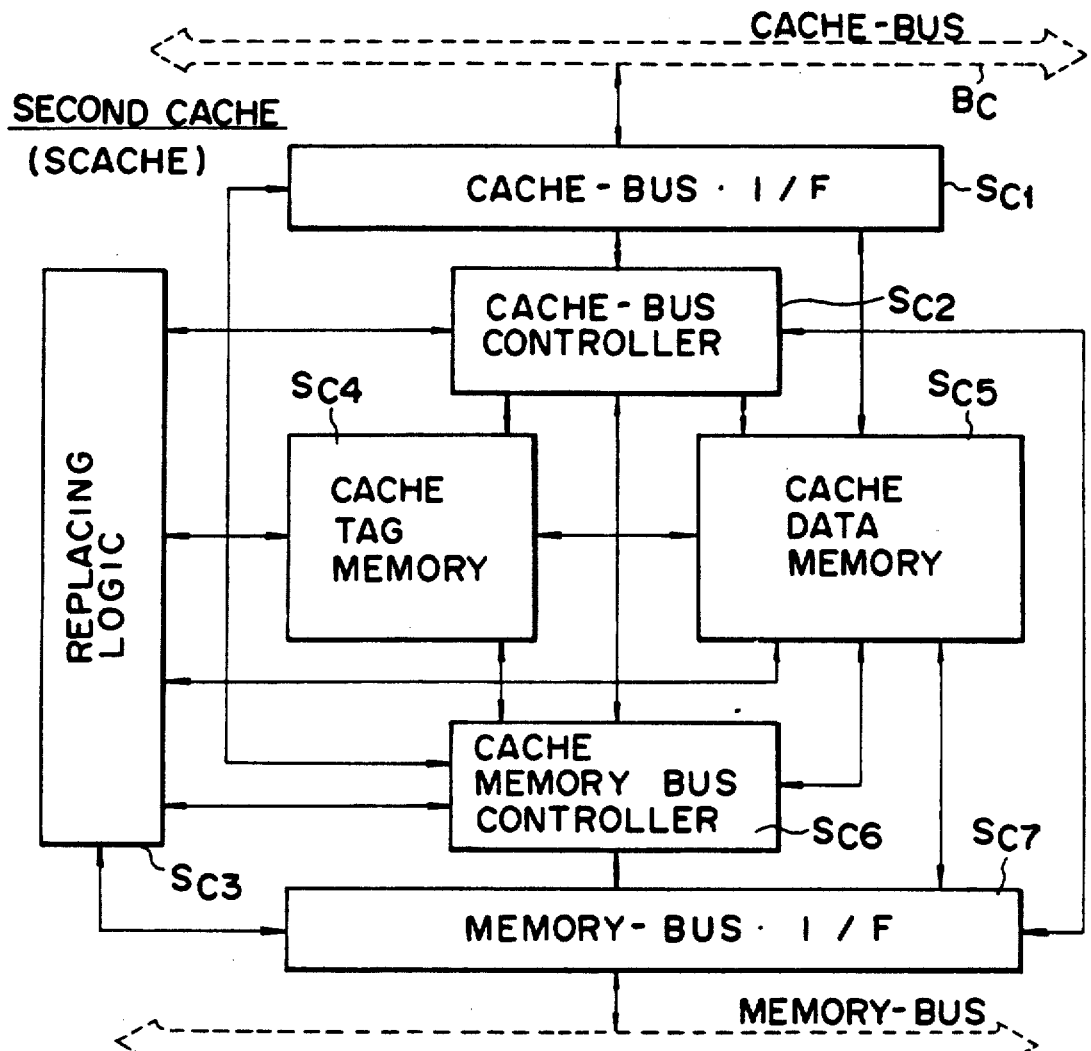
F I G. 5
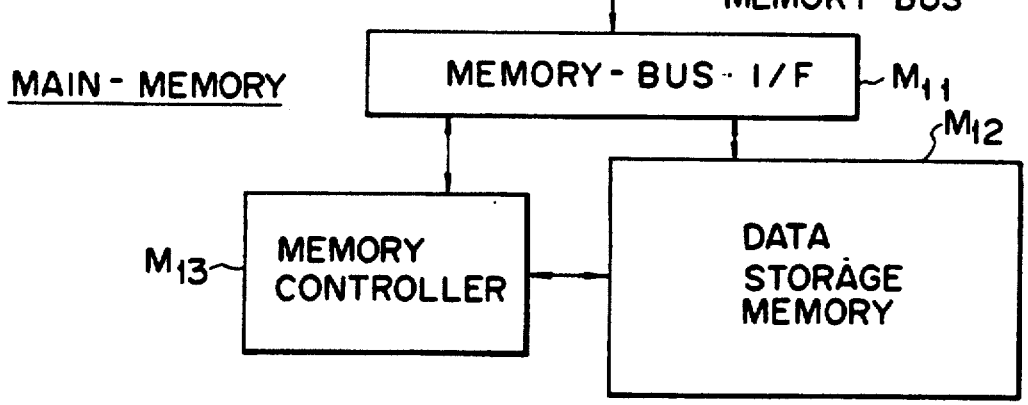
F I G. 6

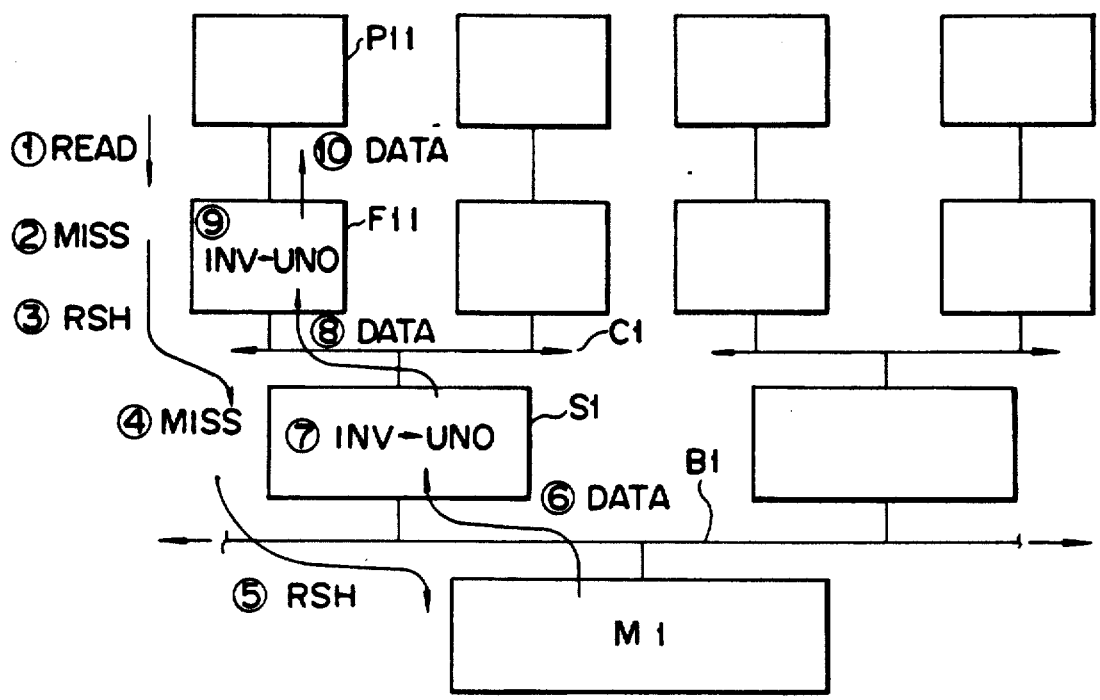
F I G. 7A
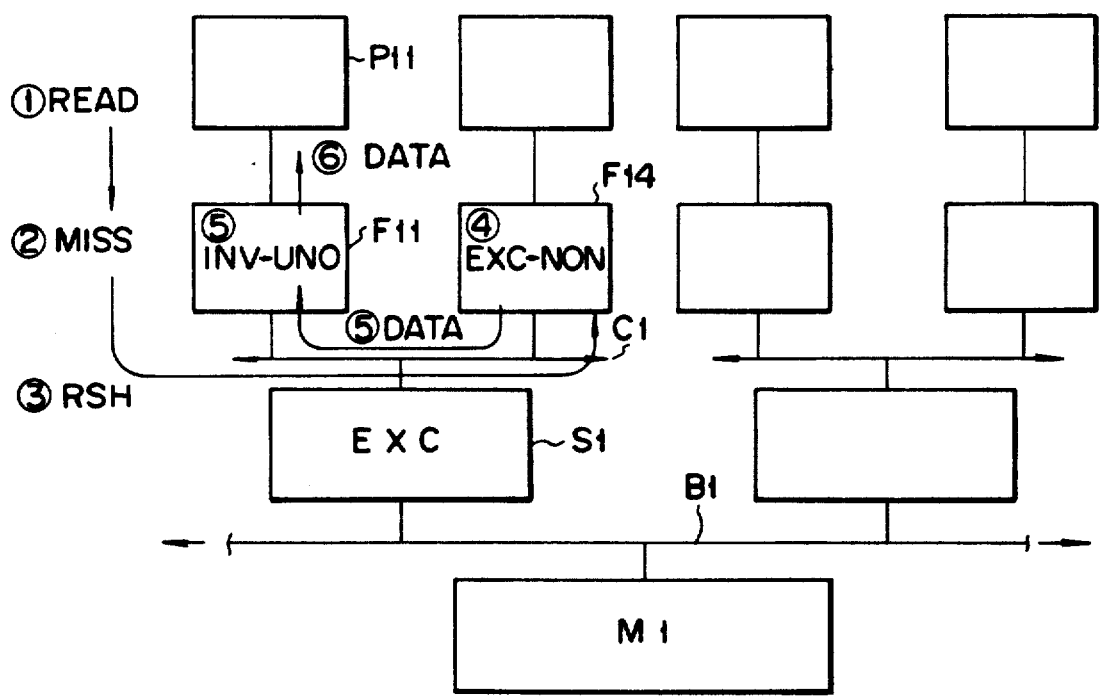
F I G. 7B

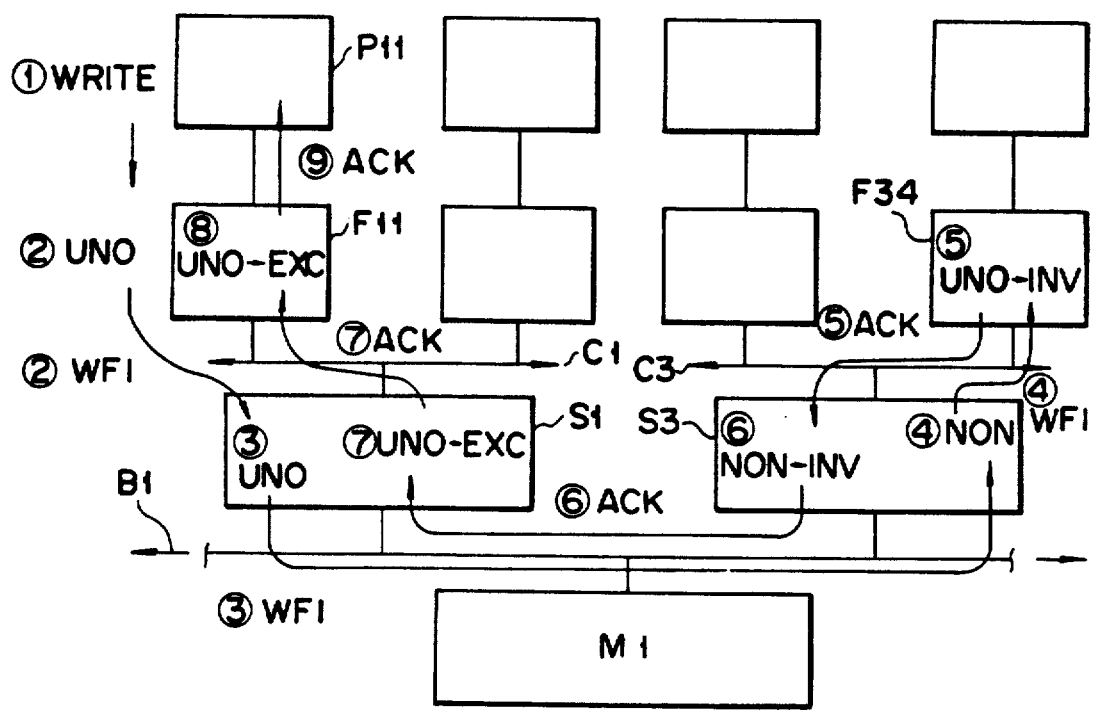
F I G. 7I
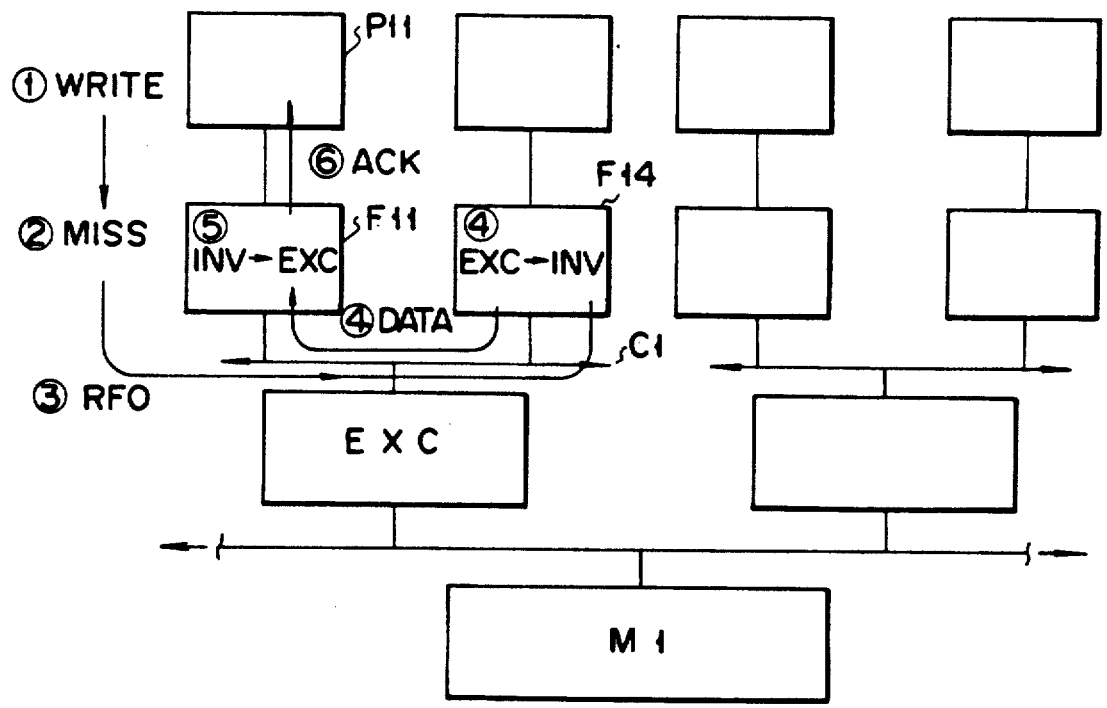
F I G. 7J

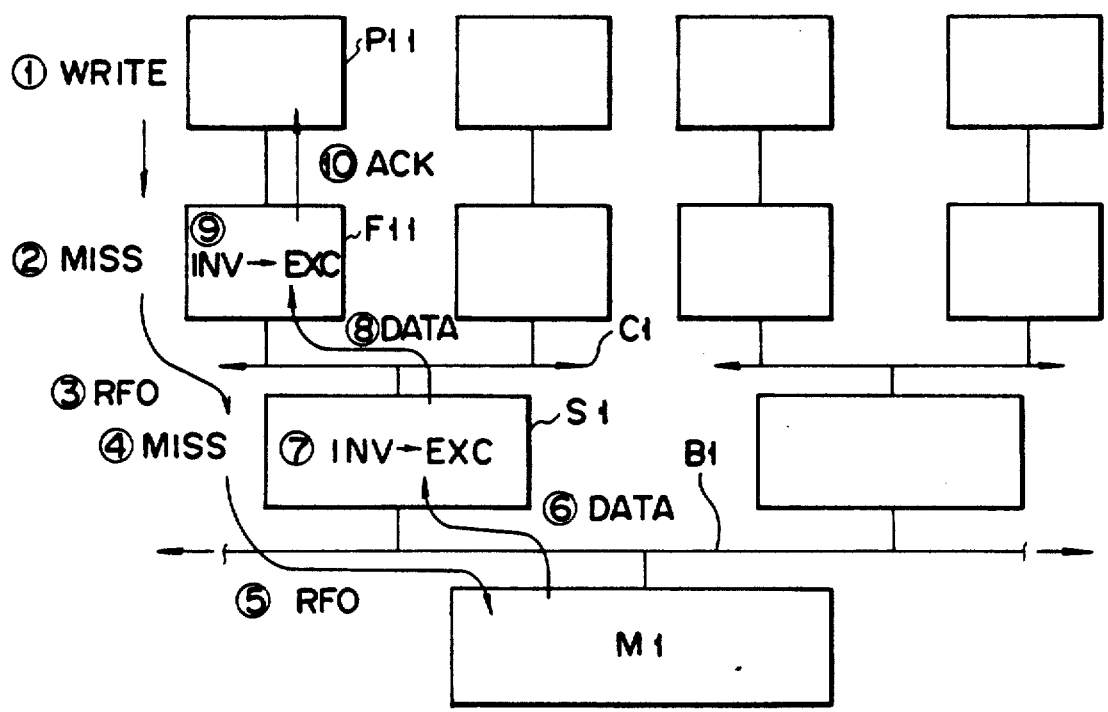
F I G. 7K
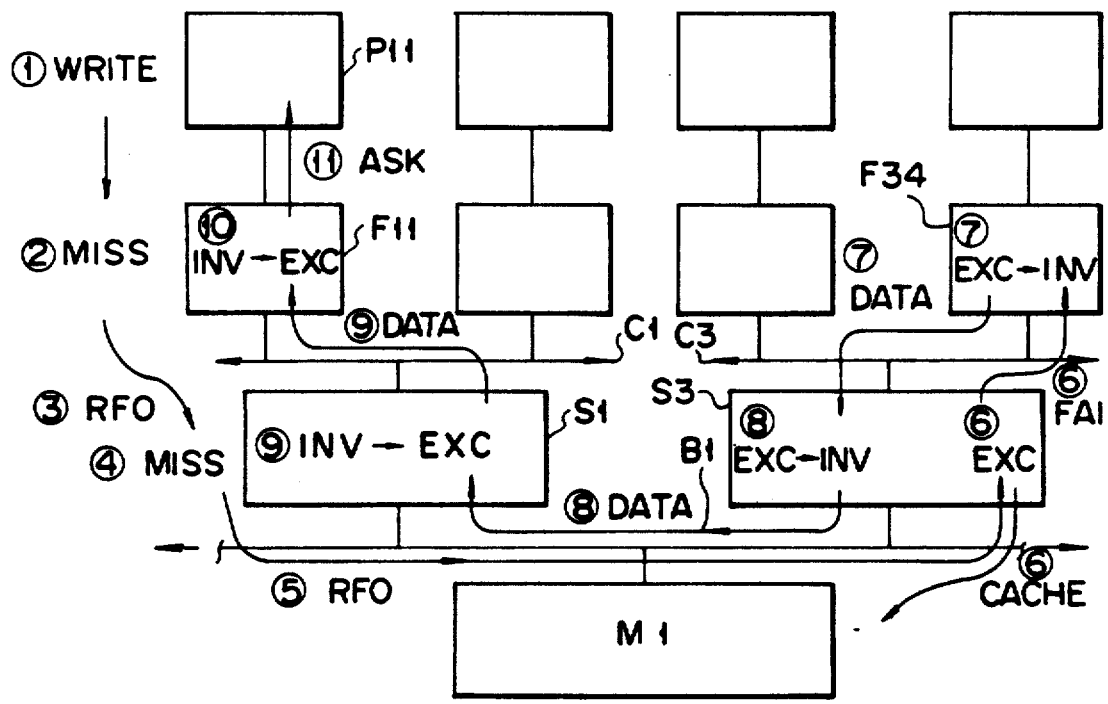
F I G. 7L

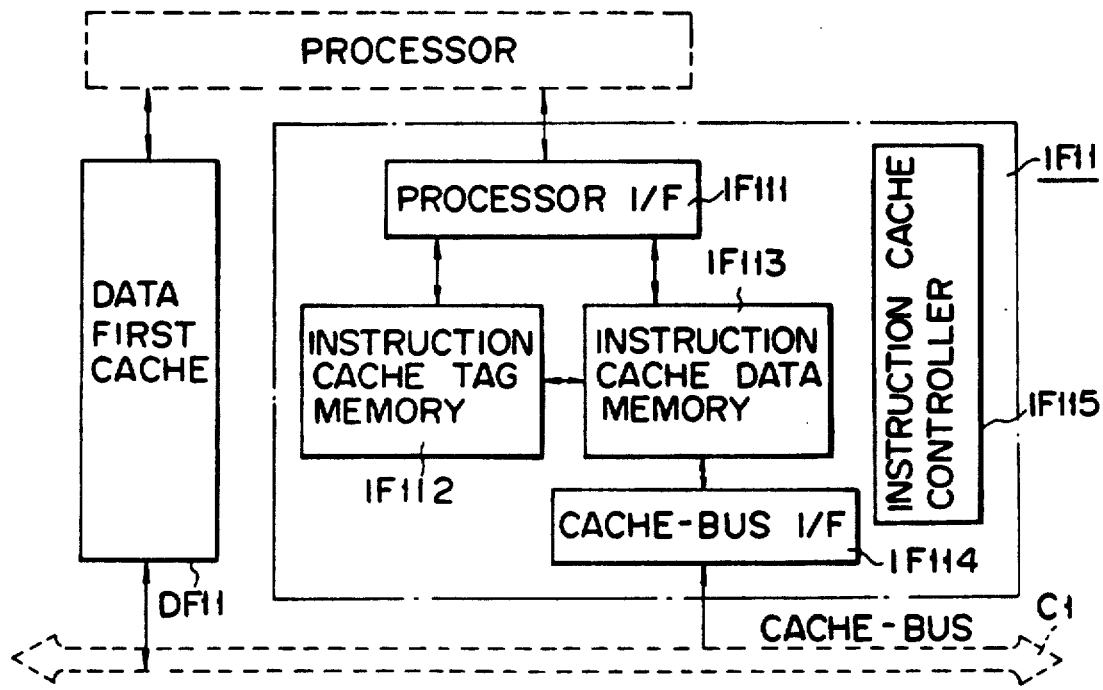
F I G. 9
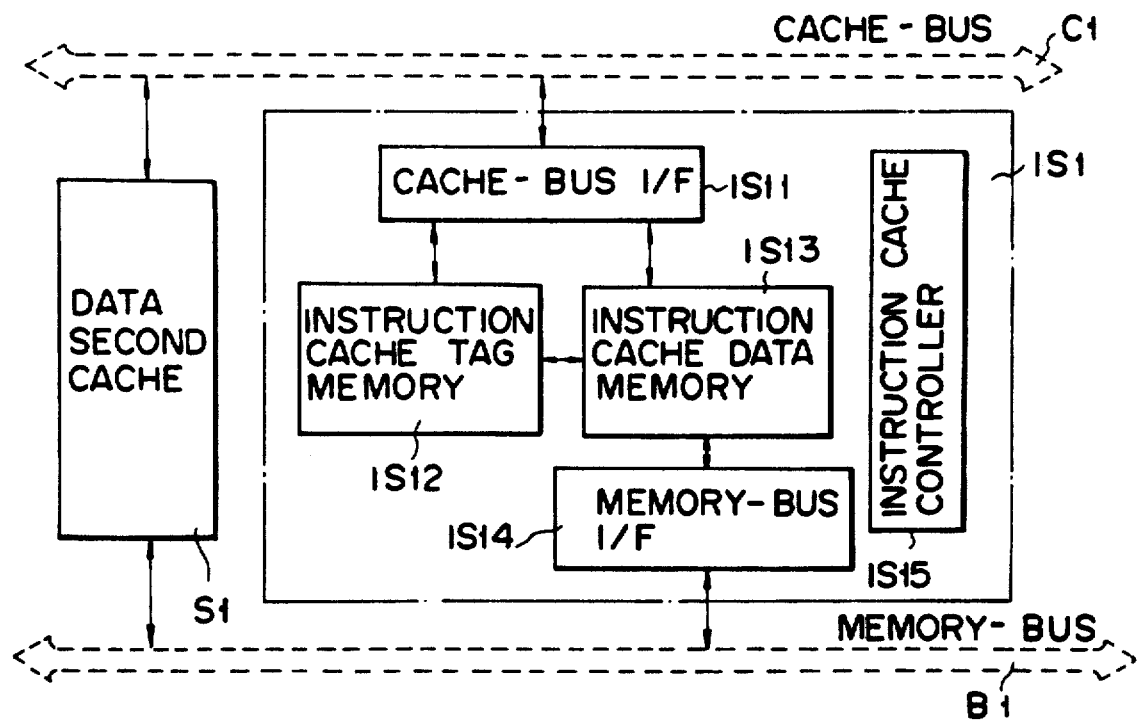
F I G. 10

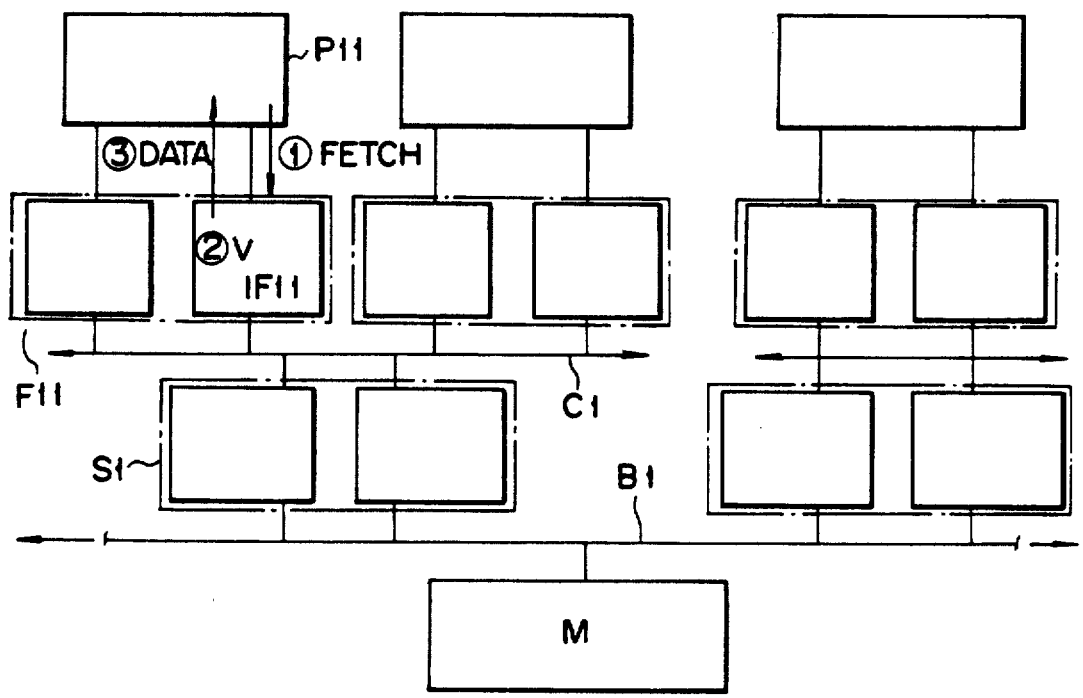
F I G. 11A
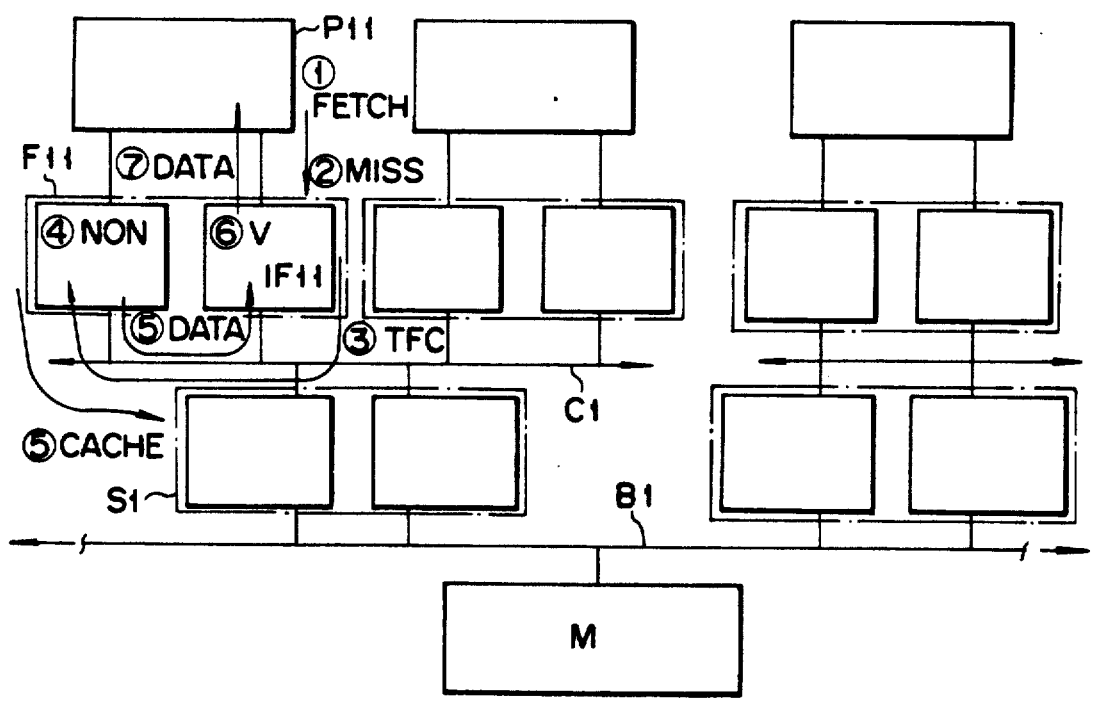
F I G. 11B

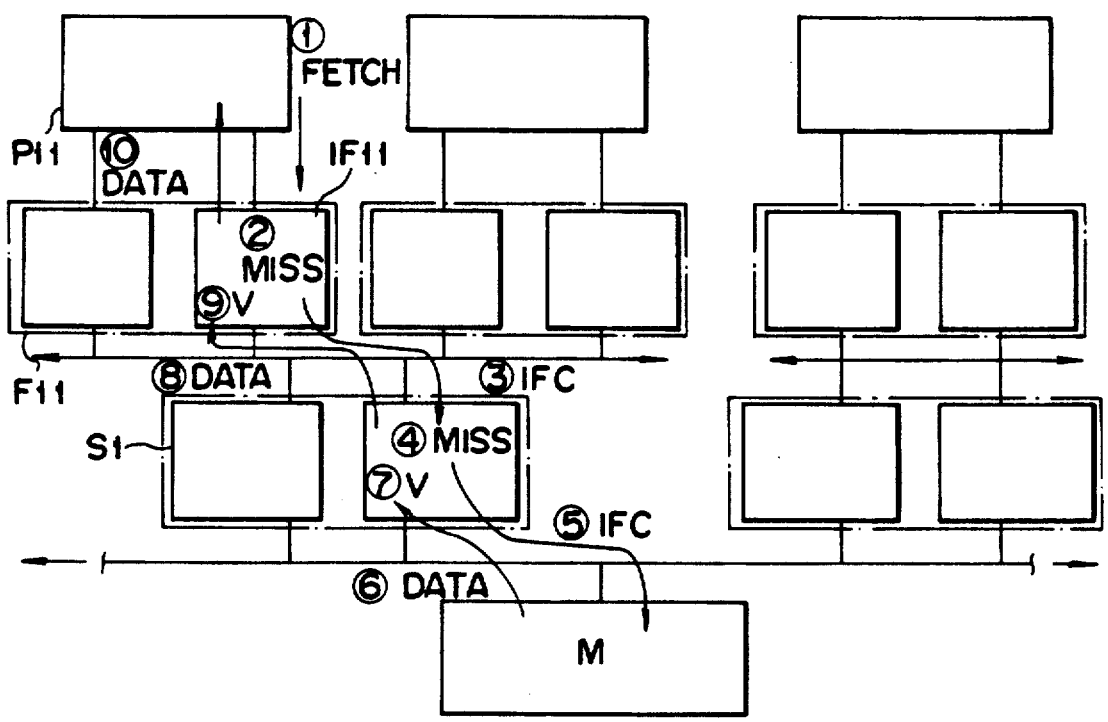
F I G. 11C
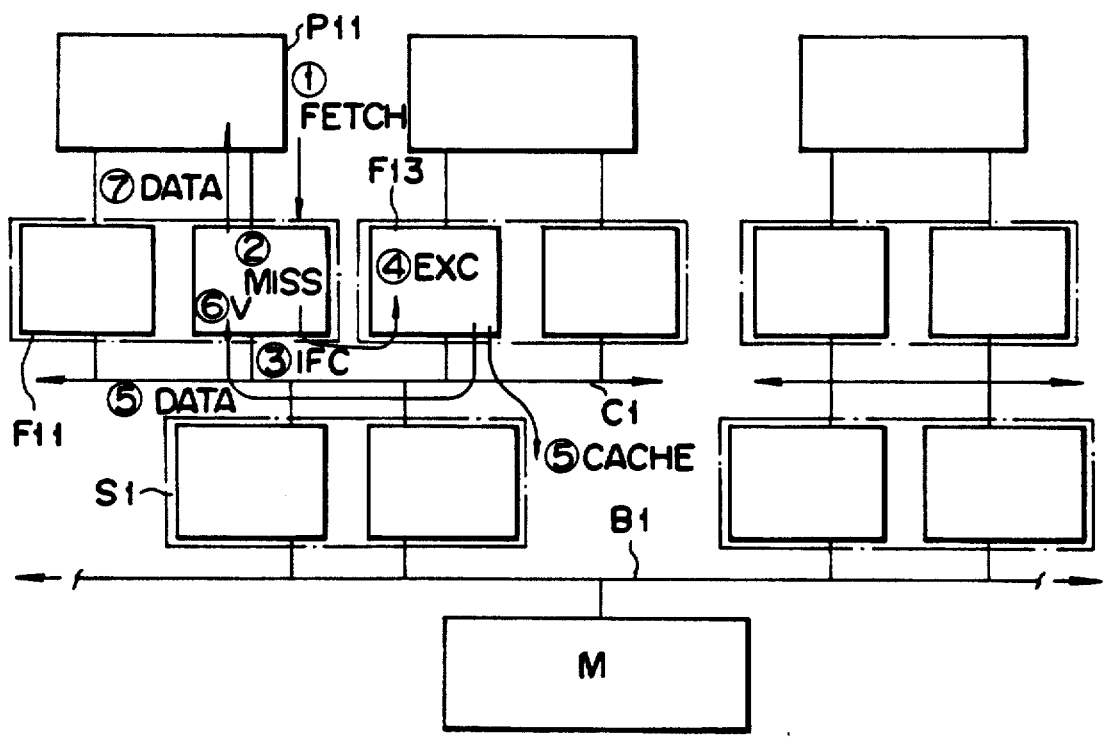
F I G. 11D

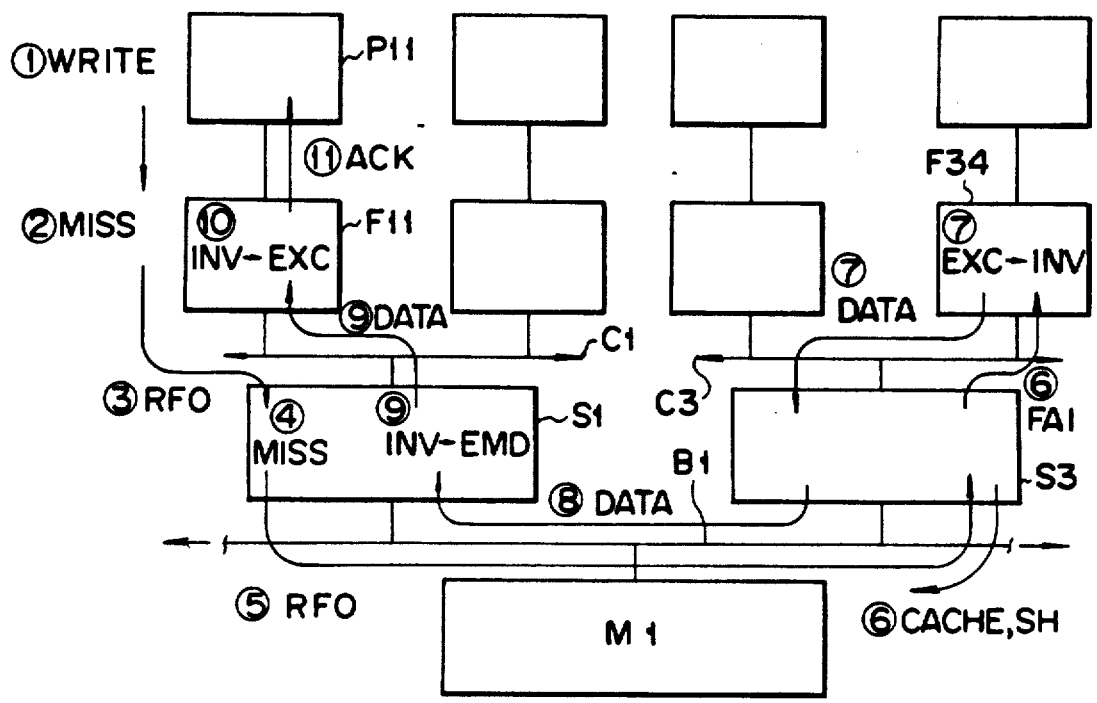
F I G. 13M
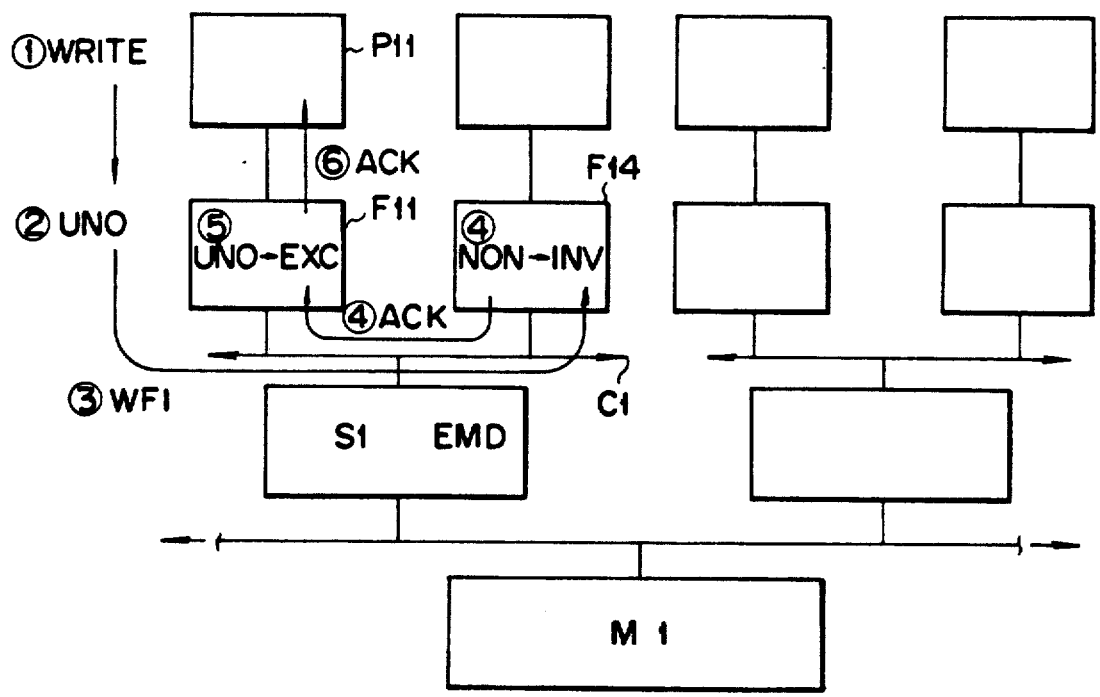
F I G. 13N

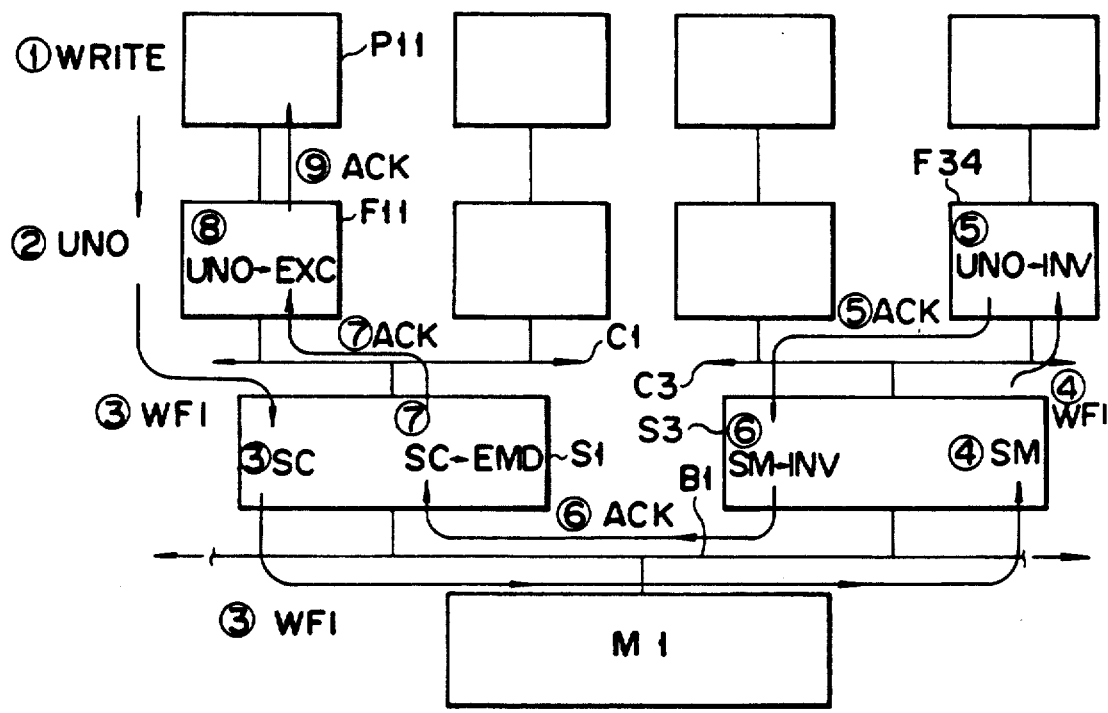
F I G. 130

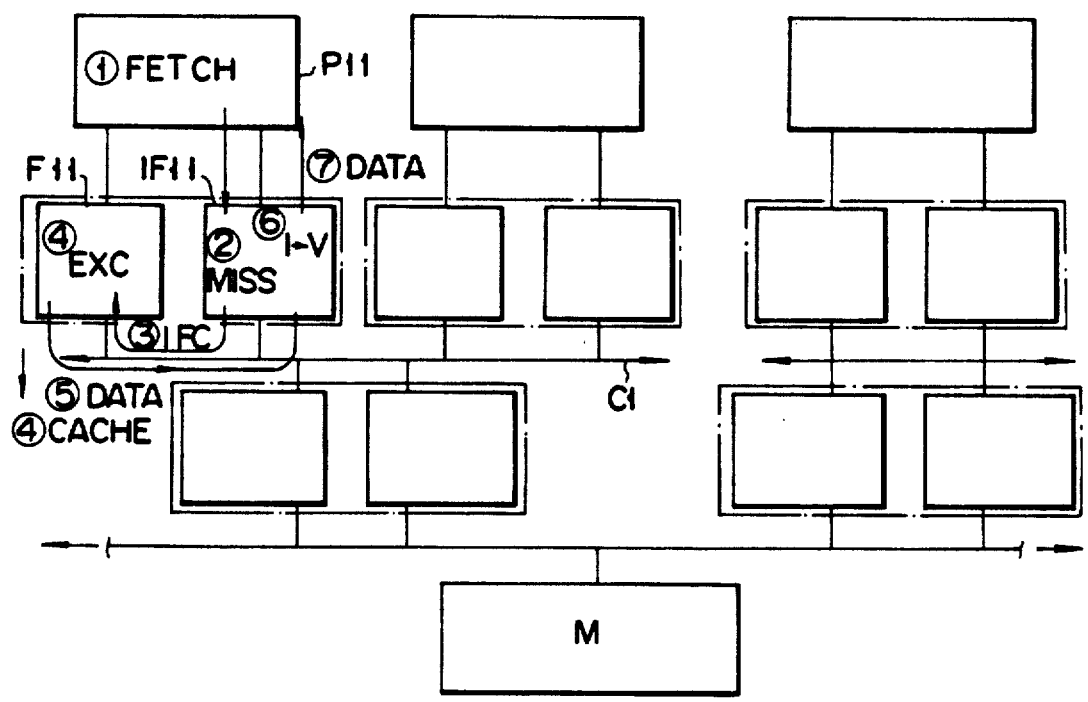
F I G. 14A
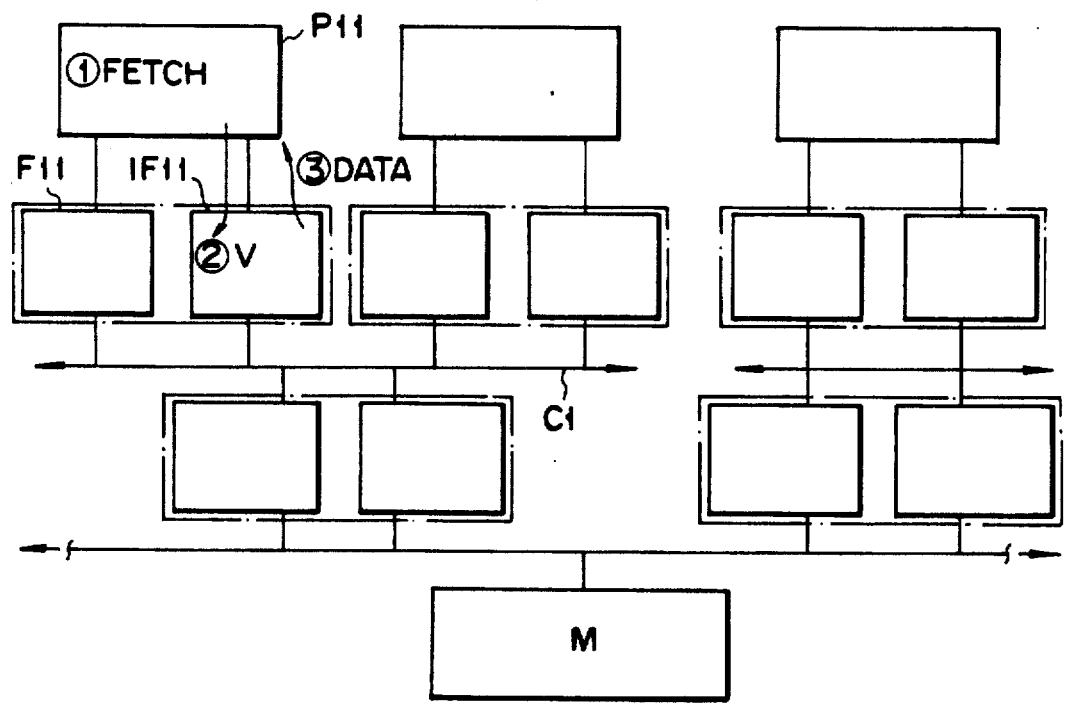
F I G. 14B

HIERARCHICAL CACHE MEMORY APPARATUS

BACKGROUND OF THE INVENTION

1. Field of the Invention

The present invention relates to a hierarchical cache memory apparatus suitably assembled in a multiprocessor system including a plurality of processors and memory devices.

2. Description of the Related Art

The following references for further details of the related arts are available:

(1) UCB/CSD TR #84/199.pp.1-89 "Design and Implementation of An Integrated Snooping Data Cache"; Gaetano Borriello et al; September 1984.

(2) The 14th I.S.C.A. pp.244-252, "Hierarchical Cache/Bus Architecture for Shared memory Multiprocessors" Andrew W. Wilson Jr. Jun. 2, 1987.

(3) U.S. Pat. No. 4,755,930 Jul. 5, 1988. Andrew W. Wilson Jr., Steven J. Frank.

Recently, a variety of tightly coupled multiprocessor systems in each of which a main memory device is shared by a plurality of processors have been developed. A multiprocessor system of this type is normally constituted by connecting a plurality of processors and a main memory device through a common bus. However, when a common bus is used, all the communication among the processors and the main memory device are performed through the common bus. Therefore, competition for use of the bus caused by accesses to the main memory device poses a serious problem. As a result, a further improvement of the system performance cannot be expected.

In view of the above situation, it is proposed to arrange a cache memory device between the plurality of processors and the main memory device. The cache memory device can decrease a difference between processing speeds of the processors and the main memory device, so that an access speed to the main memory device seems to be apparently high. When a cache memory device of this type is used, low-speed access is executed between the cache memory device and each main memory device, and a data width can be increased. Meanwhile, since highspeed access is performed between the cache memory device and the plurality of processors, a data width is adjusted. As a result, the multiprocessor system of this type can be operated without impairing the original performance of the processors.

Furthermore, data (commands, operands, data, and the like) accessed by a processor are temporarily stored in the cache memory device. When the same data is accessed, the corresponding data can be accessed at high speed not from the main memory device but from the cache memory device. More specifically, with this system, the cache memory can consequently decrease the amount of accessing the main memory device.

When a cache memory device of this type is adopted in a tightly coupled multiprocessor system, assuming that a cache memory device is shared by a plurality of processors, the amount of data transfer between the cache memory device and the main memory device can be decreased. However, the amount of accessing produced when the plurality of processors access the cache memory device is the same as that of a system without the cache memory device. Therefore, the system performance cannot be further improved unless the memory size of the cache memory device is increased, a bus cycle time between the processors and the cache memory device is shortened, and a bus width is expanded.

When a cache memory device is arranged, for each processor, the amount of data transfer between the plurality of cache memory devices to the main memory device can be decreased. In addition, since access between the processors and the cache memory devices can be executed in a one-to-one correspondence, competition for use of the bus caused when one cache memory device is shared by a plurality of processors never occurs. However, since the cache memory devices are arranged in correspondence with the processors, a problem of needing a control system is posed introduced in order to assure consistency among these cache memory devices.

The "problem of consistency" among the cache memory devices occurs since the cache memory devices corresponding to the processors have copies of a content at a specific memory address of the main memory device. When the cache memory devices are used, it is very important that these contents copied from the main memory device are the same.

For example, when a copied content of a specific memory address of the main memory device held in the corresponding cache memory device by a certain processor is to be updated, the copied content of the same memory address held in other cache memory devices must be similarly updated. Therefore, when the copied content held in a certain cache memory device is updated, processing for updating the content at the corresponding memory address of the main memory device and the corresponding copied contents held in all other cache memory devices must be executed. Alternatively, it is necessary that the copied content held in a certain cache memory device is updated and the content at the corresponding memory address of the main memory device is updated, while the corresponding copied content in all other cache memory devices is invalidated (erased or deleted).

An actual control system of cache memory devices is roughly classified into two systems. One system is called a store-through or write-through system. In this system, simultaneously with write access to a cache memory device, the same data is written in the main memory device. The other system is called a store-in, write-in, write-back, or copy-back system. In this system, data is written in only a cache memory device, and write access to the main memory device is executed when the corresponding cache block is to be replaced.

A single processor system preferably employs the store-in system to decrease the amount of activity on a common bus due to a main memory device since the following fact is theoretically apparent. More specifically, as the memory size of a cache memory device approaches infinity, the driving number of cache blocks required to be replaced decrease. Therefore the amount of activity on the common bus due to the main memory device approaches 0.

In contrast to this, when a multiprocessor system in which a main memory device is shared by a plurality of cache memory devices similarly employs the store-through system, every time a processor rewrites a copied content of the main memory device stored in a certain cache memory device, the same data must be written in the main memory device through the common bus connecting the cache memory device and the main memory device. Furthermore, all the cache memory devices monitor activity on the common bus, and when data on the common bus includes information of a specific memory address held in the corresponding cache memory device, the content must be invalidated. For the above-mentioned reasons, when the processor tries to read the copied content invalidated as a result of monitoring of the shared bus, the cache memory device must copy the same content from the main memory device again.

When a multiprocessor system in which a main memory device is shared by a plurality of cache memory devices similarly employs the store-in system, the number of times of access to the main memory device can be smaller than that in the store-through system, as described in related references. However, it is impossible to maintain consistency of storage contents among a plurality of cache memory devices by the same control system as that employed by a single processor system.

Recently, in order to efficiently connect a larger number of processors, to decrease a traffic volume of a shared bus, and to minimize a speed difference between processors and a main memory device, a plurality of cache memory devices are hierarchically arranged to improve the system performance.

In consideration of the above situation, even when a plurality of cache memory devices are hierarchically arranged, not the store-in system with high efficiency but the store-through system must be selected in order to keep consistency of storage contents among cache memory devices. In other words, when the store-through system is employed, consistency among the cache memory devices can be maintained. However, in this case, every time write access to a plurality of cache memory devices is executed, the same write access is executed for the main memory device, and extra read access to the main memory device caused by invalidation frequently occurs. As a result, the information processing efficiency of the system is inevitably impaired.

As described above, in the conventional system, when a multiprocessor system is constituted by using hierarchical cache memory devices, there is no other choice but to select the store-through system in order to maintain consistency of storage contents among the cache memory devices. When the store-through system is employed, the amount of activity on the shared bus is increased, and it is difficult to sufficiently utilize an original performance of a processor.

SUMMARY OF THE INVENTION

The present invention has been made in consideration of the above situation, and has as its object to provide a hierarchical cache memory apparatus which can constitute a multiprocessor system, which is free from the "problem of consistency" among cache memory devices and the problem of traffic on a shared bus, and its control system.

In other words, it is a principal object of the present invention to provide a practical hierarchical cache memory apparatus which does not restrict performance of a processor, and its control system.

The present invention relates to a hierarchical cache memory apparatus used in a multiprocessor computer system including a plurality of processors and a memory device, and is summarized as follows.

First cache memory devices are arranged in a one-to-one correspondence with the plurality of processors, and are connected to first connection devices in units of a predetermined number of devices. The first connection devices are respectively connected to second cache memory devices. A second connection device for connecting these second cache memory devices is connected to a main memory device. Each second cache memory device is managed to always hold address information of all the first cache memory devices connected thereto.

The main memory device is managed to always hold address information of the second cache memory devices. In the hierarchical cache memory apparatus, an entry of each of the first and second cache memory devices includes a status identification section to indicate whether or not the status of the entry is valid.

The hierarchical cache memory apparatus includes a section for invalidating address information corresponding to status identification sections of the first and second cache memory devices, a section for transmitting an invalidation request on one first connection device to the second connection device, and a section for transmitting an invalidation request on the second connection device to the first connection devices included in other mini-cluster devices.

The hierarchical cache memory apparatus includes a section for setting the status identification sections of the first and second cache memory devices in an ownership state, and a section for setting the status identification sections of the first and second cache memory devices in an exclusive state.

The hierarchical cache memory apparatus includes a section for, when a given first cache memory device has address information to be read out, sending back data information to the corresponding processor, and a section for inhibiting transmission of a signal indicating that the status of a first status identification section is updated from the first cache memory device to the corresponding first connection device.

The hierarchical cache memory apparatus includes a section for issuing a shared read request onto the first and second connection devices, a section for causing the first and second cache memory devices to supply data information corresponding to address information in response to the shared read request, a section for identifying that the first and second cache memory devices supply data, and a section for, when it is identified that no address information is supplied to a given second cache memory device, causing the memory device to reply to the read request.

The hierarchical cache memory apparatus includes a section for, when a given first cache memory device supplies data information corresponding to requested address information, canceling the exclusive state of the corresponding first status identification section, and a section for, when a given second cache memory device supplies data information corresponding to requested address information, canceling the exclusive state of the second status identification section, issuing a delivery request to the corresponding first cache memory device connected thereto through the corresponding first connection device, and canceling an ownership state of the status identification section, corresponding to the address information, of this corresponding first cache memory device.

The hierarchical cache memory apparatus includes a section for, when address information is to be replaced in a given first cache memory device, writing back the address information having an ownership to the corresponding second cache memory device, and for, when address information is replaced in a given second cache memory device, writing back the address information having an ownership to the main memory device.

The hierarchical cache memory apparatus includes a means for causing a given first cache memory device to issue an exclusive read request onto the corresponding first connection device, so that another first cache memory device connected to the corresponding first connection device supplies data information corresponding to address information in response to the exclusive read request on the first connection device, a section for causing a given second cache memory device to issue an exclusive read request onto the second connection device, and a section for causing another second cache memory device connected to the second connection device to supply data information corresponding to the address information in response to the exclusive read request on the second connection device.

When the second status identification section corresponding to address information is in a valid state, has an ownership, and in an exclusive state, a second status identification section corresponding to the address information is set in an invalid state. An invalidation delivery request is issued to the first cache memory devices, and the status identification sections, corresponding to the address information, of the first cache memory devices which replied to the invalidation delivery request are set in an invalid state.

The hierarchical cache memory apparatus includes a means for, when there is address information equal to an address to be subjected to read-modify-write access by a given processor, causing the corresponding first cache memory device to issue an invalidation request onto the connected first connection device, supplying data information of the address requested by the given processor, and writing the modified data information, and a section for, when address information equal to an address subjected to read-modify-write access by a given processor is set in an invalid state in the corresponding first status identification section, causing the corresponding cache memory device to issue an exclusive read request onto the connected connection device to obtain data information corresponding to the address requested by the given processor, supplying it to the given processor, and writing the modified data information.

Each of the first and second cache memory devices comprises data and command cache memory devices which are arranged so that a command from a given processor is independently processed. The data and command cache memory devices respectively comprise data and command cache status identification sections each for identifying whether or not each address information is valid. The hierarchical cache memory apparatus includes a section for controlling supply of data information from a data cache memory device while causing the corresponding command cache memory device to supply command information in response to a request from the corresponding processor.

An invalidation request issued onto the second connection device is inhibited from being transmitted to the second cache memory devices in an invalid state, and the first connection devices connected to these second cache memory devices.

When a status identification section corresponding to address information equal to an address written by a given processor is in a valid state, and in an exclusive state, a signal is inhibited from being output to the corresponding first connection device to maintain consistency of the entire system.

According to the present invention, when a status identification section corresponding to address information which is replaced to assure an area for storing another address information has an ownership, and data information corresponding to the address information to be replaced must be written back to the corresponding second cache memory device, the exclusive state of the second status identification section is canceled so as to reply neither to a shared read request nor to an exclusive read request.

Upon read-modify-write access by a given processor, when a first status identification section corresponding to the address information is in a valid state, has an ownership, and is in an exclusive state, its status is not updated, and a signal is inhibited from being transmitted to the corresponding first connection device.

BRIEF DESCRIPTION OF THE DRAWINGS

FIG. 5 is a block diagram of a second cache memory device of the first embodiment;

FIG. 6 is a block diagram of peripheral devices of a memory of the first embodiment;

FIGS. 7A to 7L are diagrams showing system operations of the first embodiment;

FIG. 9 is a block diagram of a first cache memory device of the second embodiment;

FIG. 10 is a block diagram of a second cache memory device of the second embodiment;

FIGS. 11A to 11F are diagrams showing system operations of the second embodiment;

FIG. 14A to 14D are diagrams showing system operations according to the fourth embodiment of the present invention.

DETAILED DESCRIPTION OF THE PREFERRED EMBODIMENTS

Figure 1:
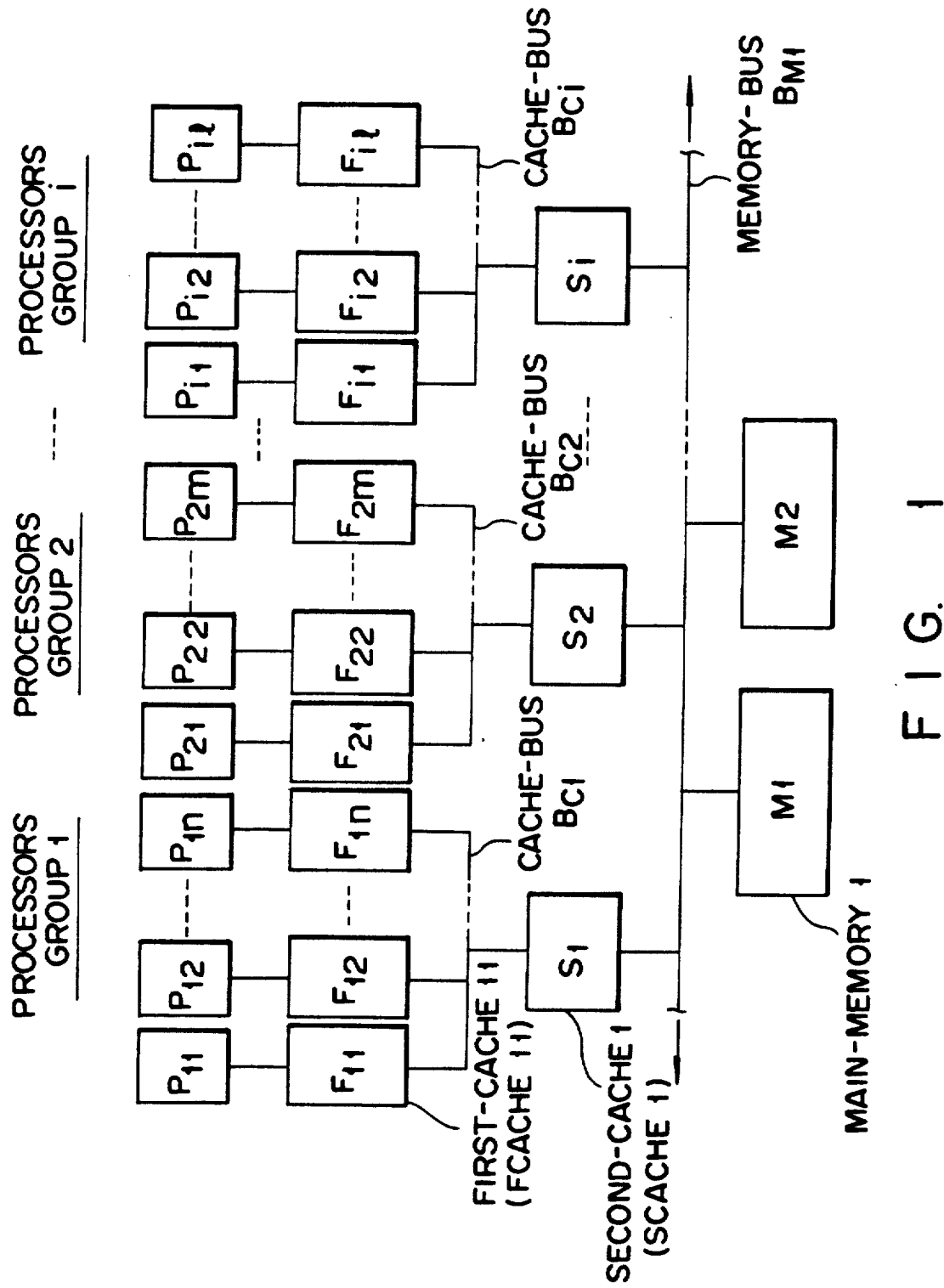
FIG. 1 is a schematic block diagram of the entire system according to the first embodiment of the present invention.

FIG. 1 is a schematic block diagram of the entire multiprocessor system which incorporates a hierarchical cache memory apparatus according to the first embodiment of the present invention. The apparatus of this embodiment is constituted between a plurality of processors and main memories.

In the system shown in FIG. 1, reference numerals $P_{11}, P_{12}, \ldots, P_{1n}, P_{21}, P_{22}, \ldots, P_{2m}, P_{i1}, P_{i1}, P_{i2}, \ldots, P_{ij}$ denote a plurality of processors. Reference numerals M1 and M2 denote main-memories for storing data from the processors and reading out the stored data to processors in accordance with a request from the corresponding processors.

In this system, first-caches (fcaches) $F_{11}, F_{12}, \ldots, F_{1n}, F_{21}, F_{22}, \ldots, F_{2m}, F_{i1}, F_{i1}, F_{i2}, \ldots, F_i$ are arranged in a one-to-one correspondence with the plurality of processors $P_{11}$ to $P_i$, and are connected, in units of a predetermined number (equal to the number of processors) of devices, in parallel with first cache-buses as first connection devices, thus grouping a plurality of mini-cluster devices. Second-caches (scaches) $S_1, S_2, \ldots, S_i$ are respectively connected to the cache-buses of the plurality of mini-cluster devices. These scaches are connected to a memory-bus as a second connection device, thus constituting a cache memory apparatus having a two-stage hierarchical structure, as shown in FIG. 1. The cache memory apparatus with this architecture is connected to the main-memories M1 and M2 through the memory-bus.

In the following description, an expression "fcaches above an scache" means fcaches connected to a certain scache through the cache-bus. For example, an expression "fcaches above $S_1$" indicates the fcaches $F_{11}, F_{12}, \ldots, F_{1n}$. Similarly, an expression "an scache below an fcache" indicates an scache connected to a certain fcache through the cache-bus. More specifically, an expression "an scache below $F_{11}$" indicates the scache $S_1$. An expression "brother fcaches" represents the relationship between fcaches connected through the same cache-bus. For example, expressions "$F_{11}$ and $F_{1i}$ are brothers", "$F_{11}$ and $F_{22}$ are not brothers", and the like are available.

A cache entry in the system described above will be described below.

Figures 3, 4:
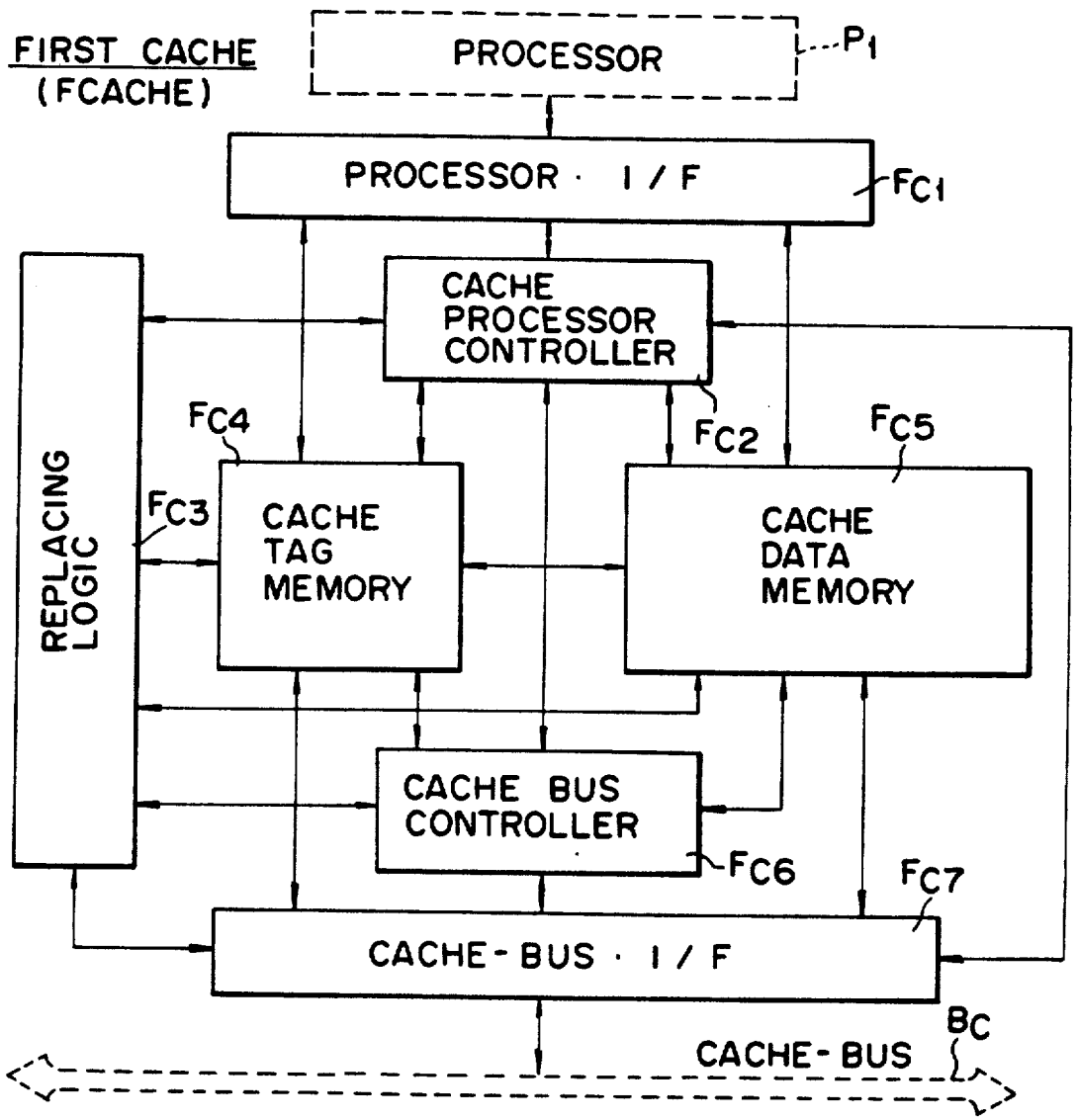
FIG. 3 is a block diagram of a first cache memory device of the embodiment.
FIG. 4 shows a format of status information belonging to cached address information in the first embodiment.

A cache memory is normally managed in units of blocks each consisting of several bytes. An entry is a combination of a certain block and information for managing the block. Each entry includes a data section storing a content of the corresponding address, address information for managing a correspondence between an entry and an address, status information for managing status of an entry, and replacing information for, when data is to be replaced, determining an entry to be replaced. An information field as a combination of the status information, address information, and replacing information of an entry is called a tag section (FIG. 4).

An operation for copying data to a cache memory is called a "fetch" operation. A unit of the fetch operation is determined to be a block in the first embodiment. When a block is fetched, an entry for this block must be assured. If an entry is not assured, a certain entry is selected, and the content of the selected entry must be expelled. This operation is an operation called "replacing" described above.

Figure 2:
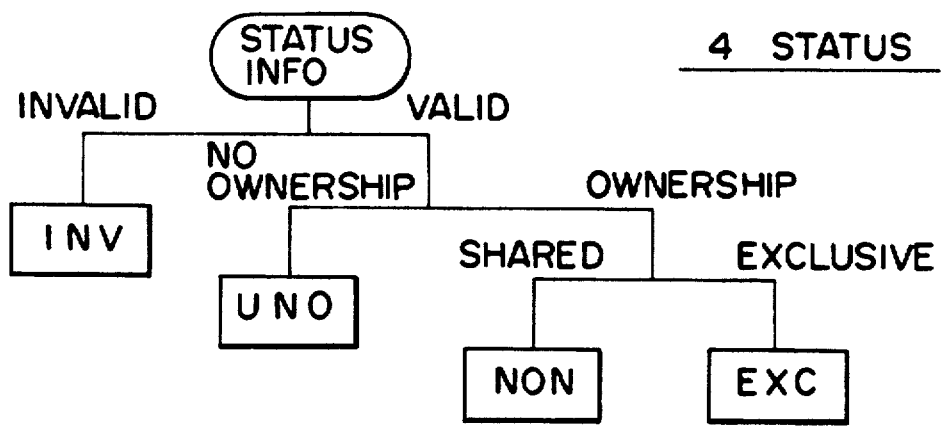
FIG. 2 is a diagram showing status information representing four statuses set in a cache memory device of the first embodiment.

In the first embodiment, as status information for the fcaches and the scaches, four statuses (1) to (4) to be described below are defined, as illustrated in FIG. 2.

Four Statuses of Fcache (1) EXC (EXClusive own); This status indicates that a cache memory device is valid, has an ownership, and is set in an exclusive state, and has the following meanings.

<1> Other fcaches have no entry corresponding to this entry. <2> Data in a data section of this entry is valid. <3> A content in a data section, corresponding to this entry, of an scache below this fcache does not coincide with that of the data section of this entry. <4> This entry has an ownership, and its content must be copied back when it is replaced.

(2) INV (INValid); This status indicates that a cache memory device is set in an invalid state, and has the following meanings.

<1> This entry is not used. <2> Both a data section and address information are insignificant information.

(3) NON (NOt exclusive own); This status indicates that a cache memory device is set in a valid state and has an ownership but is not set in an exclusive state, and has the following meanings.

<1> A copy of this entry may be present in other fcaches. <2> A content of a data section, corresponding to this entry, of an scache below this fcache may not coincide with that of the data section of this entry. <3> Data in the data section of this entry is set in a valid state. <4> This entry has an ownership, and its content must be copied back when it is replaced.

(4) UNO (UNOwn); This status indicates that a cache memory device is set in a valid state, has no ownership, and is not set in an exclusive state, and has the following meanings.

<1> A copy of this entry may be present in other fcaches. <2> A content of a data section, corresponding to this entry, of an scache below this fcache may not coincide with that of the data section of this entry. <3> A data in a data section is valid (data). <4> When this entry is replaced, its content need not be copied back since this entry has no ownership.

Four Statuses of Scache (1) EXC (EXClusive own); This status has the same definition as that of EXC described above, and has the following meanings.

<1> Other scaches have no entry of an address corresponding to this entry. <2> Data in data sections of corresponding entries of fcaches above this scache do not coincide with data in the data section of this entry. <3> This entry has an ownership, and when this entry is replaced, its data section must be caused to coincide with that of fcaches, and thereafter, must be copied back. <4> One of fcaches above this scache always has an ownership in a corresponding entry, and has the EXC or NON status.

(2) INV (INValid); This status has the same definition as that of INV described above, and has following meanings.

<1> This entry is not used. <2> Both a data section and address information are insignificant information.

(3) NON (NOt exclusive own); This status has the same definition as that of NON described above, and has the following meanings.

<1> Other scaches may have entries corresponding to this entry. <2> A content of a data section, to this entry, of each fcache above this scache coincides with the data section of this entry. <3> The corresponding entry of no fcache above this scache has an ownership, and if there is an entry in an fcache thereabove, its status is UNO. <4> Data in the data section of this entry is valid. <5> This entry has an ownership, and when this entry is replaced, its content must be copied back.

(4) UNO (UNOwn); This status has the same definition has that of UNO described above, and has the following meanings.

<1> Other scaches may have entries corresponding to this entry. <2> If an fcache above this scache has an entry corresponding to this entry, its status is always UNO. <3> A content of a data section of the entry of the fcache coincides with that of this entry. <4> Data in the data section of this entry is valid. <5> This entry has no ownership, and its content need no be copied back when it is replaced.

The above-mentioned status information is managed in correspondence with that in the tag section of a cached cache entry, as shown in, e.g., FIG. 4.

The functions of the fcache will be described below.

The fcache comprises a cache tag memory Fc4, a cache data memory Fc5, a replacing logic Fc3, a cache processor controller Fc2 for controlling these components, and a cache bus controller Fc6 connected to a cache-bus Bc through a cache-bus interface Fc7, as shown in FIG. 3. This fcache executes predetermined operations corresponding to a status of a cache entry at that time in accordance with a command from the processor Pl and a command from the cache-bus, and updates the status content of the cache entry.

Expressions Hit" and "miss" frequently used in the following description will be defined as follows. That is, "hit" means a state wherein an address operand of a command coincides with address information of a tag section of an entry, and its status information is not INV. Contrary to this, "miss" means a state wherein there is no entry which coincides with the address operand of the command, or even when a coincidence is found, the status information is INV.

On the cache-bus, the following commands are defined as bus commands:

[1] RSH: Read-Shared (address); A request command for fetching a cache block indicated by an address.

[2] RFO: Read-For-Ownership (address); A command for a cache block indicated by an address, for invalidating other entries indicated by the address. This command is used to execute a fetch operation when a write-miss occurs.

[3] WFI: Write-For-Invalidation (address); A command for invalidating other entries, i.e., invalidating entries indicated by an address in other fcaches. However, no data write access is executed (that is, only an address is output).

[4] WWI: Write-Without-Invalidation (address, data); A command for executing a copy-back operation. With this command, data is written in an scache indicated by an address. Other cache blocks are not invalidated.

[5] FAI: Flush-And-Invalidation (address); A command for writing only one data present in an fcache in an scache to invalidate an entry present in the fcache.

[6] FWI: Flush-Without-Invalidate (address); A command for writing back data in an fcache to an scache. When a block of an EXC scache is requested from another scache, this command is used to write latest data before data is sent back. A difference from the FAI command is that the FWI does not invalidate an entry.

Completion of execution of these bus commands can be recognized when replies are sent back from all the cache memories on the cache-bus. Whether or not ack signals from a plurality of caches are received can be easily checked by forming this ack signal as a common line driven by an open collector (not shown).

Three commands, i.e., Read, Write, and Read Modify Write are prepared to be supplied from a processor to an fcache, and the cache processor controller Fc2 replies to the corresponding processor as follows in response to these commands.

[1. When a Read command is input]

(a) When an entry hits the command; The cache processor controller Fc2 sends the content of a data section of a hit entry to the corresponding processor. In this case, the status of the entry is left unchanged.

(b) When an entry misses the command; The controller Fc2 executes a replacing operation, and then issues the RSH command onto the cache-bus to fetch data. Thereafter, the controller Fc2 sends back the content of the data section, and sets the status of the corresponding entry to be "UNO".

[2. When a Write command is input]

(a-1) When an EXC entry hits the command; The cache processor controller Fc2 writes the corresponding data in a hit entry. However, the status of the entry is left unchanged.

(a-2) When an entry other than EXC hits the command; The cache processor controller Fc2 issues the WFI command onto the cache-bus to guarantee that other caches do not have a copy of an address to be written. When the controller receives a reply in response to this WFI command, it writes an address in the hit entry, and changes the status of the entry to be "EXC".

(b) When an entry misses the command; The controller Fc2 executes a replacing operation, and then issues the RFO command onto the cache-bus Bc to fetch data. Thereafter, the controller writes data in the data section of the fetched entry, and sets the status of the entry to be "EXC".

[3. When a Read Modify Write command is input]

(a−1) When an EXC entry hits the command; The cache processor controller Fc2 loads the hit entry, and writes data in the data section of the entry. While the controller loads the entry to write data, it is controlled not to accept a request from the cache-bus. The status of the entry is left unchanged.

(a-2) When an entry other than EXC hits the command; The cache processor controller Fc2 issues the WFI command onto the cache-bus to guarantee that other caches do not have a copy of an address to be written. When the controller receives a reply in response to this WFI command, it loads the hit entry, and writes data in the data section of the entry. While the controller loads data to write it in this entry, the controller is controlled not to accept a request from the cache-bus. The status of the entry is set to be "EXC".

(b) When an entry misses the command; The controller Fc2 executes a replacing operation, and then issues the RFO command onto the cache-bus Bc to fetch data. Thereafter, the controller loads data from the processor and writes it in the data section of the fetched entry. The status of the entry is set to be "EXC".

The replacing operation of the fcache is executed as follows. Whether a copy-back operation is necessary or not is determined according to status of an entry to be replaced from this fcache.

[1] When an entry to be replaced has INV or UNO status, no copy-back operation is performed.

[2] When an entry to be replaced has EXC or NON status, the controller issues the WWI command onto the cache-bus Bc to copy back the content of the entry to the scache below this fcache.

Replies of the fcache in response to the bus commands on the cache-bus are as follows. In this case, the cache-bus controller FC6 in the fcache monitors the cache-bus, and executes a necessary operation in accordance with status of an entry corresponding to an address of a command on the cache-bus.

A command on the cache-bus holds an address. Fcache has an entry corresponding to this address. Then the monitor of the cache-bus detects this entry is not INV, it treats the entry "hit". On the other hand, when no entry corresponding to an address is present in the fcache or status of an entry corresponding to the address is INV, monitoring of the cache-bus recognizes this operation which cannot hit a command as "miss". When an entry misses a command, the fcache sends back only an ack signal onto the cache-bus as a reply.

When an entry hits a command, the following operation is executed according to a command on the cache-bus.

Since a new entry need not be assured in a cache in response to a command on the cache-bus, no replacing operation is required. [1. Reply to RSH]

(a) When status of a hit entry is EXC; The controller Fcb sends back data of this entry onto the cache-bus, and the status of this entry is set to be NON. The controller sends back an ack signal onto the cache-bus as a reply.

(b) When status of a hit entry is NON; The controller Fcb sends back data of this entry onto the cache-bus, and the status of this entry is left unchanged. The controller sends back an ack signal onto the cache-bus as a reply.

(c) When status of a hit entry is UNO; The controller Fcb sends back an ack signal onto the cache-bus as a reply. [2. Reply to RFO]

(a) When status of a hit entry is EXC; The controller Fcb sends back data of this entry onto the cache-bus, and the status of this entry is set to be INV. The controller sends back an ack signal onto the cache-bus as a reply.

(b) When status of a hit entry is NON; The controller Fcb sends back data of this entry onto the cache-bus, and the status of this entry is set to be INV. The controller sends back an ack signal onto the cache-bus as a reply.

(c) When status of a hit entry is UNO; The controller Fcb sets the status of this entry to be INV, and sends back an ack signal onto the cache-bus as a reply. [3. Reply to WFI]

(a) When status of a hit entry is EXC; This case is impossible.

(b) When status of a hit entry is NON; The controller Fcb changes the status of this entry to be INV, and sends back an ack signal onto the cache-bus as a reply.

(c) When status of a hit entry is UNO; The controller Fcb changes the status of this entry to be INV, and sends back an ack signal onto the cache-bus as a reply. [4. Reply to WWI]

(a) When status of a hit entry is EXC; This case is impossible.

(b) When status of a hit entry is NON; This case is impossible.

(c) When status of a hit entry is UNO; An ack signal is sent back onto the cache-bus as a reply. [5. Reply to FAI]

(a) When status of a hit entry is EXC; The controller Fcb sends back data of this entry onto the cache-bus, and the status of this entry is set to be INV. The controller sends back an ack signal onto the cache-bus as a reply.

(b) When status of a hit entry is NON; The controller Fcb sends back data of this entry onto the cache-bus, and the status of this entry is set to be INV. The controller sends back an ack signal onto the cache-bus as a reply.

(c) When status of a hit entry is UNO; The controller Fcb sets the status of this entry to be INV. An ack signal is sent back onto the cache-bus as a reply. [6. Reply to FWI]

(a) When status of a hit entry is EXC; The controller Fcb sends back data of this entry onto the cache-bus, and the status of this entry is set to be UNO. The controller sends back an ack signal onto the cache-bus as a reply.

(b) When status of a hit entry is NON; The controller Fcb sends back data of this entry onto the cache-bus, and the status of this entry is set to be UNO. The controller sends back an ack signal onto the cache-bus as a reply.

(c) When status of a hit entry is UNO; The controller Fcb sends back an ack signal onto the cache-bus as a reply.

When control transits to an impossible case in the system, the system is interrupted since it is caused by a malfunction of hardware.

The operation of the fcache with the above-mentioned functions will be described below with reference to the arrangement of the fcache shown in FIG. 3.

A command from a processor is input to the cache processor controller Fc2 through the processor interface Fc1. The controller Fc2 looks up the cache tag memory Fc4 to check if a cache hits the input address, and executes a necessary operation according to the status of the entry.

Access to a data section is executed in the cache data memory Fc5 at the address given by the cache tag memory Fc4. An entry to be replaced is determined by the replacing logic Fc3. If a copy-back operation is necessary, the entry is copied back from the cache data memory Fc5 onto the cache-bus C1 through the cache-bus interface Fc7. The WWI command is sent under the control of the replacing logic Fc3.

When a command is issued onto the cache-bus C1, a command is issued from the cache processor controller Fc2 through the cache-bus interface Fc7. As a result, readout data is written in the cache data memory Fc5 through the cache-bus interface Fc7.

The tag section of the entry is rewritten by writing data in the cache tag memory Fc4 by the cache processor controller Fc2.

A command from the cache bus is input to the fcache cache-bus controller Fc6 through the cache-bus interface Fc7. This controller Fc6 looks up the cache tag memory Fc4 to check if a cache hits an input address, and executes a necessary operation in accordance with the status of the entry.

As a reply to a fetch or flush request, data in the cache data memory Fc5 is read out, and is sent onto the cache-bus Bc through the cache-bus interface Fc7. Write access to the tag section of an entry is executed in the cache tag memory Pc4 by the fcache cache-bus controller Fc6.

The arrangement, functions, and principal operations of the fcache which is arranged in correspondence with each processor have been schematically described.

The scache will be described below.

The scache executes a necessary operation in accordance with a command from the cache-bus, a command from the memory-bus, and the status of a cache entry at that time, thereby changing the content of the entry.

In the following description, "hit" expresses a state wherein an address operand of a command coincides with address information of a tag section of an entry, and its status information is not INV. Contrary to this, "miss" expresses a state wherein there is no entry which coincides with the address operand of the command, or even when a coincidence is found, the status information is INV.

The following commands are defined on the memory-bus.

[1] RFO: Read-For-Ownership (address); A command for fetching a cache block indicated by an address, and invalidating an entry indicated by the address (equivalent to the above-mentioned command on the cache-bus).

[2] RSH: Read-Shared (address); A command for fetching a cache block indicated by an address (equivalent to the above-mentioned command on the cache-bus).

[3] WFI: Write-For-Invalidation (address); A command for invalidating other entries indicated by an address (equivalent to the above-mentioned command on the cache-bus).

[4] WWI: Write-Without-Invalidation (address, data); A command for writing data of a cache block indicated by an address in a memory (equivalent to the above-mentioned command on the cache-bus). This command is used when data is copied back from the scache to the memory.

A command on the memory-bus completes its operation when ack signals as replies from all the caches and memories on the memory-bus are sent back. Whether or not ack signals from a plurality of caches are received can be easily checked by forming this ack signal as a common line driven by an open collector (not shown).

A reply from the scache is sent back as follows in accordance with the four commands supplied from the cache-bus to the scache in response to a command from the cache-bus.

[1. Reply to RSH]

(a-1) When status of a hit entry is EXC; Since an entry having an ownership is always present in corresponding entries of fcaches above this scache, the scache need not respond to the command. That is, transfer is made among brother fcaches. An ack signal is sent back onto the cache-bus as a reply.

(a-2) When status of a hit entry is NON or UNO; Since no entry having an ownership can be present in fcaches above this scache, the scache must respond to the command. Therefore, data of a hit entry is sent back to the cache-bus, and the status is left unchanged. An ack signal is sent back onto the cache-bus as a reply.

(b) When an entry misses a command; The RSH command is issued onto the memory-bus after the replacing operation is executed, thereby loading data. The status of the loaded entry is set to be UNO. Data of the loaded entry is sent back onto the cache-bus. An ack signal is sent back onto the cache-bus as a reply.

[2. Reply to RFO]

(a-1) When status of a hit entry is EXC; A corresponding entry having an ownership is present in the fcache, and this entry responds to this RFO command. In other scaches and fcaches thereabove, since there is no entry corresponding to this entry, a command is not sent and the status is not changed. An ack signal is sent back onto the cache-bus as a reply.

(a-2) When status of a hit entry is NON or UNO; The WFI command is issued onto the memory-bus to invalidate corresponding other entries. Data of an entry is sent back onto the cache-bus. The status of the entry is changed to be EXC, and an ack signal is sent back onto the cache-bus as a reply.

(b) When an entry misses a command; After the replacing operation is executed, the RFO command is issued onto the memory-bus, thereby loading data. The status of the loaded entry is set to be EXC. The data of the loaded entry is sent back onto the cache-bus, and an ack signal is sent back onto the cache-bus as its reply.

[3. Reply to WFI]

(a-1) When status of a hit entry is EXC; Since there is no entry corresponding to this entry in other scaches and fcaches thereabove, the corresponding entry need not be invalidated. An ack signal is sent back onto the cache-bus as a reply.

(a-2) When status of a hit entry is NON or UNO; The WFI command is issued onto the memory-bus to invalidate corresponding other entries. The status of the hit entry is changed to be EXC. An ack signal is sent back onto the cache-bus as a reply.

(b) When an entry misses a command; If this case is established, this means that there is an entry which is present in an fcache but is not present in an scache therebelow. Therefore, such a case is impossible.

[4. Reply to WWI]

(a-1) When status of a hit entry is EXC; Data of the WWI command is written in this entry, and the status of this entry is changed to be NON. An ack signal is sent back onto the cache-bus as a reply.

(a-2) When status of a hit entry is other than EXC; Since there can be no entry having an ownership in fcaches above the scache in status other than EXC, such a case is impossible.

(b) When an entry misses a command; If this case is established, this means that there is an entry which is present in an fcache but is not present in an scache therebelow. Therefore, such a case is impossible.

The replacing operation in the scache is executed as follows.

In order to maintain consistency among caches, there is a limitation that all the entries present in an fcache must be present in the corresponding scache. In order to realize this limitation, a total of entries of fcaches connected to one scache through the cache-bus must be smaller than or equal to that of the scache. As an entry to be replaced from the scache, an entry which cannot be present in the fcaches above the scache must be selected. In order to select such an entry, the replacing information in the tag section of the scache includes information indicating fcaches which use this entry.

In the scache, whether or not the copy-back operation is necessary is determined in accordance with the status of the entry to be replaced from the scache as in the fcache described above.

[1] When an entry to be replaced is INV or UNO; No copy-back operation is executed.

[2] When an entry to be replaced is EXC; When an entry in the scache is EXC, corresponding entries must be present in the fcaches connected to this scache, and this entry can never be selected as one to be replaced.

[3] When an entry to be replaced is NON; The WWI command is issued onto the memory-bus, thereby copying back the content of the entry to the memory.

A reply from the scache in response to a command from the memory-bus is performed as follows. With this reply, the memory-bus is monitored by a cache memory bus controller in the scache, and a predetermined operation is executed in accordance with status of an entry corresponding to an address in a command on the memory bus.

The command on the memory-bus holds an entry corresponding to the address, and the entry is present in the scache, and the status of the entry is not INV. "Hit" represents this case. "Miss" represents that the above-mentioned entry is not present, or its status is INV if it is present. When an entry misses a command, the scache merely sends back an ack signal as a reply to the memory-bus.

When an entry hits a command, the following operations are executed according to commands on the memory-bus.

Since a new entry need not be assured in the scache in response to a command on the memory-bus, the replacing command is not necessary. Information indicating fcaches above the scache which use the entry is present in each entry of the scache. When an entry is used by none of fcaches above the scache, no command need be issued to the fcaches thereabove. A cache signal on the memory-bus is used for controlling the memory not to reply while caches reply. When this signal is asserted, the memory sends back only an ack signal onto the memory-bus.

[1. Reply to RSH]

(a) When status of a hit entry is EXC; The cache signal on the memory-bus is asserted to inhibit the memory from replying. Since data in a corresponding entry in an fcache thereabove is different from that in this entry, the FWI command is issued onto the cache-bus to copy the data in the fcache to the scache, and its reply data is written in this entry. As a reply to the RSH command, data of the entry is sent back onto the memory-bus. The status of this entry is set to be NON, and an ack signal is sent back onto the memory-bus.

(b) When status of a hit entry is NON; The cache signal on the memory-bus is asserted. Data of this entry is supplied to an scache which requests the data. In this case, the status of the entry is left unchanged, and an ack signal is sent back onto the memory-bus.

(c) When status of a hit entry is UNO; An ack signal is sent back onto the memory-bus.

[2. Reply to RFO]

(a) When status of a hit entry is EXC; The cache signal on the memory-bus is asserted to inhibit the memory from replying. Since data in a corresponding entry in an fcache thereabove is different from that in this entry, the FAI command is issued onto the cache-bus to copy the data in the fcache to the scache, and its reply data is written in this entry. As an effect of issuance of the FAI command, the fcache is invalidated. Data of the entry is sent back onto the memory-bus as a reply to the RFO command, and the status of the entry is changed to be INV. An ack signal is sent back onto the memory-bus.

(b) When status of a hit entry is NON; If there is a possibility of presence of a corresponding entry in an fcache above this scache, the WFI command is issued onto the cache-bus. As a reply to the RFO request, data of this entry is sent back onto the memory-bus. The status of this entry is changed to be INV, and an ack signal is sent back onto the memory-bus (c) When status of a hit entry is UNO; If there is a possibility of presence of a corresponding entry in an fcache above this scache, the WFI command is issued onto the cache-bus. The status of this entry is changed to be INV, and an ack signal is sent back onto the memory-bus.

[3. Reply to WFI]

(a) When status of a hit entry is EXC; This case means that another scache has a corresponding entry. However, this case is impossible.

(b) When status of a hit entry is NON; If there is a possibility of presence of a corresponding entry in an fcache above this scache, the WFI command is issued onto the cache-bus. The status of this entry is changed to be INV, and an ack signal is sent back onto the memory-bus.

(c) When status of a hit entry is UNO; If there is a possibility of presence of a corresponding entry in an fcache above this scache, the WFI command is issued onto the cache-bus. The status of this entry is changed to be INV, and an ack signal is sent back onto the memory-bus.

[4. Reply to WWI]

(a) When status of a hit entry is EXC; This case means that a corresponding entry in another scache has an ownership. However, this case is impossible.

(b) When status of a hit entry is NON; This case means that a corresponding entry in another scache has an ownership. However, this case is impossible.

(c) When status of a hit entry is UNO; An ack signal is sent back onto the memory-bus.

When an impossible case occurs in the system, the system is interrupted since it is caused by a malfunction of hardware.

The operation of the scache will be described below with reference to the arrangement of the scache shown in FIG. 5.

A command from the cache-bus is supplied to an scache cache-bus controller Sc2 through a cache-bus interface Sc1. The cache-bus controller Sc2 looks up a cache tag memory Sc4 to check if a cache hits an input address, and executes predetermined operations according to the status of an entry.

Access to a data section is executed in a cache data memory Sc5 at the address given by the cache tag memory Sc4. An entry to be replaced is determined by a replacing logic Sc3. If a copy-back operation is necessary, the entry is copied back from the cache data memory Sc5 onto the memory-bus BM1 through the cache-bus interface Sc7 in response to the WWI command upon instruction from the replacing logic Sc3.

When a command is issued onto the memory-bus BM1 in response to the command on the cache-bus, a command is issued from the cache-bus controller Sc through the cache-bus interface Sc7. As a result, read-out data is written in the cache data memory Sc5 through the cache-bus interface Sc7.

When a tag section of the entry is rewritten in response to the command on the cache-bus, updating data is written from the cache-bus controller Sc2 in the cache tag memory Sc4.

A command from the memory-bus is supplied to an scache memory-bus controller Sc6 through the memory-bus interface Sc7. The scache memory-bus controller Sc6 looks up the cache tag memory Sc4 to check if a cache hits an input address, and executes predetermined operations in accordance with the status of the entry.

When an fcache connected above the scache is to be flushed, a command is issued from the scache memory-bus controller Sc6 onto the cache-bus C1 via the cache-bus interface Sc1, and the cache tag memory Sc5 is rewritten in accordance with a reply thereto.

As a reply to the fetch operation, data is read out from the cache data memory Sc5, and is sent back onto the memory-bus B1 through the memory-bus interface Sc7. In this case, the tag section of the entry is written in the tag memory Sc4 by the controller Sc6.

When the WFI command must be issued onto the cache-bus, the scache memory-bus controller Sc6 issues it onto the cache-bus C1 via the cache-bus interface Sc1.

The operations of the scache have been described

The main-memories connected to the above-mentioned hierarchical cache memory apparatus will be described below. The main-memory replies to a command on the memory-bus. Unlike in the cache memory apparatus, this main-memory will not miss a command. When the cache signal on the memory-bus is asserted, each scache replies to this command, and the main-memory itself must not reply.

The main-memory replies to the following four commands on the memory-bus.

[1. Reply to RSH]

When the cache signal is not asserted, the main-memory sends back data onto the memory-bus, and also sends back an ack signal thereonto.

[2. Reply to RFO]

When the cache signal is not asserted, the main-memory sends back data onto the memory-bus, and also sends back an ack signal thereonto.

[3. Reply to WFI]

The main-memory sends back an ack signal onto the memory-bus.

[4. Reply to WWI]

The main-memory writes data therein, and sends back an ack signal onto the memory-bus.

FIG. 6 is a block diagram showing an arrangement of the main-memory. The main-memory of this type monitors commands on the above-mentioned memory-bus through a memory-bus interface M11. Based on whether or not an address of a command and a cache signal appear, the memory-bus interface M11 determines whether or not data is to be read out from a data storage memory M12. Data read out from the data storage memory M12 is sent to the memory-bus BM1 through the memory-bus interface M11. The memory-bus interface M11 serves to send back an ack signal onto the memory-bus BM1. A memory controller M13 controls the memory-bus interface M11, and the data storage memory M12.

In the hierarchical cache memory apparatus according to the present invention, the fcaches and scaches with the above-mentioned arrangements are constructed, as shown in FIG. 1, and their operations are controlled in accordance with statuses of respective sections, so that a cache operation for a corresponding processor can be executed.

The detailed operations of the hierarchical cache memory apparatus with the above-mentioned architecture in the system will be described below with reference to FIGS. 7A to 7L.

FIG. 7A is a diagram showing a first read operation [read example 1] from a processor. This operation is executed in the following sequence.

<1> A read request is issued from the processor $P_{11}$ to the fcache $F_{11}$.

<2> When the fcache $F_{11}$ misses access according to this read request,

<3> the fcache $F_{11}$ issues the RSH command onto the cache-bus C1.

<4> When the scache $S_1$ also misses access according to this RSH command,

<5> the scache $S_1$ issues the RSH command onto the memory-bus B1.

<6> The main-memory M1 reads out data in response to the RSH command, and replies to this RSH command.

<7> The scache $S_1$ loads the readout data, and its status is updated from INV to UNO.

<8> The scache $S_1$ sends the data onto the cache-bus C1 as a reply to the RSH in <3>.

<9> The fcache $F_{11}$ loads the data on the cache-bus C1, and its status is updated from INV to UNO.

<10> Finally, the data acquired as described above is sent from the fcache $F_{11}$ to the processor $P_{11}$. As a result, this data can be utilized by the processor $P_{11}$ as a request source.

FIG. 7B is a diagram showing a second read operation [read example 2] from a processor. This operation is executed in the following sequence.

<1> A read request is issued from the processor $P_{11}$ to the fcache $F_{11}$.

<2> When the fcache $F_{11}$ misses access according to this read request,

<3> the fcache $F_{11}$ sends the RSH command onto the cache-bus C1.

<4> In response to the RSH command, an arbitrary fcache, e.g., $F_{14}$ sends back corresponding data onto the cache-bus C1 as a reply, and its status is updated from EXC to UNO.

<5> The fcache $F_{11}$ loads the data, and its status is updated from INV to UNO.

<6> The fcache sends the data to the processor $P_{11}$ as a request source.

Figure 7C:
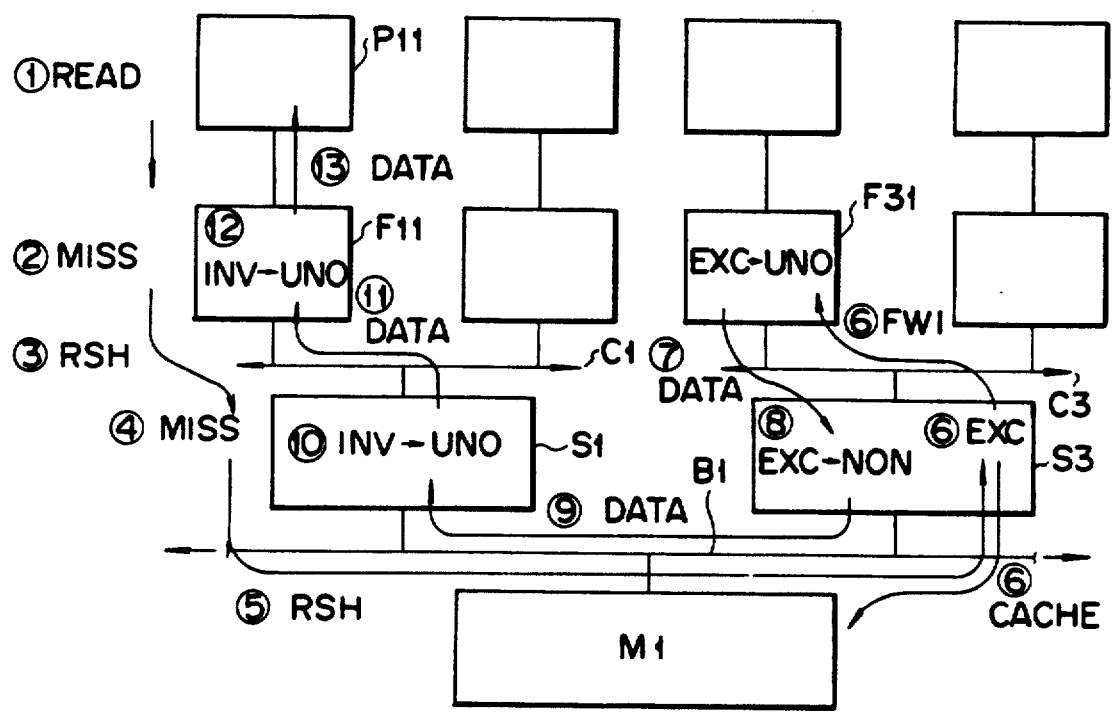

FIG. 7C is a diagram showing a third read operation [read example 3] from a processor. This operation is executed in the following sequence.

<1> A read request is issued from the processor $P_{11}$ to the fcache $F_{11}$.

<2> When the fcache $F_{11}$ misses access according to this read request,

<3> the fcache $F_{11}$ sends the RSH command onto the cache-bus C1.

<4> Furthermore, when the scache $S_1$ misses the same access,

<5> the scache $S_1$ sends the RSH command onto the memory-bus B1.

<6> As a result, when EXC of an arbitrary scache, e.g., $S_3$ hits the RSH command, it sends the cache signal onto the memory-bus B1 to inhibit the main-memory M1 from replying. At the same time, the scache $S_3$ issues the FWI command onto the cache-bus C3.

<7> the fcache $F_{31}$ sends data onto the cache-bus as a reply to the FWI command, and its status is updated from EXC to UNO.

<8> The scache $S_3$ loads the data on the cache-bus C3, and its status is updated from EXC to NON.

<9> Thereafter, the scache $S_3$ sends data onto the memory-bus B1 as a reply to <5>.

<10> The scache $S_1$ loads the data on the memory-bus B1, and its status is updated from INV to UNO.

<11> The scache $S_1$ sends the data onto the cache-bus C1 as a reply to <3>.

<12> The fcache $F_{11}$ loads this data from the cache-bus C1, and its status is updated to UNO.

<13> Finally, the data is sent to the processor $P_{11}$ as a request source.

Figure 7D:
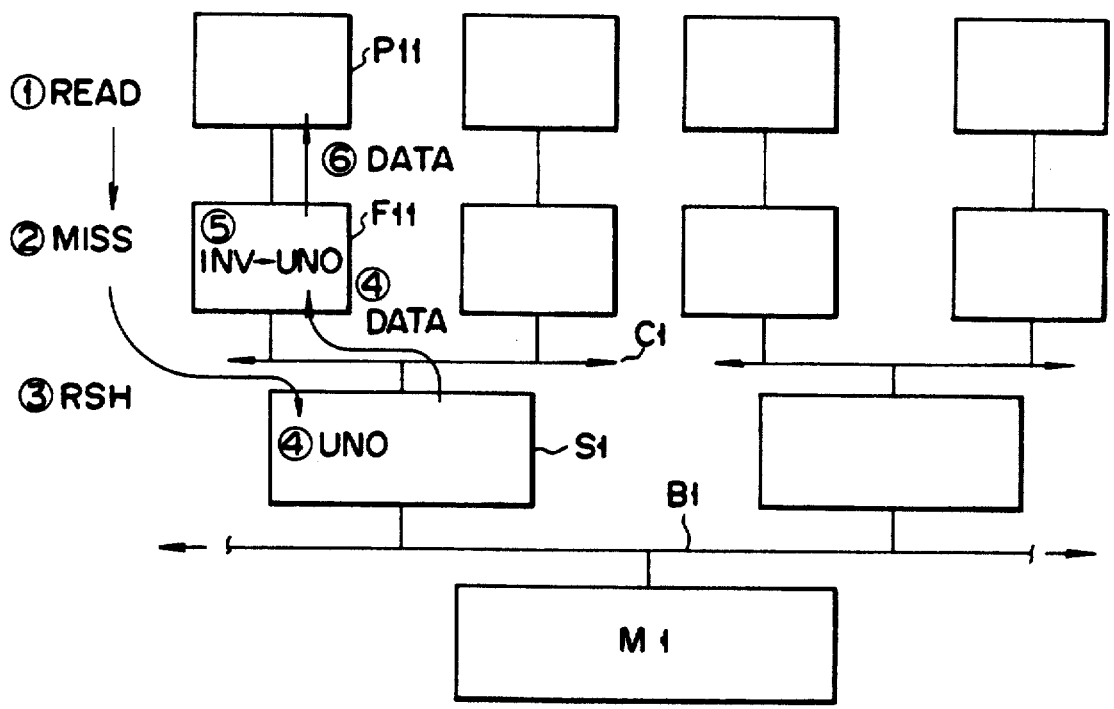

FIG. 7D is a diagram showing a fourth read operation [read example 4] from a processor. This operation is executed in the following sequence.

<1> A read request is issued from the processor $P_{11}$ to the fcache $F_{11}$.

<2> When the fcache $F_{11}$ misses the request,

<3> the fcache $F_{11}$ issues the RSH command onto the cache-bus C1.

<4> When UNO of the scache $S_1$ hits this RSH command, this data is sent onto the cache-bus C1 as a reply to <3>.

<5> The fcache $F_{11}$ loads the data from the cache-bus C1, and its status is updated from INV to UNO.

<6> Finally, the data is sent from the fcache $F_{11}$ to the processor $P_{11}$ as a request source.

Figure 7E:
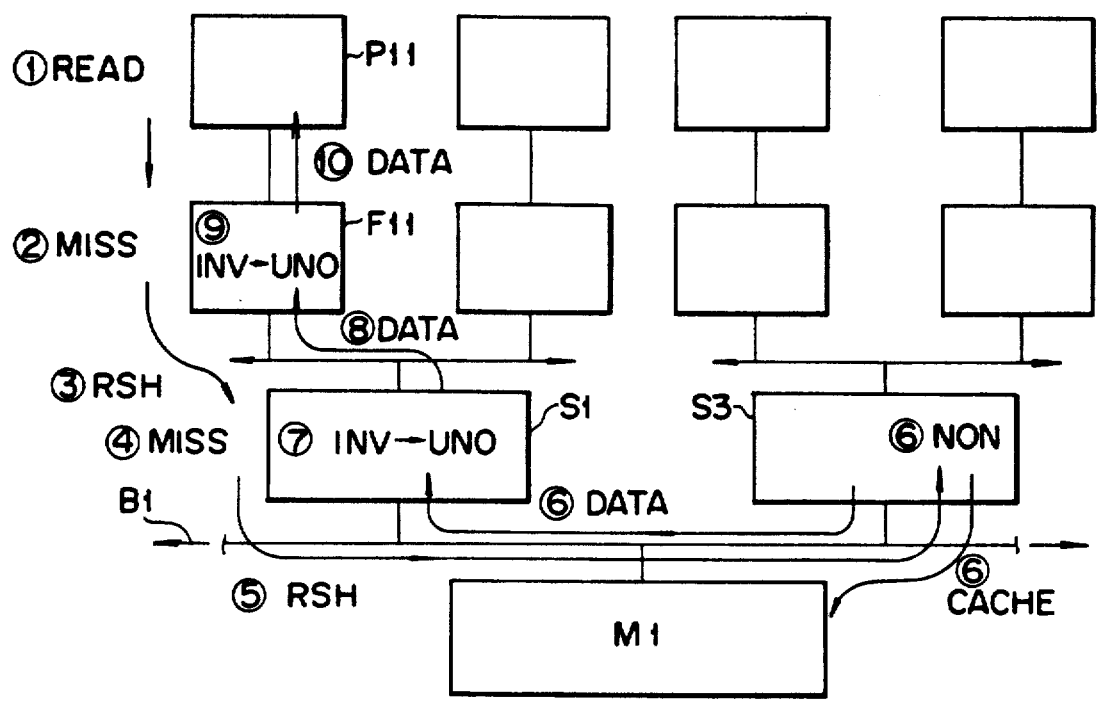

FIG. 7E is a diagram showing a fifth read operation [read example 5] from a processor. This operation is executed in the following sequence.

<1> A read request is issued from the processor $P_{11}$ to the fcache $F_{11}$.

<2> When the fcache $F_{11}$ misses access,

<3> the fcache $F_{11}$ issues the RSH command onto the cache-bus C1.

<4> When the scache $S_1$ also misses access,

<5> the scache $S_1$ sends the RSH command onto the memory-bus B1.

<6> When, for example, NON of the scache $S_3$ hits the RSH command, the scache $S_3$ sends corresponding data onto the memory-bus B1 as a reply to <5>. In this case, the scache S3 asserts the cache signal on the memory-bus B1 to inhibit the main-memory M1 from replying.

<7> The scache $S_1$ loads the data from the memory-bus B1, and its status is updated from INV to UNO.

<8> The scache $S_1$ sends the data onto the cache-bus C1 as a reply to <3>.

<9> The fcache $F_{11}$ loads the data from the cache-bus C1, and its status is updated from INV to UNO.

<10> Finally, the data is sent from the fcache $F_{11}$ to the processor $P_{11}$ as a request source.

Figure 7F:
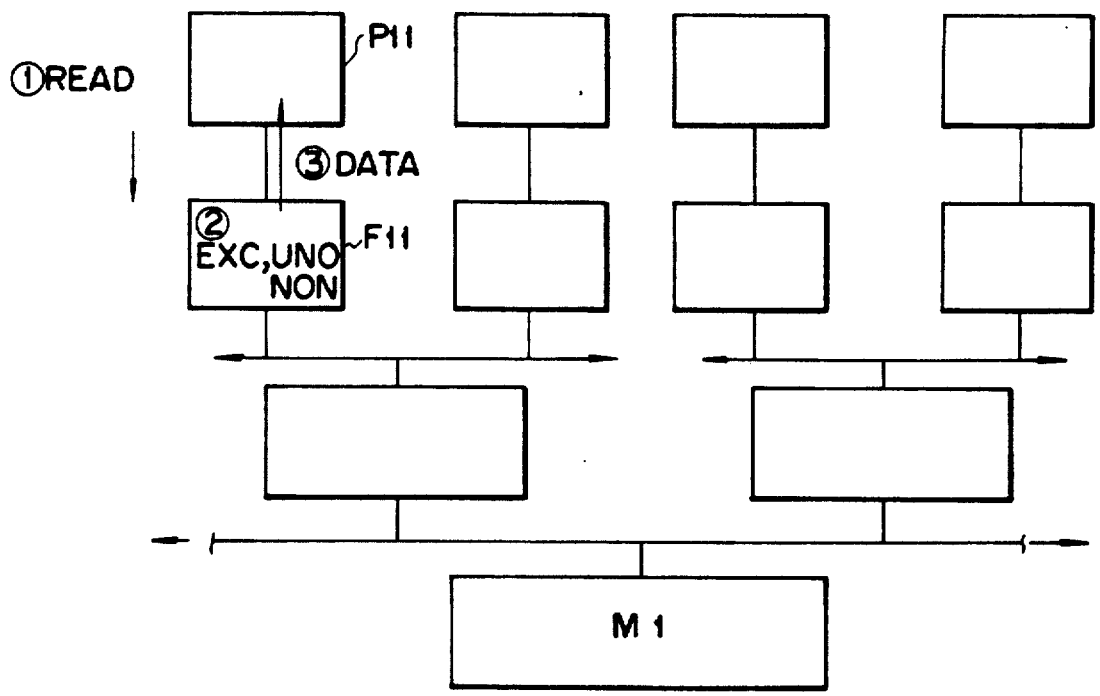

FIG. 7F is a diagram showing a regular read operation [read example 6].

<1> A read request is issued from the processor $P_{11}$ to the fcache $F_{11}$.

<2> When one of EXC, NON, and UNO of the fcache $F_{11}$ hits the request,

<3> the fcache $F_{11}$ directly sends the corresponding data to the processor $P_{11}$ as a request source.

The operations in response to the read request from the processor in this apparatus have been described.

Operations in response to a write request from the processor will be described below.

Figure 7G:
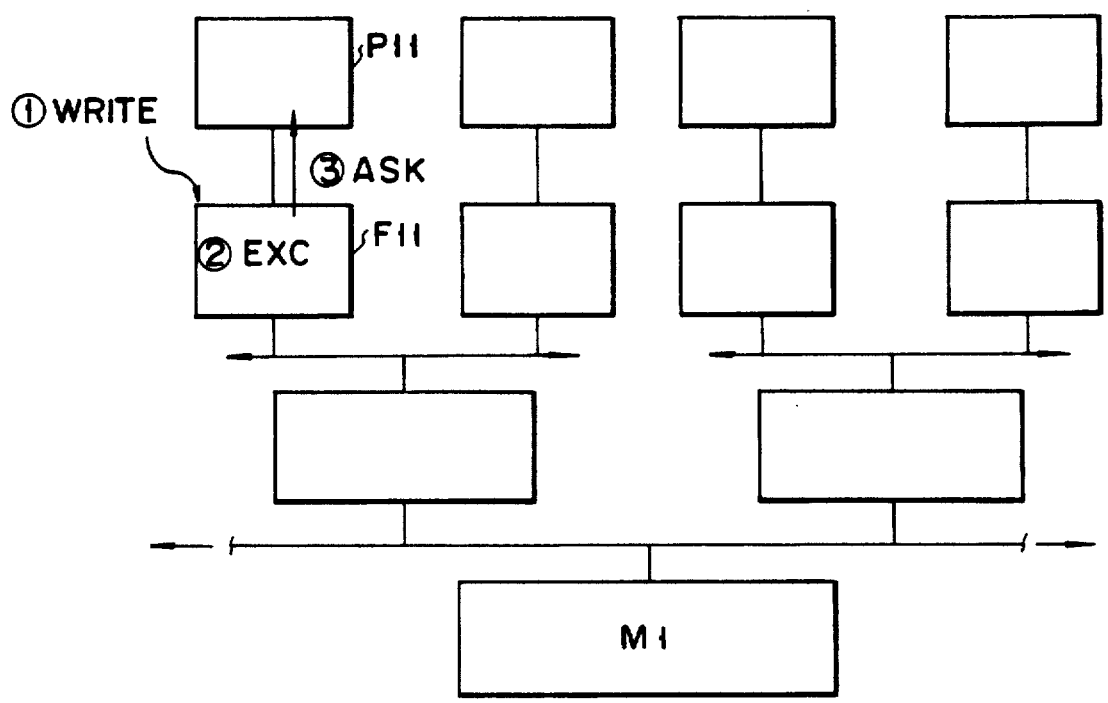

FIG. 7G is a diagram showing a first write operation [write example 1], and this operation is executed in the following sequence.

<1> The processor $P_{11}$ issues a write request to the fcache $F_{11}$.

<2> When EXC of the fcache $F_{11}$ hits this request,

<3> the write operation is executed in the fcache $F_{11}$, and an ack signal is sent back to the processor $P_{11}$ as a request source, thus ending the write operation.

Figure 7H:
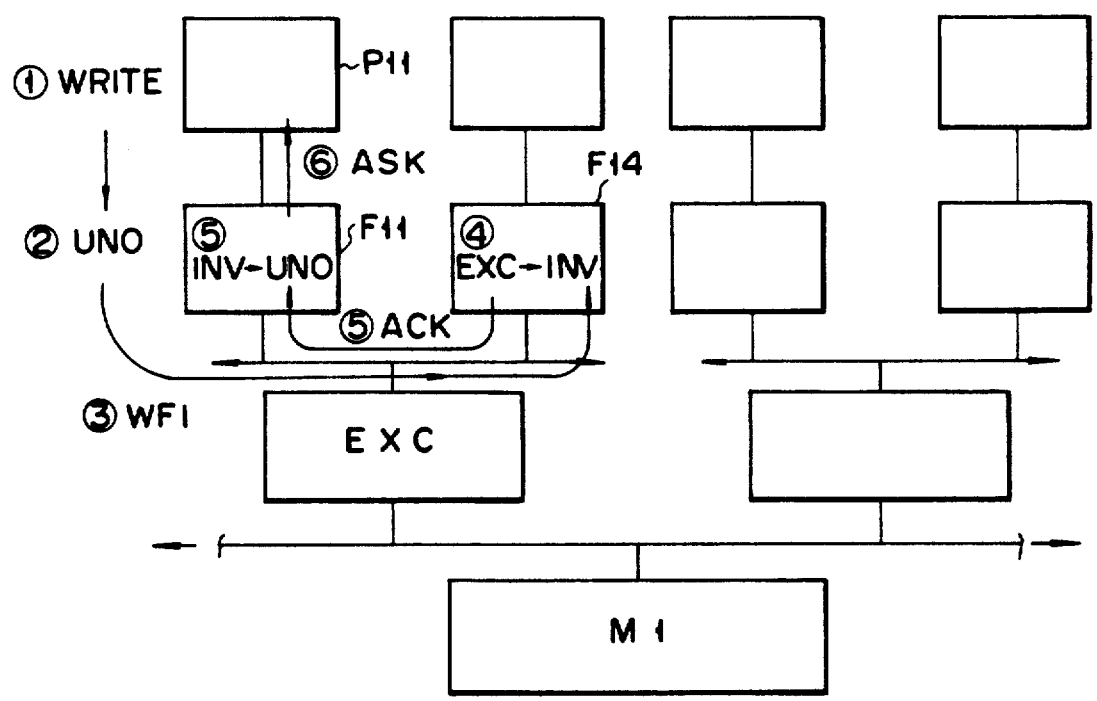

FIG. 7H is a diagram showing a second write operation [write example 2], and this operation is executed in the following sequence.

<1> The processor $P_{11}$ issues a write request to the fcache $F_{11}$.

<2> When UNO of the fcache $F_{11}$ hits this request,

<3> the fcache $F_{11}$ issues the WFI command onto the cache-bus C1.

<4> Upon execution of this command, when the fcache F14 hits the WFI command, its status is updated from NON to INV. An ack signal is sent back onto the cache-bus C1 as a reply to <3>. In this case, since the status of the scache $S_1$ is EXC, only the ack signal is replied.

<5> The fcache $F_{11}$ receives the ack signal, and its status is updated from UNO to EXC.

<6> As a result, the fcache $F_{11}$ executes a write operation, and the ack signal is returned to the processor $P_{11}$ as a request source.

FIG. 7I is a diagram showing a third write operation [write example 3], and this operation is executed in the following sequence.

<1> The processor $P_{11}$ issues a write request to the fcache $F_{11}$.

<2> When UNO of the fcache $F_{11}$ hits this request, the fcache $F_{11}$ issues the WFI command onto the cache-bus C1.

<3> When NON of the scache $S_1$ hits the WFI command, the scache $S_1$ sends the WFI command onto the memory-bus B1.

<4> When, for example, NON of $S_3$ hits the WFI command, the scache $S_3$ sends the WFI command onto the cache-bus C3.

<5> When, for example, NON of the fcache $F_{34}$ hits this command, the status of the fcache $F_{34}$ is updated to INV, and an ack signal is sent back onto the cache-bus C3 as a reply to the command of <4>.

<6> As a result, the status of the scache S3 is updated from UNO to INV, and an ack signal is sent back onto the memory-bus B1 as a reply to the command of <3>.

<7> The status of the scache $S_1$ is updated from UNO to EXC, and an ack signal is sent back onto the cache-bus C1 as a reply to the command of <2>.

<8> As a result, the status of the fcache $F_{11}$ is updated from UNO to EXC.

<9> The write operation is executed by the fcache $F_{11}$, and an ack signal is returned to the processor $P_{11}$ FIG. 7J shows another write operation [write example 4]. In this case, <1> the processor $P_{11}$ issues a write request to the fcache $F_{11}$, and <2> the fcache $F_{11}$ misses access.

<3> In this case, the fcache $F_{11}$ issues the RFO command onto cache-bus C1.

<4> When, e.g., EXC of the fcache $F_{14}$ hits the RFO command, the fcache $F_{14}$ sends back data onto the cache-bus C1 as a reply to the RFO command of <3>. At the same time, its status is updated to INV, and since the status of the scache $S_1$ is EXC, only an ack signal is returned.

<5> The fcache $F_{11}$ loads the data, and its status is updated from INV to EXC.

<6> Finally, the fcache $F_{11}$ executes write access of the loaded data, and returns an ack signal to the processor $P_{11}$ as a request source.

FIG. 7K shows a fifth write operation [write example 5], and this operation is executed as follows.

<1> The processor $P_{11}$ issues a write request to the fcache $F_{11}$.

<2> When the fcache $F_{11}$ misses access,

<3> the fcache $F_{11}$ sends the RFO command onto the cache-bus C1.

<4> When the scache $S_1$ also misses access,

<5> the scache $S_1$ sends the RFO command onto the memory-bus B1.

<6> The main-memory M1 sends back data onto the memory-bus B1 as a reply to <5>.

<7> The scache $S_1$ loads data from the memory-bus, and its status is updated from INV to EXC.

<8> The scache $S_1$ sends data onto the cache-bus C1 as a reply to <3>.

<9> As a result, the fcache $F_{11}$ loads this data from the cache-bus C1, and its status is updated from INV to EXC.

<10> The fcache $F_{11}$ executes write access of the loaded data, and returns an ack signal to the processor $P_{11}$.

FIG. 7L shows a sixth write operation [write example 6].

<1> The processor $P_{11}$ issues a write request to the fcache $F_{11}$.

<2> When the fcache $F_{11}$ misses access,

<3> the fcache $F_{11}$ issues the RFO command onto the cache-bus C1.

<4> Furthermore, when the scache $S_1$ misses the RFO command,

<5> the scache $S_1$ sends the RFO command onto the memory-bus B1.

<6> When EXC of the scache $S_3$ hits the RFO command, the scache $S_3$ asserts a cache signal on the memory-bus B1 to inhibit the main-memory M1 from replying. At the same time, the scache $S_3$ sends the FAI command onto the cache-bus C3.

<7> When, e.g., EXC of the fcache $F_{34}$ hits the FAI command, the fcache $F_{34}$ supplies data onto the cache-bus C3 as a reply to <6>. The status of the fcache $F_{34}$ is updated to INV.

<8> The scache $S_3$ loads the data on the cache-bus, and sends back this data onto the memory-bus as a reply to <5>. The status of the scache $S_3$ is updated from EXC to INV.

<9> The scache $S_1$ loads the data on the memory-bus, and sends the data onto the cache-bus as a reply to <3>. At the same time, the status of the scache is updated from INV to EXC.

<10> As a result, the fcache $F_{11}$ loads this data on the cache-bus, and its status is updated from INV to EXC.

<11> The fcache $F_{11}$ executes write access to the loaded data, and sends an ack signal to the processor $P_{11}$ as a request source.

The read and write operations of the processor in the hierarchical cache memory apparatus with the above-mentioned arrangement have been described.

The second embodiment which separately includes a command cache memory as a modification of the first embodiment will be described below.

Figure 8:
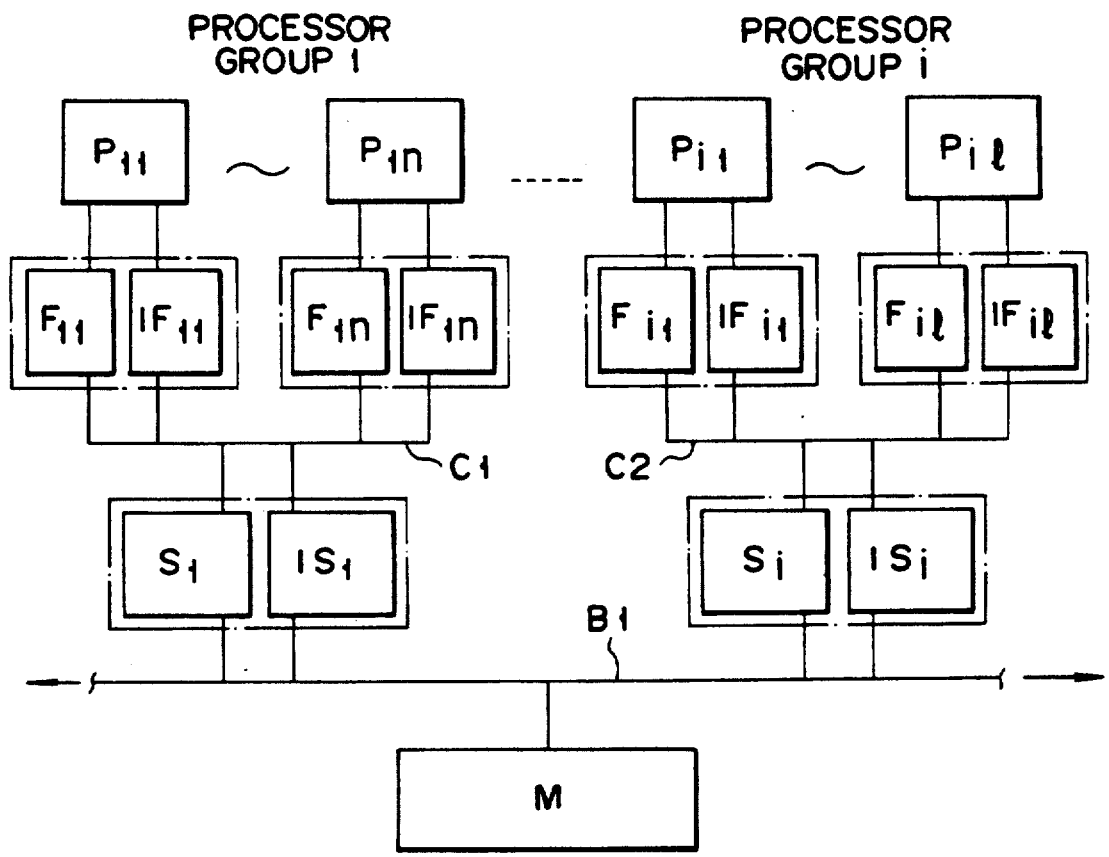
FIG. 8 is a schematic block diagram of the entire system according to the second embodiment of the present invention.

As shown in FIG. 8, according to the characteristic feature of the apparatus of the second embodiment, command cache memories are disposed in each of the fcaches and scaches independently from the data cache memory.

More specifically, processors $P_{11}, \ldots, P_{1n}, \ldots, P_{i1}, \ldots, P_{il}$ are connected to data cache memories $F_{11}, \ldots, F_{1n}, \ldots, F_{i1}, \ldots, F_{il}$ and command cache memories $IF_{11}, \ldots, IF_{1n}, \ldots, IF_{i1}, \ldots, IF_{il}$ which are paired as fcaches with the corresponding data cache memories. These fcaches are connected to cache-buses C1 and C2 as in the above embodiment. Scaches are disposed in the second stage by combining data cache memories $S_1$ to $S_i$ and command cache memories $IS_1$ to $IS_i$ which are paired with these data cache memories. These scaches are connected to cache-buses C1 and C2. These scaches are commonly connected in parallel with a memory-bus B1. The memory-bus B1 is connected to a memory M1. As a whole, a cache memory apparatus having a hierarchical structure is constituted.

In the following description, the command cache memories of the first stage will be referred to as i-fcaches hereinafter, and the command cache memories of the second stage will be referred to as i-scaches hereinafter. The processor cannot write data in each command cache. However, the command cache can be invalidated by a system command.

Each processor loads a command from the corresponding command i-fcache, and executes access of data in the corresponding data fcache. Furthermore, these command caches use the same buses as the data caches.

In this embodiment, address area held by a command cache is not frequently subjected to write access. Therefore, in order to reduce a hardware volume for maintaining consistency, when data is written at an address at which its copy is present in the command cache, the copy in the command cache is not invalidated. In other words, no snoop operation is executed for the command cache.

However, when a new program is loaded, the command caches must be invalidated. Such invalidation can be realized by issuing an invalidation command from a system to the command caches below the processor which executes the loaded program. For example, when the processor $P_{11}$ executes a newly loaded program, an invalidation command is sent to the command caches $IF_{11}$ and $IS_1$ corresponding to this processor $P_{11}$.

According to the apparatus of this embodiment, in order to execute an instruction string written and executed by a processor, only the i-fcache and the i-scache therebelow of the processor need be invalidated, as will be described later.

The function of the i-fcache of the first stage will be described below. An entry of this i-fcache consists of address information indicating an address to which an entry belongs, status information indicating whether or not the entry is valid, and a data section. The two former information sections constitute a tag section (FIG. 4).

The i-fcache of the first stage can take the following two statuses.

[1] I (Invalid); A data section of this entry is invalid.

[2] V (Valid); A data section of this entry is valid.

The i-fcache his a request when an address of a tag section of an entry is equal to the requested address, and the entry has the status V; otherwise, miss occurs.

The i-fcache can be replaced without requiring a copy-back operation since no data can be written in the i-fcache by the processor.

A bus command IFC is added to the cache-bus since the i-fcache is added (IFC: Instruction-Fetch (address); a command for loading a cache block indicated by an address to the i-fcache).

The i-fcache replies to a request from the processor as follows.

(a-1) When a processor fetches an instruction and the i-fcache hits the fetch Data in the i-fcache is returned to the processor.

(a-2) When a processor fetches an instruction and the i-fcache misses the fetch; The i-fcache issues the IFC command onto the cache-bus to load data, and the processor fetches the data.

(b) When a processor executes an operation other than the fetch operation; The i-fcache does not reply.

On the other hand, the fcache replies to the IFC command as follows.

(a-1) When the commend hits the entry having a status "EXC"; Data is read out onto the cache-bus, and the cache signal on the cache-bus is asserted. Note that the cache signal on the cache-bus is a signal for inhibiting the i-scache from replying. Status is not updated, and an ack signal is returned.

(a-2) When the command hits the entry having a status "NON"; Data is read out onto the cache-bus, and the cache signal on the cache-bus is asserted. Status is not updated, and an ack signal is returned.

(a-3) When the command hits the entry having a status "NON"; Since the i-scache replies, no reply is made in this case, and only an ack signal is returned.

(b) When the fcache misses the command; An ack signal is sent back, and no replacing operation is executed.

In this embodiment added with the instruction caches, a cache signal line of the cache-bus is used. When the fcache sends data onto the cache-bus as a reply to a bus command, it must assert a cache signal to inhibit the i-scaches from replying.

The operation of the i-fcache will be described below with reference to FIG. 9.

A fetch request of an instruction from the processor $P_{11}$ is processed by the i-fcache ($IF_{11}$), and access of data from the processor $P_{11}$ is processed by the fcache ($DF_{11}$).

The instruction fetch request is input to a processor interface $IF_{111}$. The processor interface $IF_{111}$ looks up an i-fcache tag memory $IF_{112}$ to check if the i-fcache hits the request. If the i-fcache hits the request, corresponding data is supplied from an i-fcache data memory $IF_{113}$ to the processor $P_{11}$ through the processor interface $IF_{111}$.

When the i-fcache misses the request, the IFC command is supplied to the cache-bus C1 through a cache-bus interface $IF_{114}$. Data obtained as a result of this command is stored in the i-fcache data memory $IF_{113}$. At the same time, the entry of the i-fcache tag memory $F_{113}$ is rewritten.

Note that an i-fcache controller $IF_{115}$ controls these components.

In order to execute an instruction string newly loaded from a processor in the system or another peripheral device, an entry of the i-fcache corresponding to the address of the instruction string must be invalidated. This invalidation can be achieved by invalidating status information of the corresponding entry in the i-fcache tag memory $IF_{112}$. In this case, only an ack signal is sent back in response to a command on the cache-bus.

The i-scache of the second stage includes the following components.

An entry of the i-scache consists of address information indicating an address to which an entry belongs, status information indicating whether or not the entry is valid, and a data section. A combination of these information sections is called a tag section.

The i-scache takes the following two statuses as in the i-fcaches of the first stage.

[1] I (Invalid); A data section of this entry is invalid.
[2] V (Valid); A data section of this entry is valid.

The i-scache hits a request when an address of a tag section of an entry is equal to the requested address, and the entry has the status V; otherwise, miss occurs.

Non copy-back operations of the i-scache are required since the i-scache is not subjected to write access.

Since the i-scaches are added, one command IFC is added to the memory-bus (IFC: Instruction-Fetch (address); a command for loading a cache block indicated by an address to the i-fcache).

(a) The i-scache replies to a request from the cache-bus as follows.

(a-1) When the i-scache hits the IFC command and a cache signal on the cache-bus is not asserted; Data in an entry is transferred onto the cache-bus, and an ack signal is sent back without updating status.

(a-2) When the i-scache misses the IFC command and a cache signal on the cache-bus is not asserted; The IFC command is issued onto the memory-bus to load data. The status of the i-scache is updated to V, data is transfered onto the cache-bus, and an ack signal is sent back.

(a-3) When the i-scache hits the IFC command and a cache signal on the cache-bus is asserted; Since in this case an fcache thereabove replies to the IFC command, only an ack signal is sent back.

(b) When a command other than the IFC command is issued; The i-scache does not reply, and sends back only an ack signal.

On the other hand, the scache does not reply to the IFC command on the cache-bus. The i-scache does not reply to a command on the memory-bus, and sends back only an ack signal.

The scache replies as follows in response to the IFC command on the memory-bus.

(a-1) When the command hit the entry having a status "EXC"; The cache signal is asserted to inhibit the memory from replying. Since the scache has a content different from that of the fcaches thereabove, it sends the FWI command onto the cache-bus to cause data of this entry to coincide with that of the fcaches. Thereafter, the scache returns data onto the memory-bus to reply to the IFC command. The status is updated to NON, and an ack signal is sent back.

(a-2) When the command hit the entry having a status "EXC"; The cache signal on the cache-bus is asserted to inhibit the memory from replying. The scache transfers data onto the memory-bus to reply to the IFC command. In this case, an ack signal is sent back without updating status.

(a-3) When UNO hits a command; Only an ack signal is sent back without replying.

(b) When the scache misses the command; Only an ack signal is sent back without replying.

The arrangement and operations of the i-scache will be described below with reference to FIG. 10.

In the scaches of the second stage, when a command on the cache-bus C1 is the IFC command, the i-scache $IS_1$ replies, and when a command is other than the IFC. Both the scaches $IS_1$ and $S_1$ send back an ack signal to the command on the cache-bus C1 corresponding to scache $S_1$.

In response to the IFC command, a cache-bus interface $IS_{11}$ looks up an i-scache tag memory $IS_{12}$ to check if the i-scache hits the command.

When the i-scache hits the command and the cache signal on the cache-bus C1 is not asserted, data is read out from an i-scache data memory $IS_{13}$, and the cache-bus interface $IS_{11}$ sends it back onto the cache-bus C1.

On the other hand, when the i-scache misses the command and the cache signal on the cache-bus C1 is not asserted, the IFC command is sent onto the memory-bus B1 through a memory-bus interface $IS_{14}$. A reply to this IFC command is written in an i-scache data memory $IS_{13}$ through the memory-bus interface $IS_{14}$. At this time, the content of the entry in an i-scache tag memory $IS_{12}$ is rewritten.

When the i-scache misses the command and the cache signal is asserted, only an ack signal is returned from the cache-bus interface $IS_{11}$. No reply is made to a command on the memory-bus B1, and only an ack signal is sent back.

Note that an i-scache controller $IS_{15}$ controls these components.

In order to execute an instruction string newly loaded from a processor in the system or another peripheral device, invalidation of an entry of the i-scache corresponding to the address of the instruction string is achieved by invalidating status information of the corresponding entry of the i-scache tag memory $IS_{12}$.

The memory replies to the IFC command by sending back data if the cache signal on the memory-bus B1 is not asserted. In this case, the memory simultaneously sends back an ack signal. When the cache signal on the memory-bus B1 is asserted, the memory sends back only an ack signal. For other replies, the IFC command is handled in the same manner as other memory-bus commands like in the first embodiment.

The detailed operations of the apparatus of this embodiment will be described below with reference to FIGS. 11A to 11F.

FIG. 11A is a diagram showing a fetch operation [fetch example 1] from a processor, and this operation is executed as follows.

<1> When the processor $P_{11}$ issues a fetch request, and

<2> the i-fcache $IF_{11}$ hits the fetch request,

<3> the i-fcache $IF_{11}$ transfers data to the processor $P_{11}$ to complete the processing.

FIG. 11B is a diagram showing a fetch operation [fetch example 2], and this operation is executed as follows.

<1> When the processor $P_{11}$ issues a fetch request, and

<2> the i-fcache $IF_{11}$ misses the fetch request,

<3> the i-fcache $IF_{11}$ sends the IFC command onto the cache-bus C1.

<4> When NON of the fcache $F_{11}$ hits this IFC commands,

<5> the fcache $F_{11}$ sends data onto the cache-bus C1 as a reply to <3>, and asserts the cache signal.

<6> The i-fcache $IF_{11}$ loads this data, and writes it in its entry.

<7> The i-fcache $IF_{11}$ transfers the data to the processor $P_{11}$ to complete the fetch operation.

FIG. 11C shows a fetch operation [fetch example 3].

<1> When the processor $P_{11}$ issues a fetch request, and

<2> the i-fcache $IF_{11}$ misses this request,

<3> the i-fcache $IF_{11}$ issues the IFC command onto the cache-bus C1.

<4> When the i-scache $IS_1$ also misses the IFC command,

<5> the i-scache $IS_1$ sends the IFC command onto the memory-bus B1.

<6> As a result, the memory M1 sends data onto the memory-bus B1 as a reply to <5>.

<7> The i-scache $IS_1$ loads data from the memory-bus B1, and writes it in its entry.

<8> The i-scache $IS_1$ sends the data onto the cache-bus C1 as a reply to <3>.

<9> The i-fcache $IF_{11}$ loads the data from the cache-bus C1, and writes it in its entry.

<10> The i-fcache $IF_{11}$ transfers the data to the processor $P_{11}$ as a request source, thus completing the fetch operation.

FIG. 11D shows a fourth fetch operation [fetch example 4].

<1> When the processor $P_{11}$ issues a fetch request, and

<2> the i-fcache $IF_{11}$ misses the request,

<3> the i-fcache $IF_{11}$ issues the IFC command onto the cache-bus C1.

<4> When, for example, EXC of the fcache $F_{13}$ hits the IFC command,

<5> the fcache $F_{13}$ sends the data onto the cache-bus C1 as a reply to <3>, and at the same time, asserts the cache signal.

<6> As a result, the i-fcache $IF_{11}$ loads the data from the cache-bus, and writes it in its entry.

<7> The i-fcache $IF_{11}$ transfers the data to the processor $P_{11}$ as a request source, thus completing the fetch operation.

Figure 11E:
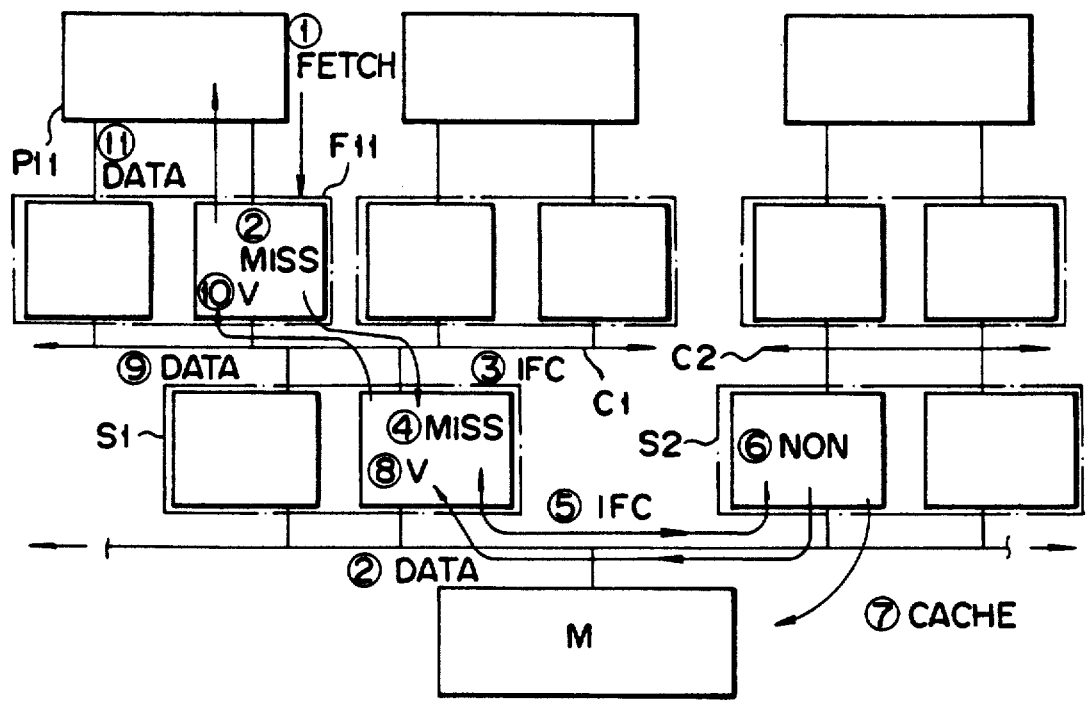

FIG. 11E is a diagram showing a fifth fetch operation [fetch example 5], and this operation is executed as follows.

<1> When the processor $P_{11}$ issues a fetch request, and

<2> the i-fcache $IF_{11}$ misses the request,

<3> the i-fcache $IF_{11}$ issues the IFC command onto the cache-bus C1.

<4> When the i-scache $IS_1$ misses the IFC command,

<5> the i-scache $IS_1$ issues the IFC command onto the memory-bus B1.

<6> When NON of the scache $S_2$ hits the IFC command,

<7> the scache $S_2$ sends corresponding data onto the memory-bus B1 as a reply to <5>, and asserts a cache signal.

<8> As a result, the i-scache $IS_1$ loads the data from the memory-bus B1, and writes it in its entry.

<9> The i-scache $IS_1$ sends the data onto the cache-bus C1 as a reply to <3>.

<10> The i-fcache $IF_{11}$ loads the data from the cache-bus C1, and writes it in its entry.

<11> The i-fcache $IF_{11}$ transfers the data to the processor $P_{11}$ as a request source, thus completing the fetch operation.

Figure 11F:
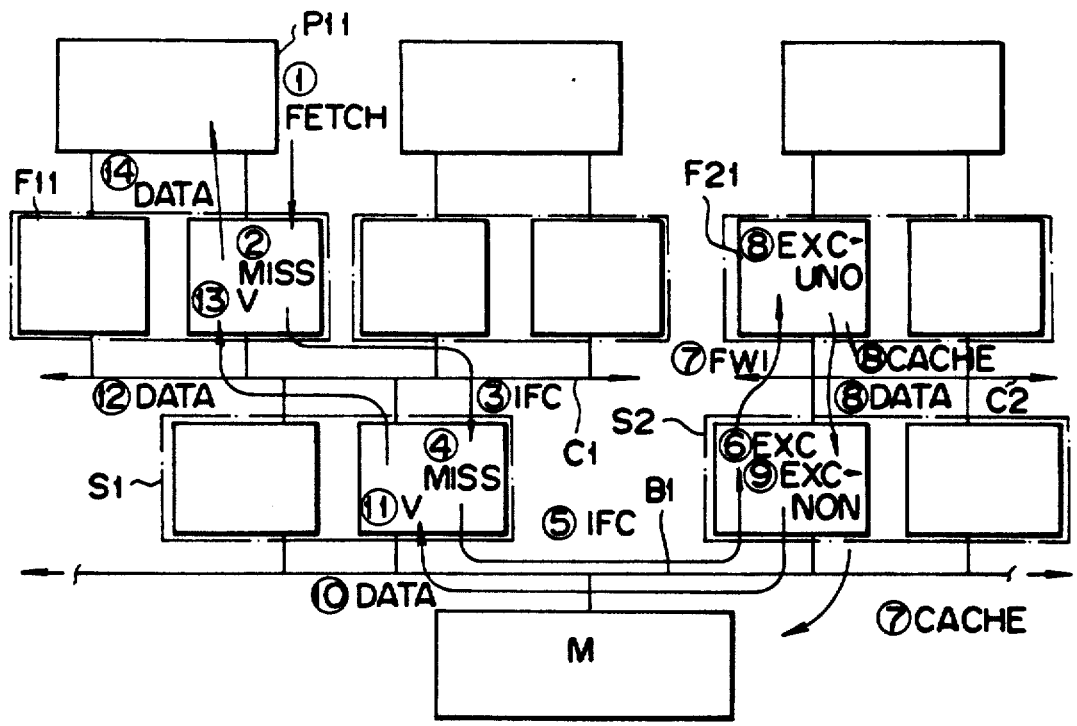
Figure 12:
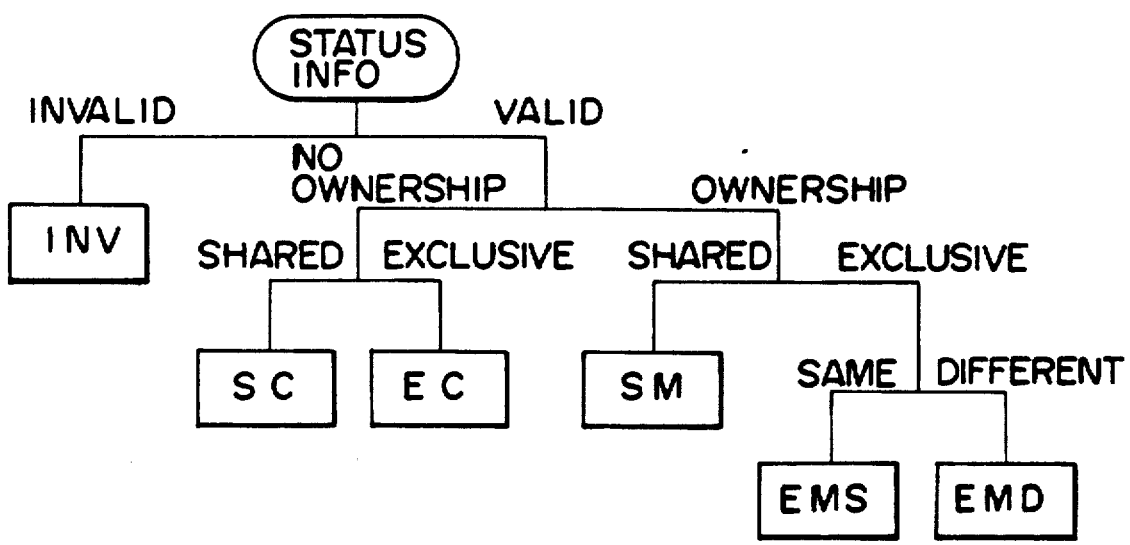
FIG. 12 a diagram showing six statuses set in the cache memory of the second embodiment.

FIG. 11F is a diagram showing another fetch operation [fetch example 6].

<1> When the processor $P_{11}$ issues a fetch request, and

<2> the i-fcache $IF_{11}$ misses the request,

<3> the i-fcache $IF_{11}$ issues the IFC command onto the cache-bus C1.

<4> When the i-scache $IS_1$ misses the IFC command,

<5> the i-scache $IS_1$ issues the IFC command onto the memory-bus B1.

<6> When EXC of the scache $S_2$ hits the IFC command,

<7> he $S_2$ issues the FWI command onto the cache-bus C2, and asserts a cache signal on the memory-bus B1.

<8> When, for example, EXC of the fcache $F_{21}$ hits the FWI command, the fcache $F_{21}$ sends corresponding data onto the cache-bus C2 as a reply to <7>. The fcache $F_{21}$ asserts a cache signal on the cache-bus C2, and updates its status to UNO.

<9> The scache $S_2$ loads the data on the cache-bus C2, and updates its status to NON.

<10> The scache $S_2$ sends this data to the memory-bus B1 as a reply to <5>.

<11> The i-scache $IS_1$ loads this data from the memory-bus B1, and writes it in its entry.

<12> The i-scache $IS_1$ sends this data onto the cache-bus C1 as a reply to <3>.

<13> The i-fcache $F_{11}$ loads the data on the cache-bus C1, and writes it in its entry.

<14> The i-fcache $F_{11}$ transfers this data to the processor $P_{11}$ as a request source, thus completing the fetch operation.

The fetch operations in the apparatus of this embodiment including independent instruction caches have been described.

In the above embodiments, each of the fcaches of the first stage and the scaches of the second stage takes four statuses, and a cache operation is executed in accordance with these statuses. However, taken a certain scache, when the scache have no ownership of data of interest, that it may share an entry with other scaches, or may exclusively have an entry. In addition, when the scache has an ownership of the data of interest and exclusively has an entry, the data of interest may or may not coincide with data in an fcache thereabove.

In the third embodiment of the present invention, six statuses are set in an scache in consideration of the above situation, so that a cache operation can be efficiently executed in accordance with these statuses.

Note that an fcache can take four statuses as in the above embodiments. Therefore, the characteristic features of the scache will be mainly described hereinafter.

A system according to the third embodiment of the cache memory apparatus basically has the same architecture as that of the system shown in FIG. 3, and the fcache has the same functions.

In this embodiment, the scache is defined to take the following six statuses. That is, (1) EC (Exclusive Clean); This status indicates that a cache memory is valid, has no ownership, and is in an exclusive state, and has the following meanings.

<1> Other scaches do not include an entry corresponding to this entry.

<2> Data in a data section of a entry of an fcache above this scache coincides with that in a data section of this entry.

<3> Since this entry has no ownership, it need not be copied back when it is replaced.

<4> Since no fcache above this scache has an ownership, neither NON nor EXC are present.

(2) EMD (Exclusive Modified Different from fcache); This status indicates that the cache memory is valid, has an ownership, is in an exclusive state, and its content is different from that of an fcache, and has the following meanings.

<1> Other scaches do not include an entry of an address corresponding to this entry.

<2> Data in a data section of a corresponding entry of an fcache above this scache is different from with that in a data section of this entry.

<3> A corresponding entry is present in an fcache above this scache, and has an ownership. That is, status NON or EXC is present.

(3) EMS (Exclusive Modified Same as fcache); This status indicates that the cache memory is valid, has an ownership, is in an exclusive state has same data as in fcache above this scache and its following meanings.

<1> Other scaches do not include an entry of an address corresponding to this entry.

<2> Data in a data section of a corresponding entry of an fcache above this scache coincides with that in a data section of this entry.

<3> If a corresponding entry is present in an fcache above this scache, it has no ownership. That is, neither EXC nor NON are present.

(4) SM (Shared Modified); This status indicates that the cache memory is valid, has an ownership, and is not in an exclusive state, and has the following meanings.

<1> An entry corresponding to this entry may be present in other scaches.

<2> The content of a data section corresponding to this entry of an fcache above this scache coincides with that of the data section of this entry.

<3> A corresponding entry in an fcache above this fcache has no ownership. More specifically, if an fcache above this scache has a corresponding entry, its status is UNO. Data of the data section of this entry is valid.

<4> This entry has an ownership, and must be copied back when it is replaced.

(5) SC (Shared Clean); This status indicates that the cache memory is valid, has no ownership, and is not is an exclusive state, and has the following meanings.

<1> An entry corresponding to this entry may be present in other scaches.

<2> If an entry corresponding to this entry is present in an fcache above this scache, its status is UNO.

<3> The content of a data section of the entry coincides with that of the data section of this entry. Data in the data section of this entry is valid.

<4> This entry has no ownership. Therefore, this entry need not be copied back when it is replaced.

(6) INV (INValid); This status indicates that the cache memory is invalid (the definition of the status is the same as that described above), and has the following meanings.

<1> This entry is not used.

<2> Both the data section and address information are insignificant information.

The six statuses set i correspondence with address information of each scache and their meanings have been described.

The scache with the above arrangement is operated in basically the same manner as in the first and second embodiments, and executes predetermined necessary operations in accordance with a command from the cache entry at that time, thus updating the content of the corresponding entry.

Replies to a command issued from an fcache will be described below.

A total of six commands are issued on the cache-bus. Of these commands, four commands, i.e., RSH, RFO, WWI, and WFI, are issued from the fcache to the scache. On the contrary, three commands, i.e., WFI, FWI, and FAI are issued from the scache to the fcache. These commands will be described below in turn with reference to the following cases.

[1. Reply to RSH]

(a-1) When EMD hits a command; Since a corresponding entry of an fcache above this scache has an ownership, a reply need not be made. More specifically, data transfer is executed between brother fcaches. As a reply, an ack signal is sent back onto the cache-bus.

(a-2) When EMS, EC, SM, or SC hits a command; Since there should be no entry having an ownership in any fcache above this scache, the scache must reply this command. Therefore, data of the hit entry is transmitted onto the cache-bus without changing status. An ack signal is sent back onto the cache-bus.

(b) When an scache misses a command; After the replacing operation is executed, the RSH command is issued outo the memory bus to load data. The status of the loaded entry varies depending on whether or not the entry is shared. If the entry is not shared, status is set to EC; otherwise, status is set to SC. Thereafter, data of the loaded entry is transmitted onto the cache-bus, and an ack signal is sent back onto the cache-bus.

A sharing identification section detects the presence/absence of a data-sharing. As a method of detecting a data-sharing i.e., whether or not an entry is shared, when each cache hits a command on the memory-bus in an apparatus having a signal line indicating a data-sharing on the memory-bus, this signal line is asserted to inform to other caches that this entry is presently shared. In this embodiment, a signal flowing through this signal line will be defined as an "sh signal".

[2. Reply to RFO]

(a-1) When EMD hits a command; Since an fcache above this scache includes a corresponding entry having an ownership and the entry sends back data, the scache need not send back data. Since none of the other scaches and fcaches thereabove include data corresponding to this entry, a command need not be issued onto the memory-bus, either. Therefore, only an ack signal is sent back onto the cache-bus.

(a-2) When EMS hits a command; Since no fcache above this scache has a corresponding entry having an ownership, this scache must reply. Therefore, the scache sends back corresponding data onto the cache-bus. However, since none of the other scaches have a corresponding entry, a bus command need not be issued onto the memory-bus. An ack signal is sent back onto the cache-bus, and status of the entry is updated to EMD.

(a-3) When SM or SC hits a command; The WFI command is issued onto the memory-bus. Other entries are invalidated to send back corresponding data of this entry onto the cache-bus. The data must be sent back since no fcache above this scache has an entry having an ownership. In this case, status is updated to EMD, and an ack signal is sent back onto the cache-bus.

(a-4) When EC hits a command; There is no entry having an ownership in any fcache above this scache. Therefore, the scache must send data onto the cache-bus. Since none of the other scaches and fcaches thereabove have data corresponding to this entry, no command need be issued on the memory-bus. An ack signal is sent back onto the cache-bus. In this case, status is updated to EMD.

(b) When an scache misses a command; After the replacing operation is executed, the RFO command is issued onto the memory-bus to load data. The status of the loaded entry is updated to EMD, and data of the loaded entry is sent onto the cache-bus. In this case, an ack signal is returned onto the cache-bus.

[3. Reply to WFI]

(a-1) When EMD hits a command; Since none of the other scaches and fcaches thereabove include data corresponding to this entry, an invalidation request need not be issued onto the memory-bus. In this case, only an ack signal is sent back onto the cache-bus.

(a-2) When EMS hits a command; Since none of the other scaches and fcaches thereabove include data corresponding to this entry, an invalidation request need not be issued onto the memory-bus. In this case, only an ack signal is sent back onto the cache-bus. The status of the corresponding entry is updated to EMD to indicate that the content of this entry does not coincide with that of any fcache thereabove.

(a-3) When SM or SC hits a command; The WFI command is issued onto the memory-bus to invalidate corresponding other entries, and its status is updated to EMD. An ack signal is sent back onto the cache-bus.

(a-4) When EC hits a command; Since none of the other scaches and fcaches thereabove include data corresponding to this entry, corresponding entries need not be invalidated. In this case, the status of the entry is updated to EMD, and an ack signal is sent back onto the cache-bus.

(b) When an scache misses a command; This case means that there is an entry which is present in an fcache and is not present in an scache therebelow. However, such a case is impossible.

[4. Reply to WWI]

(a-1) When EMD hits a command; Data is written in this entry. Since the content of this entry coincides with that of an fcache above this scache, the status of the entry is updated to EMS, and an ack signal is sent back onto the cache-bus.

(a-2) When status other than EMD hits a command; In status other than EMD, since there should be no entry having an ownership in any fcache above this scache, such a case is impossible.

(b) When an scache misses a command; This case means that there is an entry which is present in an fcache and is not present in an scache therebelow. However, such a case is impossible.

Note that the replacing operation in the scache is controlled in basically the same manner as that in the first and second embodiments. However, the operation slightly varies depending on the status of the entry at that time.

[1] When status of an entry to be replaced is INV, EC, or SC; No copy-back operation is executed.

[2] When status of an entry to be replaced is EMD; Since an entry having status EMD in the scache must have a corresponding entry in an fcache connected to this scache, this entry will not be selected as an object to be replaced.

[3] When status of an entry to be replaced is SM or EMS; The WWI command is issued onto the memory-bus to copy back the content of the entry to the memory.

Replies to memory-bus commands in the scache will be described below. This reply control is basically the same as that in the first and second embodiments described above. More specifically, the reply control is executed as follows in accordance with status of an entry corresponding to an address of a command on the memory-bus while monitoring the memory-bus. [1. Reply to RSH]

(a) When status of a hit entry is EMD; A cache signal on the memory-bus is asserted to inhibit the memory from replying, and an sh signal is asserted. Since data of a corresponding entry in an fcache above this scache is different from data of this entry, the FWI command is issued onto the cache-bus to copy the data of the fcache to this scache, and replied data is written in this entry. Data of this entry is sent onto the memory-bus as a reply to the RSH command. The status of this entry is updated to SM, and an ack signal is sent back onto the memory-bus.

(b) When status of a hit entry is EMS; A cache signal on the memory-bus is asserted, and an sh signal is also asserted. Data of this entry is sent onto the memory-bus to supply the data to an scache requesting data. The status of the entry is updated to SM, and an ack signal is sent back onto the memory-bus.

(c) When status of a hit entry is SM; A cache signal on the memory-bus is asserted, and an sh signal is also asserted. Data of this entry is sent onto the memory-bus to supply the data to an scache requesting data. In this case, an ack signal is sent back onto the memory-bus without updating status.

(d) When status of a hit entry is EC; A cache signal on the memory-bus is asserted, and an sh signal is also asserted. Data of this entry is sent onto the memory-bus to supply the data to an scache requesting data. The status of this entry is updated to SC, and an ack signal is sent back onto the memory-bus.

(e) When status of a hit entry is SC; An sh signal is asserted, and an ack signal is sent back onto the memory-bus.

[2. Reply to RFO]

(a) When status of a hit entry is EMD; A cache signal on the memory-bus is asserted to inhibit the memory from replying, and an sh signal is asserted. Since data of a corresponding entry in an fcache above this scache is different from data of this entry, the FAI command is issued onto the cache-bus to copy the data of the fcache to this scache, and replied data is written in this entry. As the effect of this FAI command, the fcache above this scache is invalidated. Data of the entry is sent onto the memory-bus as a reply to the RFO command. The status of this entry is updated to INV, and an ack signal is sent back onto the memory-bus.

(b) When status of a hit entry is EMS; A cache signal on the memory-bus is asserted to inhibit the memory from replying, and an sh signal is also asserted. If there is a possibility of presence of a corresponding entry in an fcache above this scache, the WFI command is issued onto the cache-bus. As a reply to the RFO request, data of this entry is sent onto the memory-bus. The status of this entry is updated to INV, and an ack signal is sent onto the memory-bus.

(c) When status of a hit entry is SM; A cache signal on the memory-bus is asserted to inhibit the memory from replying. In addition, an sh signal is also asserted. If there is a possibility of presence of a corresponding entry in an fcache above this scache, the WFI command is issued onto the cache-bus. As a reply to the RFO request, data of this entry is sent onto the memory-bus. The status of this entry is updated to INV, and an ack signal is sent onto the memory-bus.

(d) When status of a hit entry is SC; An sh signal is asserted. In this case, if there is a possibility of presence of a corresponding entry in an fcache above this scache, the WFI command is issued onto the cache-bus, and the status of the entry is updated to INV. In this case, data is supplied from the memory or another scache, and an ack signal is sent onto the memory-bus.

(e) When status of a hit entry is EC; A cache signal on the memory-bus is asserted to inhibit the memory from replying, and an sh signal is also asserted. If there is a possibility of presence of a corresponding entry in an fcache above this scache, the WFI command is issued onto the cache-bus. As a reply to the RFO request, data of this entry is sent onto the memory-bus. The status of this entry is updated to INV, and an ack signal is sent onto the memory-bus.

[3. Reply to WFI]

(a) When status of a hit entry is EMD, EMS, or EC; This case means that another scache has a corresponding entry. However, such a case is impossible.

(b) When status of a hit entry is SM or SC. If there is a possibility of presence of a corresponding entry in an fcache above this scache, the WFI command is issued onto the cache-bus. The status of the entry is updated to INV, and an ack signal is sent back onto the memory-bus.

[4. Reply to WWI]

(a) When status of a hit entry is EMD, EMS, or EC; Since this case means that another scache has a corresponding entry, such a case is impossible.

(b) When status of a hit entry is SM; Since this case means that a corresponding entry of another scache has an ownership, such a case is impossible.

(c) When status of a hit entry is SC; An ack signal is sent back onto the memory bus.

The functions and operation modes such as replies to commands of the scache having six statuses which are set/updated in correspondence with commands have been described.

The operations of the cache memory apparatus according to the third embodiment of the present invention will be described below with reference to FIGS. 13A to 13O.

Figure 13A:
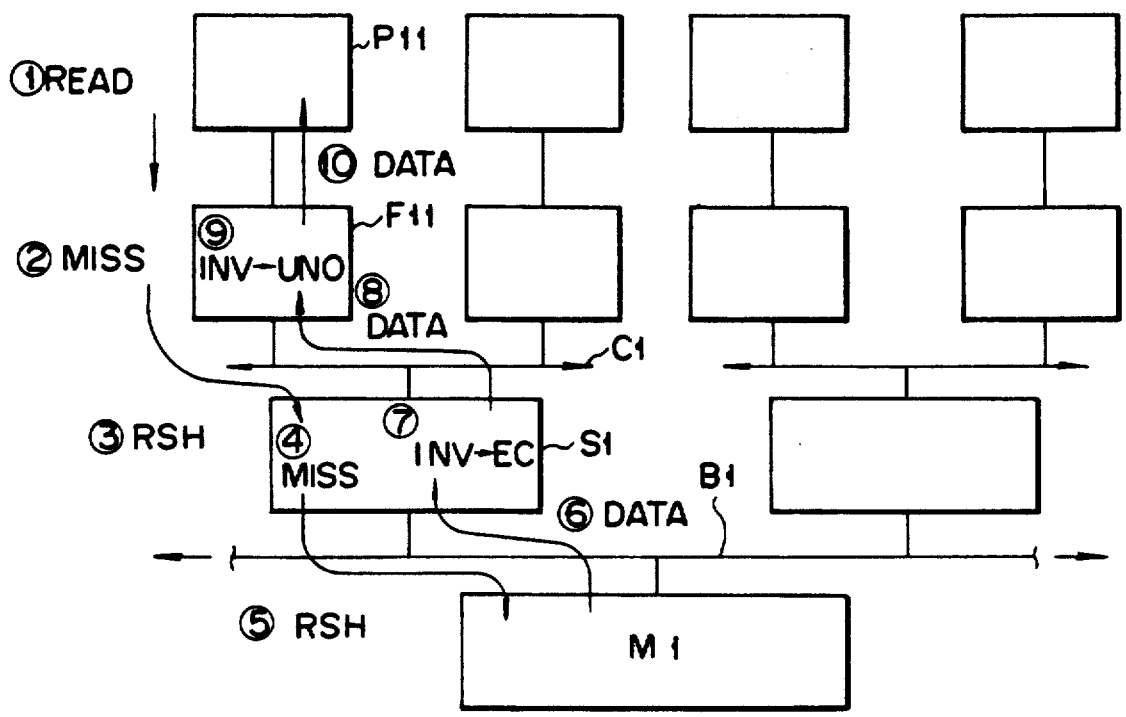
FIGS. 13A to 13O are diagrams showing system operations according to the third embodiment of the present invention.

FIG. 13A is a diagram showing a first read operation [read example 1], and this operation is executed as follows.

<1> A read request is issued from the processor $P_{11}$ to the fcache $F_{11}$.

<2> When the fcache $F_{11}$ misses the request,

<3> the RSH command is issued from the fcache $F_{11}$ onto the cache-bus C1.

<4> When the scache $S_1$ misses the RSH command,

<5> the scache $S_1$ issues the RSH command onto the memory-bus B1.

<6> As a reply to the RSH command, corresponding data is read out from the memory M1.

<7> The data is loaded by the scache $S_1$. In this case, since the sh signal is not asserted, the status of the scache is updated to EC.

<8> The scache $S_1$ sends the data onto the cache-bus C1 as a reply to the RSH command of <3>.

<9> The data is loaded by the fcache $F_{11}$. The status of the fcache is updated to UNO.

<10> The fcache $F_{11}$ sends the data to the processor $P_{11}$ as a request source.

Figure 13B:
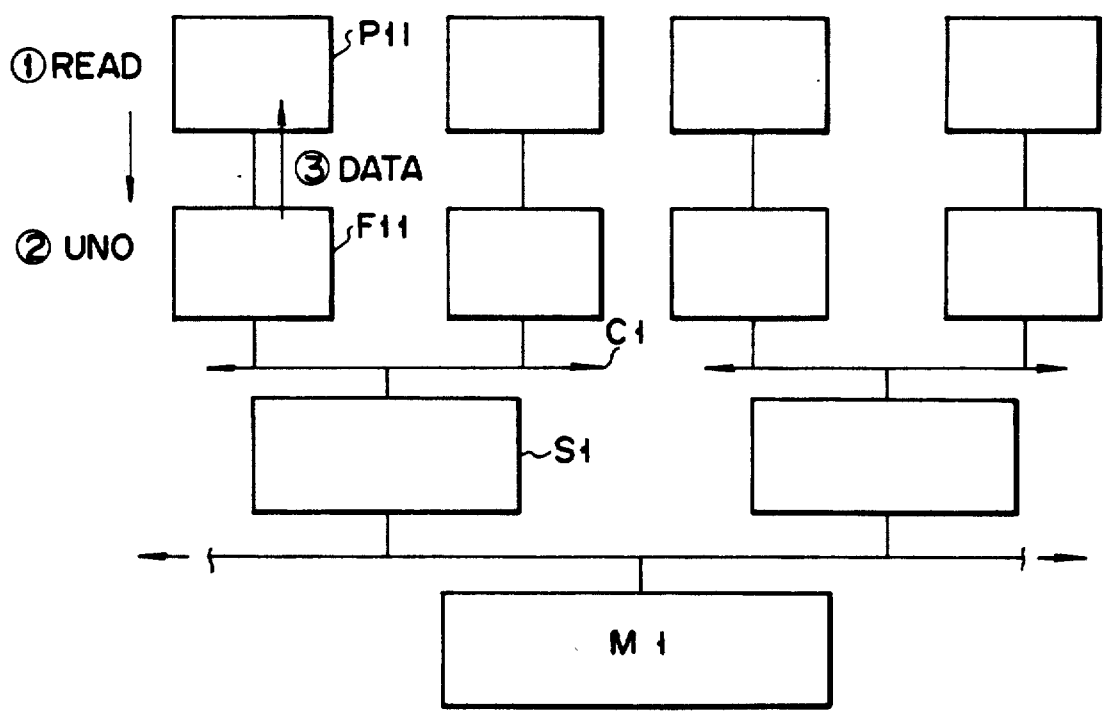

FIG. 13B is a diagram showing a second read operation [read example 2], and this operation is executed as follows.

<1> A read request is issued from the processor $P_{11}$ to the fcache $F_{11}$.

<2> When UNO of the fcache $F_{11}$ hits the request,

<3> the fcache $F_{11}$ transfers corresponding data to the processor $P_{11}$, thus ending the read operation.

Figure 13C:
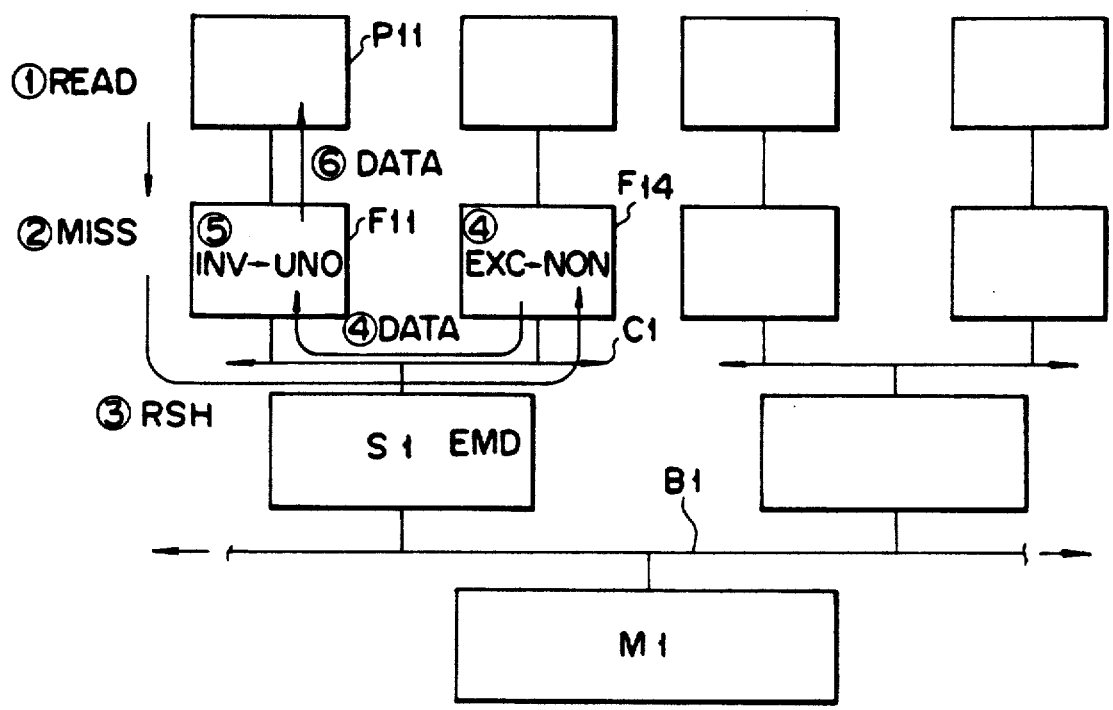

FIG. 13C is a diagram showing a third read operation [read example 3], and its operation is executed as follows.

<1> A read request is issued from the processor $P_{11}$ to the fcache $F_{11}$.

<2> When the fcache $F_{11}$ misses the request,

<3> the fcache $F_{11}$ issues the RSH command onto the cache-bus C1.

<4> When the fcache $F_{14}$ hits the RSH command, corresponding data is sent onto the cache-bus C1 as a reply to <3>. The status of the fcache $F_{14}$ is updated from EXC to NON. In this case, since the status of the scache $S_1$ is EMD, only an ack signal is returned.

<5> This data is loaded by the fcache $F_{11}$. The status of the fcache is updated to UNO.

<6> The fcache $F_{11}$ supplies this data to the processor $P_{11}$, thus ending the operation.

Figure 13D:
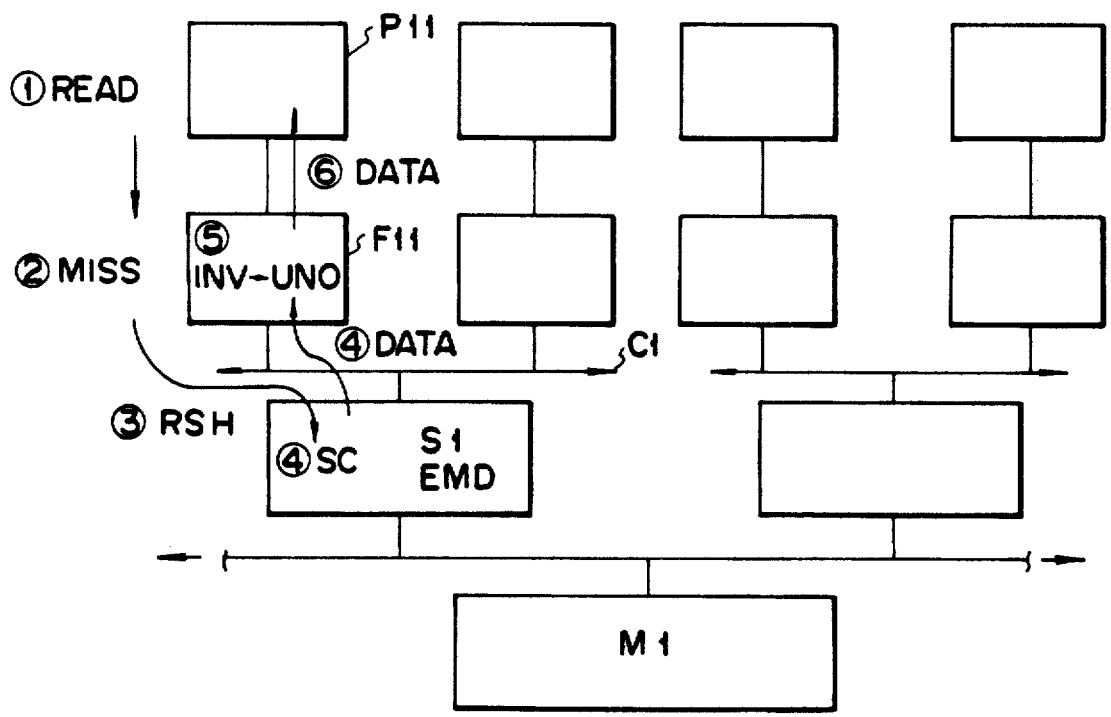

FIG. 13D is a diagram showing a fourth read operation [read example 4], and its operation is executed as follows.

<1> A read request is issued from the processor $P_{11}$ to the fcache $F_{11}$.

<2> When the fcache $F_{11}$ misses the request,

<3> the fcache $F_{11}$ issues the RSH command onto the cache-bus C1.

<4> When SC of the scache $S_1$ hits the RSH command, corresponding data is supplied onto the cache-bus C1 as a reply to <3>.

<5> The fcache $F_{11}$ loads this data from the cache-bus C1. The status of the fcache is updated to UNO.

<6> The fcache $F_{11}$ supplies this data to the processor $P_{11}$ as a request source, thus ending the operation.

Figure 13E:
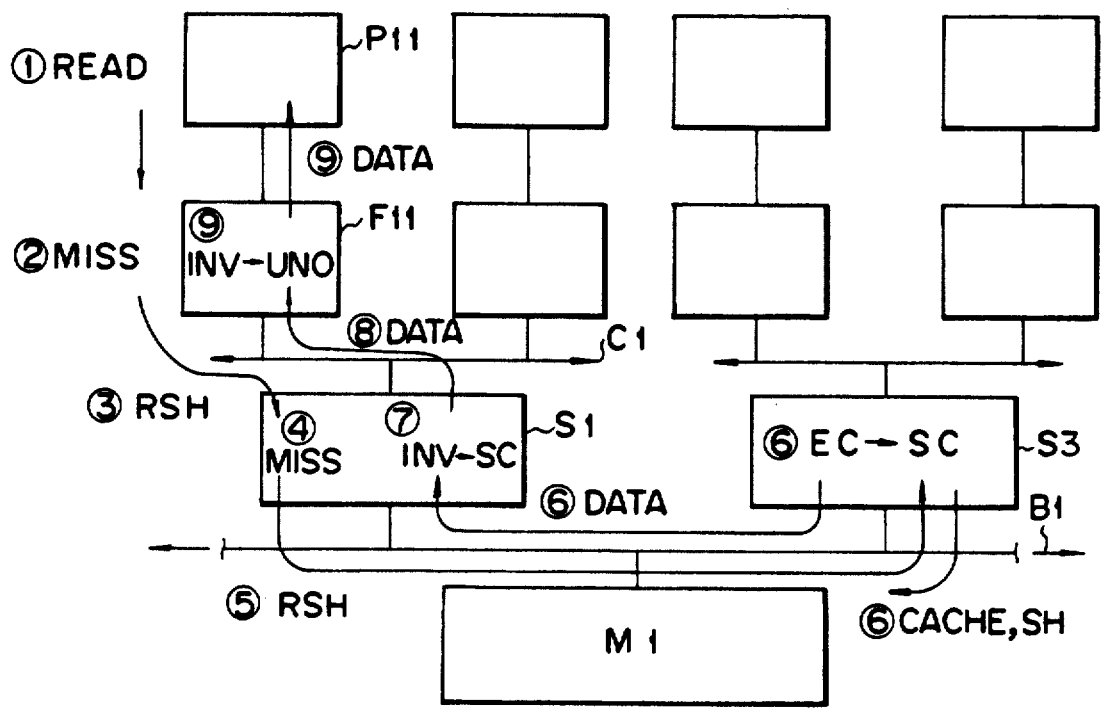

FIG. 13E is a diagram showing a fifth read operation [read example 5], and this operation is executed as follows.

<1> A read request is issued from the processor $P_{11}$ to the fcache $F_{11}$.

<2> When the fcache $F_{11}$ misses the request,

<3> the fcache$F_{11}$ issues the RSH command onto the cache-bus C1.

<4> When the scache $S_1$ misses the RSH command,

<5> the scache $S_1$ issues the RSH command onto the memory-bus B1.

<6> When EC of the scache $S_3$ hits the RSH command, the scache $S_3$ supplies corresponding data onto the memory-bus B1 as a reply to <5>. A cache signal on the memory-bus B1 is asserted to inhibit the memory M1 from replying. At the same time, an sh signal is asserted.

<7> The data is loaded from the memory-bus B1 to the scache $S_1$. Since the sh signal has already been asserted, the status of the scache $S_1$ is updated to SC.

<8> The data is supplied from the scache $S_1$ onto the cache-bus C1 as a reply to <3>.

<9> The fcache $F_{11}$ loads this data from the cache-bus C1. The status of the fcache is updated to UNO.

<10> The fcache $F_{11}$ supplies this data to the processor $P_{11}$, thus ending the operation.

Figure 13F:
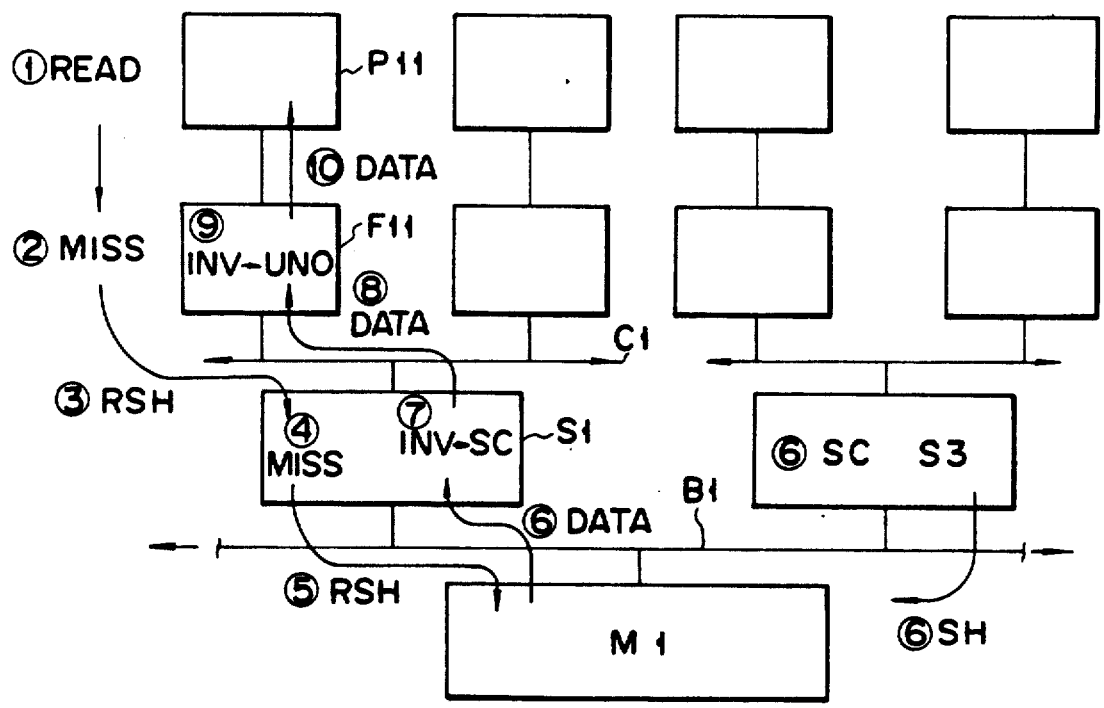

FIG. 13F is a diagram showing a sixth read operation [read example 6], and the operation is executed as follows.

<1> A read request is issued from the processor $P_{11}$ to the fcache $F_{11}$.

<2> When the fcache $F_{11}$ misses the request,

<3> the fcache $F_{11}$ issues the RSH command onto the cache-bus C1.

<4> When the scache $S_1$ misses the RSH command,

<5> the scache $S_1$ issues the RSH command onto the memory-bus B1.

<6> When, for example, SC of the scache $S_3$ hits the RSH command, the scache $S_3$ asserts an sh signal.

This data is supplied from the memory onto the memory-bus B1.

<7> The scache $S_1$ loads this data from the memory-bus B1. Since the sh signal has already been asserted, the status of the scache is updated to SC.

<8> The scache $S_1$ supplies the data onto the cache-bus C1 as a reply to <3>.

<9> The fcache $F_{11}$ loads this data from the cache-bus C1, and its status is updated to UNO.

<10> The fcache $F_{11}$ supplies this data to the processor $P_{11}$, thus ending its operation.

Figure 13G:
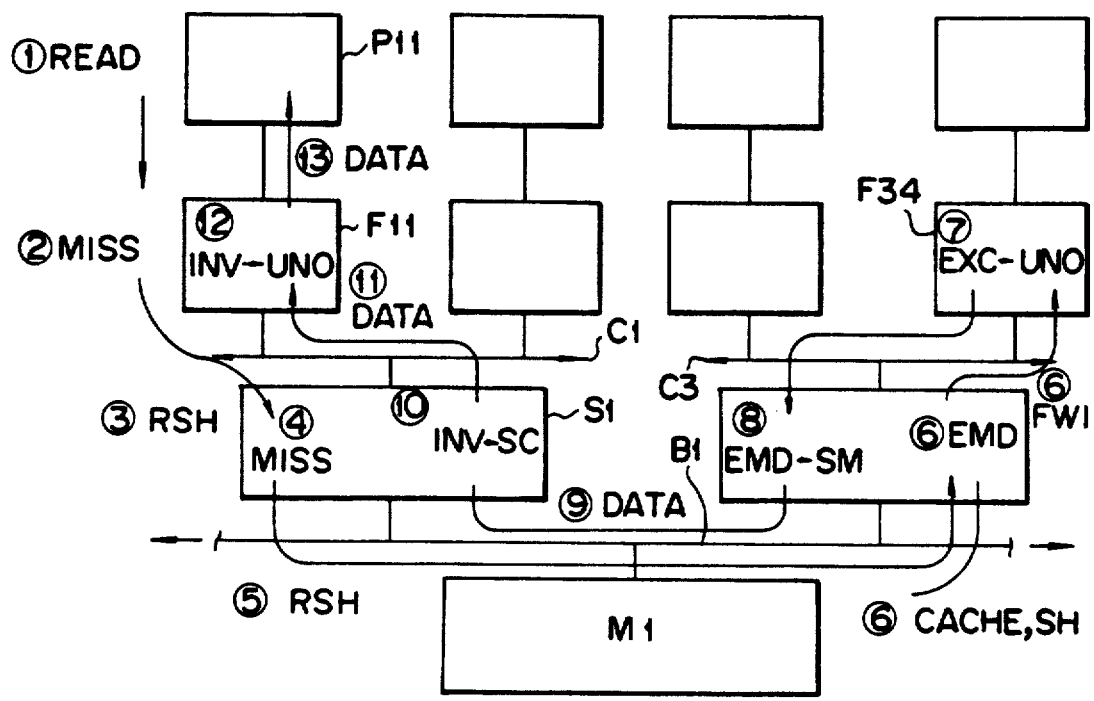

FIG. 13G is a diagram showing a seventh read operation [read example 7], and this operation is executed as follows.

<1> A read request is issued from the processor $P_{11}$ to the fcache $F_{11}$.

<2> When the fcache $F_{11}$ misses the request,

<3> the fcache $F_{11}$ issues the RSH command onto the cache-bus C1.

<4> When the scache $S_1$ misses the RSH command,

<5> the scache $S_1$ issues the RSH command onto the memory-bus B1.

<6> When, for example, EMD of the scache $S_3$ hits the RSH command, the scache $S_3$ issues a cache signal onto the memory-bus B1, thereby inhibiting the memory from replying. The FWI command is issued onto the cache-bus C3. In addition, an sh signal is asserted.

<7> When for example, the fcache $F_{34}$ hits the FWI command, corresponding data is supplied onto the cache-bus C3 as a reply to <6>. The status of the fcache is updated from EXC to UNO.

<8> The scache $S_3$ loads the data from the cache-bus C3. The status of the scache $S_3$ is updated from EMD to SM.

<9> The scache $S_3$ supplies the data onto the memory-bus B1 as a reply to <5>.

<10> The scache $S_1$ loads the data from the memory-bus B1. Since the sh signal has already been asserted, the status of the scache is updated to SC.

<11> The scache $S_1$ supplies the data onto the cache-bus C1 as a reply to <3>.

<12> The fcache $F_{11}$ loads the data from the cache-bus C1, and its status is updated to UNO.

<13> The fcache $F_{11}$ supplies this data to the processor $P_{11}$, thus ending its operation.

As described above, when the scache has six statuses, the above-mentioned four statuses cause slightly different operations in this embodiment, and read operations are efficiently executed.

Write operations in the apparatus of this embodiment will be described below.

Figure 13H:
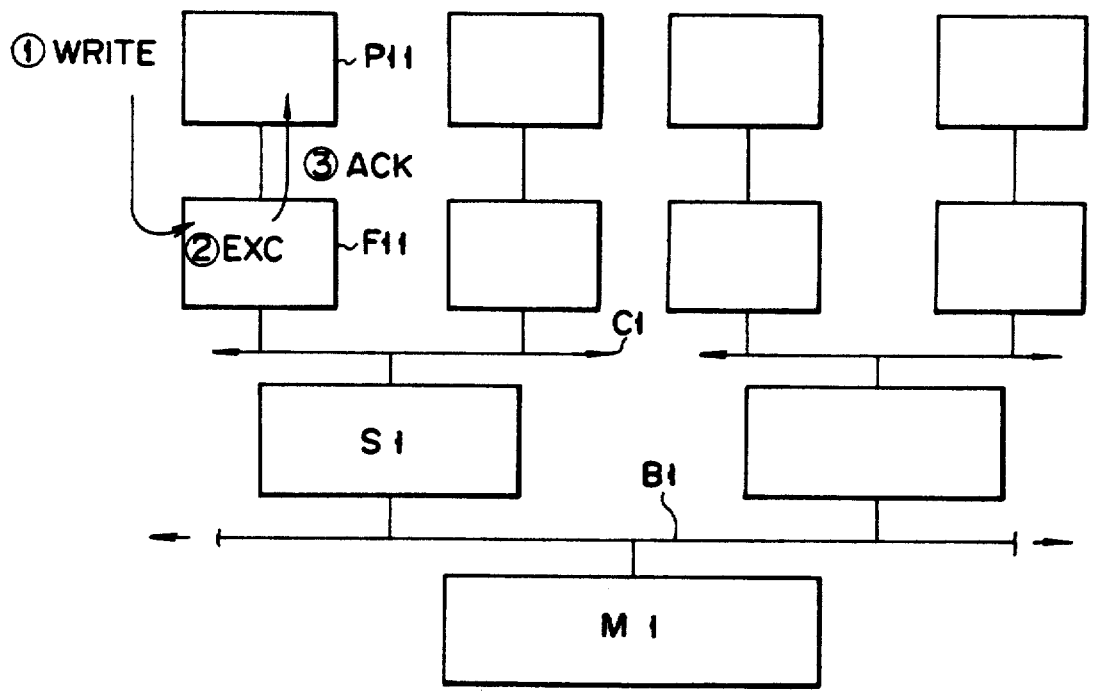

FIG. 13H is a diagram showing a first write [write example 1], and this operation executed is as follows.

<1> A write request is issued from the processor $P_{11}$ to the fcache $F_{11}$.

<3> the fcache $F_{11}$ executes write access, and sends back an ack signal to the processor $P_{11}$, thus ending the write operation.

Figure 13I:
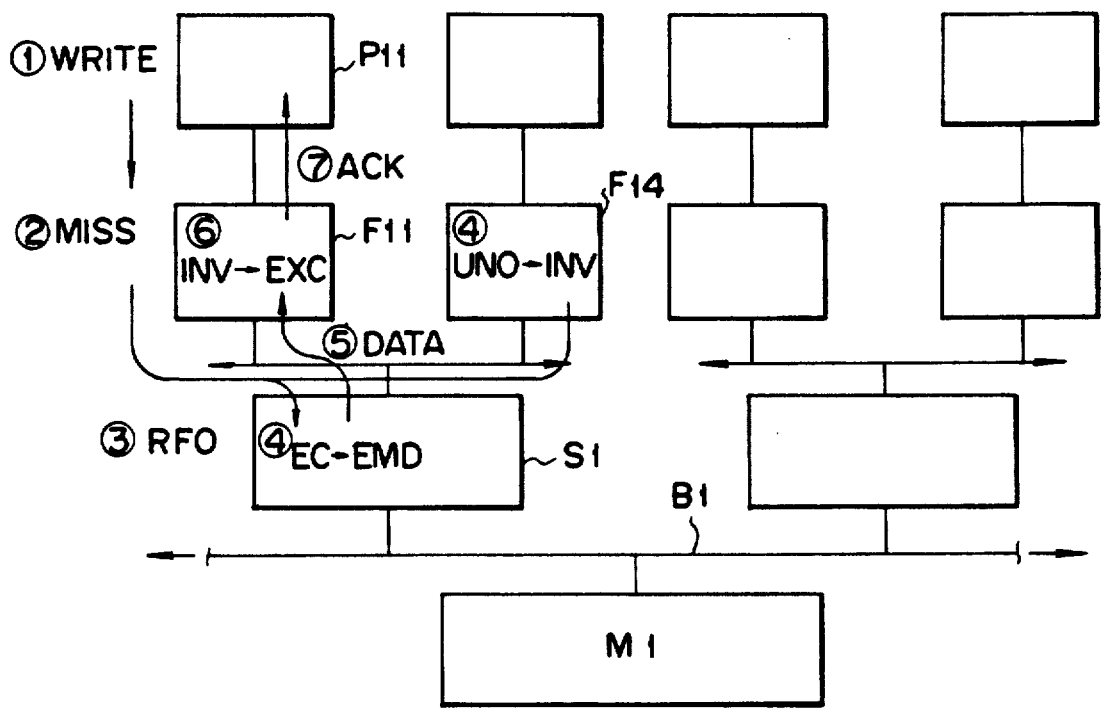

FIG. 13I is a diagram showing a second write operation [write example 2], and this operation is executed as follows.

<1> A write request is issued from the processor $P_{11}$ to the fcache $F_{11}$.

<2> When the fcache $F_{11}$ misses the request,

<3> the fcache $F_{11}$ issues the RFO command onto the cache-bus C1.

<4> When, for example, the fcache $F_{14}$ hits the RFO command, the status of the fcache $F_{14}$ is updated to INV. In this case, if the status of the scache $S_1$ is EC, it is updated to EMD.

<5> The scache $S_1$ supplies corresponding data onto the cache-bus C1 as a reply to <3>.

<6> The fcache $F_{11}$ loads this data, and its status is updated from INV to EXC.

<7> The fcache $F_{11}$ executes write access of the loaded data, and sends back an ack signal to the processor $P_{11}$, thus ending its operation.

Figure 13J:
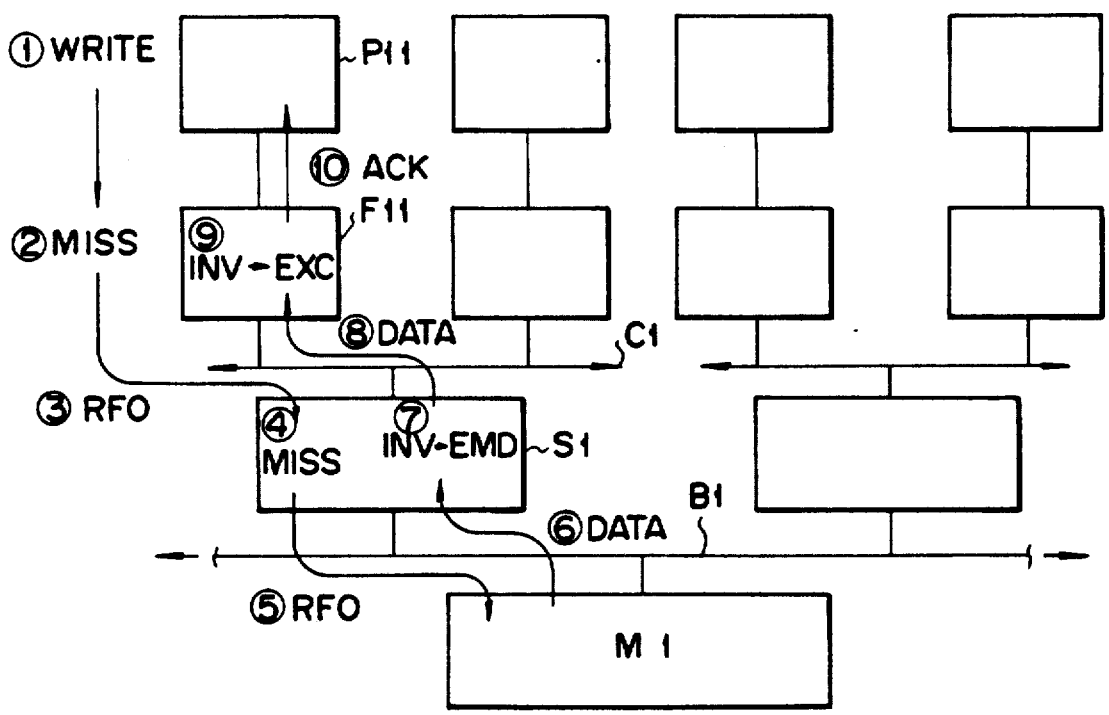

FIG. 13J is a diagram showing a third write operation [write example 3], and this operation is executed as follows.

<1> A write request is issued from the processor $P_{11}$ to the fcache $F_{11}$.

<2> When the fcache $F_{11}$ misses the request,

<3> the fcache $F_{11}$ issues the RFO command onto the cache-bus C1.

<4> When the scache $S_1$ misses the RFO command,

<5> the scache $S_1$ issues the RFO command onto the memory-bus B1.

<6> In response to the RFO command, the memory M1 supplies corresponding data onto the memory-bus B1 as a reply to <5>.

<7> This data is loaded by the scache $S_1$ from the memory-bus B1. The status of the scache is updated from INV to EMD.

<8> The scache $S_1$ supplies this data onto the cache-bus C1 as a reply to <3>.

<9> The fcache $F_{11}$ loads this data from the cache-bus C1, and its status is updated from INV to EXC.

<10> Furthermore, this data is loaded from the fcache $F_{11}$ to be transferred to the processor $P_{11}$ after desired write access is executed, and an ack signal is sent back, thus ending the write operation.

Figure 13K:
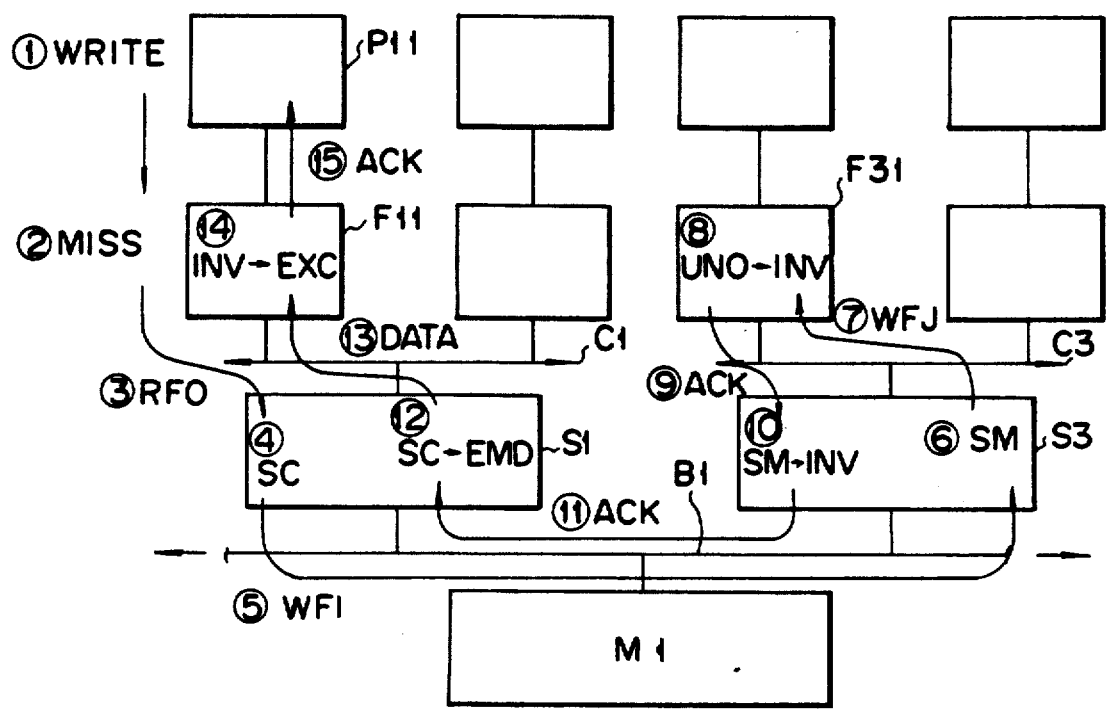

FIG. 13K is a diagram showing a fourth write operation [write example 4], and this operation is executed as follows.

<1> A write request is issued from the processor $P_{11}$ to the fcache $F_{11}$.

<2> When the fcache $F_{11}$ misses the request,

<3> the fcache $F_{11}$ issues the RFO command onto the cache-bus C1.

<4> When, for example, SC of the scache $S_1$ hits the RFO command,

<5> the scache $S_1$ issues the WFI command onto the memory-bus B1.

<6> When, for example, SM of the scache $S_3$ hits the WFI command,

<7> the scache $S_3$ issues the WFI command onto the cache-bus C3.

<8> When, for example, UNO of the fcache $F_{31}$ hits the WFI command, the status of the fcache is updated to INV.

<9> The fcache $F_{31}$ sends back an ack signal onto the cache-bus C3 as a reply to <7>.

<10> The status of the scache $S_3$ is updated from SM to INV.

<11> The scache $S_3$ sends back an ack signal onto the memory-bus B1 as a reply to <5>.

<12> The status of the scache $S_1$ is updated to EMD.

<3> The scache $S_1$ supplies corresponding data onto the cache-bus C1 as a reply to <3>.

<14> On the other hand, the fcache $F_{11}$ loads this data on the cache-bus C1, and its status is updated from INV to EXC.

<15> The fcache $F_{11}$ executes write access of the loaded data. Thereafter, the fcache $F_{11}$ sends back an ack signal, thus ending its processing.

Figure 13L:
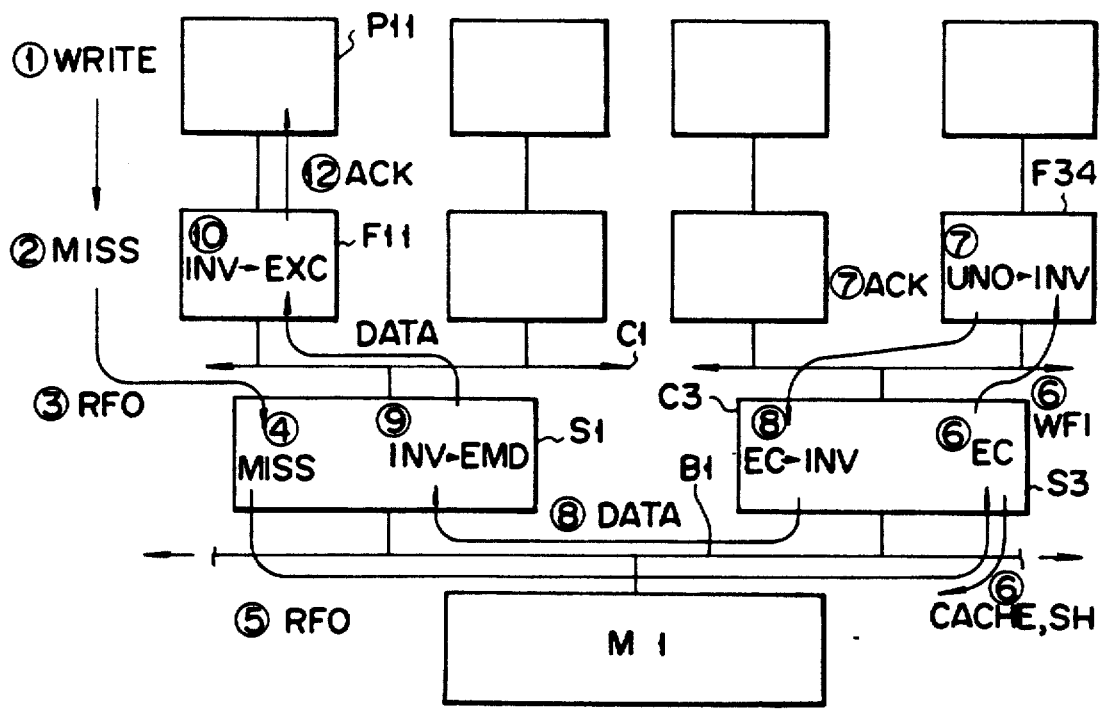

FIG. 13L shows a fifth write operation [write example 5].

<1> A write request is issued from the processor $P_{11}$ to the fcache $F_{11}$.

<2> When the fcache $F_{11}$ misses the request,

<3> the fcache $F_{11}$ issues the RFO command onto the cache-bus C1.

<4> When the scache $S_1$ also misses this RFO command,

<5> the scache $S_1$ issues the RFO command onto the memory-bus B1.

<6> When this command hits, e.g., EC of the scache $S_3$, the scache $S_3$ asserts a cache signal on the memory-bus B1 to inhibit the memory from replying, and also asserts an sh signal. Furthermore, the scache $S_{3 issues}$ the WFI command onto the cache-bus C3.

<7> When, for example, UNO of the fcache $F_{34}$ hits the WFI command, the fcache $F_{34}$ sends back an ack signal onto the cache-bus C3 as a reply to <6>, and its status is updated to INV.

<8> The scache $S_3$ supplies corresponding data onto the memory-bus B1 as a reply to <5>, and its status is updated to INV.

<9> The scache $S_1$ loads the data from the memory-bus B1, and its status is updated to EMD.

<10> The scache $S_1$ supplies the data onto the cache-bus C1 as a reply to <3>.

<11> The fcache $F_{11}$ loads this data on the cache-bus C1, and its status is updated from INV to EXC.

<12> The fcache $F_{11}$ executes write access of the loaded data, and sends back an ack signal to the processor $P_{11}$.

FIG. 13M shows a sixth write operation [write example 6], and this operation is executed as follows.

<1> A write request is issued from the processor $P_{11}$ to the fcache $F_{11}$.

<2> When the fcache $F_{11}$ misses the request,

<3> the fcache $F_{11}$ issues the RFO command onto the cache-bus C1.

<4> When the scache $S_1$ misses the RFO command,

<5> the scache $S_1$ issues the RFO command onto the memory-bus B1.

<6> When, for example, EMD of the scache $S_3$ hits the RFO command, the scache $S_3$) asserts a cache signal on the memory-bus B1 to inhibit the memory M1 from replying, and also asserts an sh signal. Furthermore, the scache $S_3$ issues the FAI command onto the cache-bus C3.

<7> When, for example, EXC of the fcache $F_{34}$ hits the FAI command, the fcache $F_{34}$ supplies corresponding data onto the cache-bus C3 as a reply to <6>, and its status is updated to INV.

<8> The scache $S_3$ loads the data on the cache-bus, and supplies the data onto the memory-bus as a reply to <5>. The status of the scache is updated from EMD to INV.

<9> The scache $S_1$ loads the data on the memory-bus, and supplies this data onto the cache-bus as a reply to <3>. The status of the scache is updated from INV to EMD.

<10> The fcache $F_{11}$ loads the data on the cache-bus, and its status is updated from INV to EXC.

<11> The fcache $F_{11}$ executes write access of the loaded data, and sends back an ack signal to the processor $P_{11}$, thus ending its processing.

FIG. 13N is a diagram showing a seventh write operation [write example 7], and this operation is executed as follows.

<1> A write request is issued from the processor $P_{11}$ to the fcache $F_{11}$.

<2> When UNO of the fcache $F_{11}$ hits the request,

<3> the fcache $F_{11}$ issues the WFI command onto the cache-bus C1.

<4> When, for example, the fcache $F_{14}$ hits the WFI command, the status of this fcache is updated from NON to INV. The fcache $F_{14}$ sends back an ack signal onto the cache-bus C1 as a reply to <3>.

<5> The fcache $F_{11}$ receives this ack signal, and its status is updated from UNO to EXC.

<6> The fcache $F_{11}$ executes write access, and sends back an ack signal to the processor $P_{11}$, thus ending its operation.

Finally, FIG. 13O is a diagram showing a write operation [write example 8], and this operation is executed as follows.

<1> A write request is issued from the processor $P_{11}$ to the fcache $F_{11}$.

<2> When UNO of the fcache $F_{11}$ hits the request, the fcache $F_{11}$ issues the WFI command onto the cache-bus C1.

<3> When SC of the scache $S_1$ hits the WFI command, the scache $S_1$ issues the WFI command onto the memory-bus $B_1$.

<4> When, for example, SM of the scache $S_3$ hits the WFI command, the scache $S_3$ issues the WFI command onto the cache-bus C3.

<5> When, for example, UNO of the fcache $F_{34}$ hits the WFI command, the status of the fcache $F_{34}$ is updated to INV. The fcache $F_{34}$ sends back an ack signal onto the cache-bus C3 as a reply to the command of <4>.

<6> Upon reception of the ack signal, the scache $S_3$ updates its status from SM to INV, and sends back an ack signal onto the memory-bus B1 as a reply to <3>.

<7> In response to the ack signal, the status of the scache $S_1$ is updated from SC to EMD, and the scache $S_1$ sends back an ack signal onto the cache-bus C1 as a reply to <2>.

<8> The status of the fcache $F_{11}$ is updated from UNO to EXC.

<9> The fcache $F_{11}$ executes write access, and sends back an ack signal to the processor $P_{11}$, thus ending its operation.

As described above, since the scache can take six statuses not only in read operations but also in write operations, the cache operation can be more efficiently realized by operations slightly different from those in the first and second embodiments described above.

When the scache is set up with six statuses to control the cache operation, instruction cache memories may be provided as in the above embodiment. A modification of the apparatus to be made in this case in the above embodiment will be described below.

In this case, replies of the scache to the IFC command on the memory-bus are modified as follows.

(a-1) When EMD hits a command; A cache signal is asserted to inhibit the memory from replying. Since this scache has a content different from that of an fcache thereabove, it issues the FWI command onto the cache-bus to cause data in this entry to coincide with that of the fcache. Thereafter, the scache supplies the data onto the memory-bus to reply to the IFC command. The status of the scache is updated to EMS, and the scache sends back an ack signal.

(a-2) When SM, EMS, or EC hits a command; In this case, a cache signal is asserted to inhibit the memory from replying. Thereafter, the scache supplies data onto the memory-bus to reply to the IFC command. In this case, the status of the scache is left unchanged, and the scache sends back an ack signal.

(a-3) When SC hits a command; In this case, no reply is made to a command, and only an ack signal is sent back.

(b) When an scache misses a command; In this case, no reply is made to a command, and only an ack signal is sent back.

Detailed operations when the command cache memories are independently arranged, as described above will be described below with reference to FIGS. 14A to 14D.

FIG. 14A is a diagram showing a first fetch operation [fetch example 1], and this operation is executed as follows.

<1> A fetch request is issued from the processor $P_{11}$.

<2> When the i-fcache $IF_{11}$ misses the request,

<3> the i-fcache $IF_{11}$ issues the IFC command onto the cache-bus C1.

<4> When the fcache $DF_{11}$ in the same cache hits the IFC command, the fcache $DF_{11}$ asserts a cache signal.

<5> The fcache $DF_{11}$ supplies corresponding data

<6> With this reply, this data is loaded by the i-fcache $IF_{11}$, and is written in the entry. The status of the i-fcache is updated to V.

<7> The i-fcache $IF_{11}$ supplies this data to the processor $P_{11}$, thus ending its operation.

FIG. 14B is a diagram showing a second fetch operation [fetch example 2], and this operation is executed as follows.

<1> The processor $P_{11}$ issues a fetch request.

<2> The i-fcache $IF_{11}$ hits the request.

<3> In this case, the i-fcache $IF_{11}$ directly supplies corresponding data to the processor $P_{11}$, thus ending its operation.

Figure 14C:
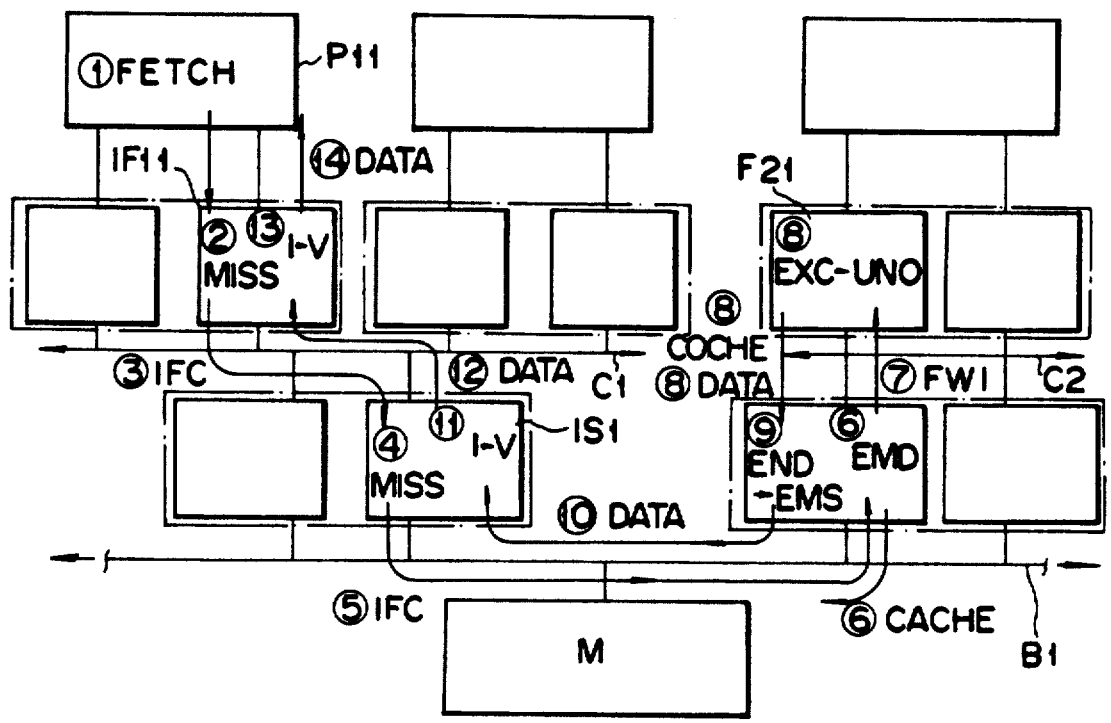

FIG. 14C is a diagram showing a third fetch operation [fetch example 3] wherein the i-fcache misses the request in [fetch example 2] described above, and this operation is executed as follows.

<1> The processor $P_{11}$ issues a fetch request.

<2> When the i-fcache $IF_{11}$ misses the request,

<3> the i-fcache $IF_{11}$ issues the IFC command onto the cache-bus C1.

<4> When the i-scache $IS_1$ misses the IFC command,

<5> the i-scache $IS_1$ issues the IFC command onto the memory-bus B1.

<6> When, for example, EMD of the scache $S_2$ hits the IFC command, the scache $S_2$ asserts a cache signal on the memory-bus B1.

<7> The scache $S_2$ issues the FWI command onto the cache-bus B2.

<8> Upon reception this FWI command, when, for example, EXC of the fcache $F_{21}$ hits the command, the fcache $F_{21}$ supplies corresponding data onto the cache-bus C2 as a reply to <7>. The fcache $F_{21}$ asserts a cache signal on the cache-bus C2, and its status is updated to UNO.

<9> The scache $S_2$ loads this data on the cache-bus C2, and its status is updated to EMS.

<10> Furthermore, the scache $S_2$) supplies this data onto the memory-bus B1 as a reply to <5>.

<11> The i-scache $IS_1$ loads this data from the memory-bus B1, and writes it in its entry. The status of the i-scache is updated to V.

<12> In this state, the i-scache $IS_1$ supplies this data onto the cache-bus C1 as a reply to <3>.

<13> The i-fcache $IF_{11}$ loads this data on the cache-bus C1, and writes it in its entry. The status of the i-fcache is updated to V.

<14> The i-fcache $IF_{11}$ supplies this data to the processor $P_{11}$, thus ending its operation.

Figure 14D:
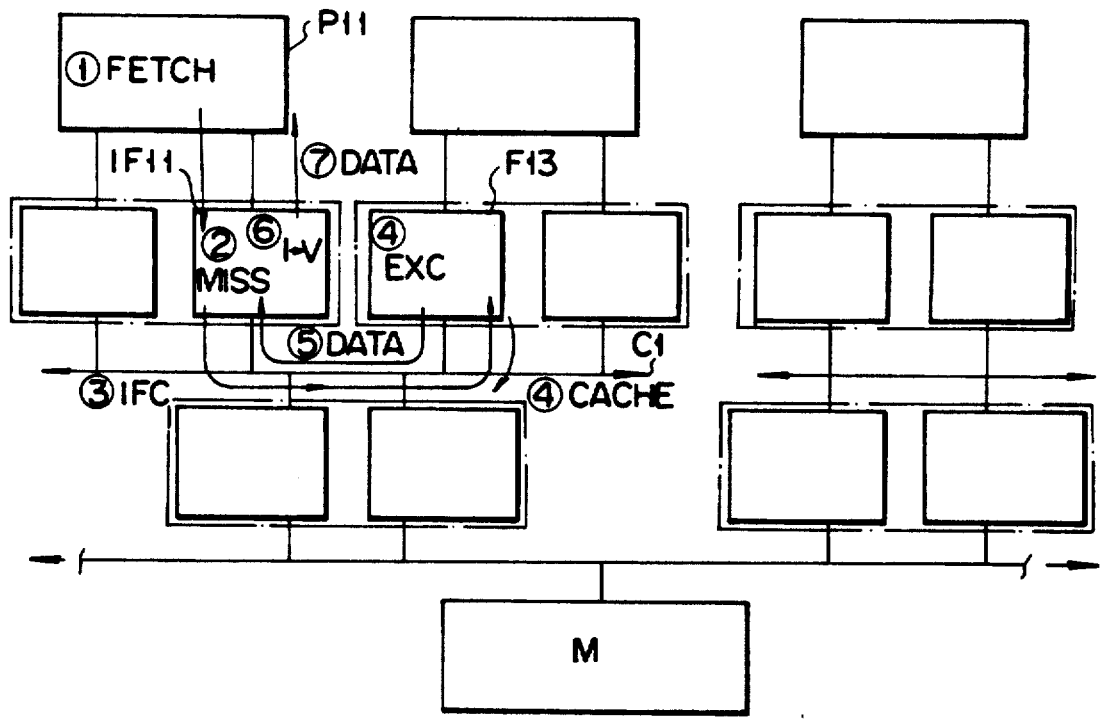

FIG. 14D shows a fourth fetch operation [fetch example 4] wherein the i-fcache misses the request in the same manner as in [fetch example 3], and this operation is executed as follows.

<1> The processor $P_{11}$ issues a fetch request.

<2> When the i-fcache $IF_{11}$ misses the request,

<3> the i-fcache $IF_{11}$ issues the IFC command onto the cache-bus C1.

<4> When another cache memory, e.g., EXC of the fcache $F_{13}$ hits the IFC command, the fcache $F_{13}$ asserts a cache signal.

<5> The fcache $F_{13}$ supplies corresponding data onto the cache-bus C1 as a reply to <3>.

<6> On the other hand, the i-fcache $IF_{11}$ loads this data from the cache-bus, and writes it in its entry. The status of the i-fcache is updated to V.

<7> The i-fcache $IF_{11}$ supplies this data to the processor $P_{11}$, thus ending the fetch operation.

With the above-mentioned fetch operation, efficient cache processing is assured as in the operations of the above embodiments.

The present invention is not limited to the above embodiments. For example, the number of fcaches connected to a cache-bus, and the number of cache-buses may be determined according to specifications. More specifically, the number of mini-cluster devices is not particularly limited, and the number of caches belonging to each mini-cluster device is not particularly limited. Furthermore, a hierarchical cache memory apparatus may be constituted by combining caches with independent instruction caches and caches without instruction caches. In this case, processing control may be appropriately switched using information indicating whether or not the cache includes an independent instruction cache.

Various other changes and modifications may be made within the spirit and scope of the invention.

As described above, according to the present invention, cache memories are arranged to constitute a hierarchical structure, and processing sequences according to statuses of these cache memories are executed between first cache memories arranged in correspondence with processors and second cache memories arranged in correspondence with mini-cluster devices each connecting a predetermined number of first cache memories, thus achieving efficient high-speed data access. In addition, consistency can be effectively assured among hierarchical cache memories, and the hierarchical cache memory apparatus can be assembled in a multiprocessor system. As compared to a conventional cache memory apparatus, processing sequences can be facilitated, and a processing speed can be increased, thus providing great practical advantages.

What is claimed is:

1. A hierarchical cache memory apparatus assembled in a multiprocessor computer system including a plurality of processors and a memory device comprising:

a plurality of first cache memory means comprised of independent data and instruction cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means comprised of independent data and second instruction cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means and wherein each of said independent data cache memory means of said first cache memory means and each of said independent data cache memory means, of said second cache memory means, respectively comprise first and second data cache status identification means each for identifying, in units of address information, whether or not address information is valid, the corresponding independent data cache memory means of said first or second cache memory means has an ownership, and the corresponding independent data cache memory means of said first or second cache memory means exclusively has address information;

each of said instruction cache memory means, of said first cache memory means, and each of said instruction cache memory means, of said second cache memory means, respectively comprise first and second instruction cache status identification means each for identifying, in units of address information, whether or not address information is valid; and said apparatus further comprising:

first instruction supply means for, when address information equal to an address from which a instruction is read out by a given processor is present in a instruction cache memory means in one of said first cache memory means and the instruction cache status identification means corresponding to the address information is in a valid state, causing said one instruction cache memory means, of said first cache memory means, to supply instruction information in response to a instruction fetch request from said given processor;

second means for, when address information equal to the address from which the instruction is read out from said given processor is not present in said one instruction cache memory means, of said first cache memory means, or when the instruction cache status identification means of a first cache memory means corresponding to address information equal to the address of said one instruction cache memory means, of said first cache memory means, is in an invalid state, causing one instruction cache memory means, of said first cache memory means, to issue a instruction fetch request onto one first connection means in response to the instruction fetch request from said given processor;

second instruction supply means for causing another first cache memory means connected to said one first connection means or another data cache memory means, of said first cache memory means, in said another first cache memory means, which has address information equal to the requested address, includes the valid data cache status identification means corresponding to the address information, and has an ownership, to supply instruction information corresponding to the address information;

third inter-first-cache transfer identification means for identifying that instruction information is supplied from said another cache memory means, of said first cache memory means, or said another data cache memory means, of said first cache memory means, included in said another first cache memory means which is caused by said second instruction supply means to supply the instruction information to said one instruction cache memory means, of said one first cache memory means, which is subjected to read access by said given processor;

instruction fetch replying means for, when said third inter-first-cache transfer identification means identifies that instruction information is not transferred between the first cache memory means, causing one instruction cache memory means, in one second cache memory means, connected to said one first cache memory means read by said given processor through one first connection means to reply to the instruction fetch request;

third instruction supply means for, when address information equal to the address in the instruction fetch request is present in said one instruction cache memory means of said second cache memory means which replied to the instruction fetch request and the second instruction cache status identification means corresponding to the address information is in a valid state, causing said one instruction cache memory means of said second cache memory means to supply instruction information corresponding to the address information;

third means for, when address information equal to the address in the instruction fetch request is not present in said one second cache memory means which replied to the command read request, or when the second instruction cache status identification means in said one instruction cache memory means, of said second cache memory means, corresponding to the address information equal to the address is in an invalid state, causing said one instruction cache memory means, of said second cache memory means, to issue a instruction fetch request onto said second connection means;

fourth instruction supply means for causing another second cache memory means or another independent data cache memory means, of said second cache memory means, in another second cache memory means, which has address information equal to the address in the instruction fetch request, includes the valid second data cache status identification means corresponding to the address information, and has an ownership, to supply instruction information corresponding to the address information to said one instruction cache memory means which issued the instruction fetch read request in response to the instruction fetch request on said second connection means;

third inter-second-cache transfer identification means for identifying that said another second cache memory means or said another independent data cache memory means, of said second cache memory means, included in said another second cache memory means which is caused by said fourth instruction supply means to supply the instruction information supplies instruction; and means for, when said third inter-second-cache transfer identification means identifies that instruction information is not transferred between the second cache memory means or the independent data cache memory means, of said second cache memory means, causing said memory means to reply to the instruction fetch request.

2. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information, and further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request;

wherein said first status identification mans arranged in each of said first cache memory means comprises first ownership identification means which, when address information corresponding to given first status identification means is valid, has a function of identifying whether or not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership or writing back data associated with the address information to said memory means;

first ownership state setting means for setting, in an ownership state, the first status identification means corresponding to address information subjected to write access in given first cache memory means in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

wherein each of said first status identification means further comprises first exclusive state identification means for, when the given first status identification means is valid and has an ownership, identifying whether or not only corresponding first cache memory means and one second cache memory means connected to said corresponding first cache memory means through one first connection means in all said first cache memory means and all said second cache memory means exclusively have address information associated with data written by a corresponding processor;

each of said second status identification means further comprises second exclusive state identification means for, among all said second cache memory means, when address information corresponding to the given second status identification means is valid and has an ownership, identifying whether or not only corresponding second cache memory means exclusively has address information associated with data written by said corresponding processor;

first exclusive state setting means for setting, in an exclusive state, the first status identification means corresponding to the address information of said given first cache memory means in which information is written by said corresponding processor; and second exclusive state setting means for setting, in an exclusive state, the second status identification means corresponding to address information equal to an address at which data is written by said corresponding processor in said one second cache memory means connected to said corresponding first cache means set in the exclusive state through said one first connection means.

3. A hierarchical cache memory apparatus assembled in a multiprocessor computer system including a plurality of processors and a memory device comprising:

a plurality of first cache memory arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information;

further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request; and wherein said first status identification means arranged in each of said first cache memory means comprises first ownership identification means which, when address information corresponding to given first status identification means is valid, has a function of identifying whether of not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership of writing back data associated with the address information to said memory means;

first ownership state setting means for setting, in an ownership state, the first status identification means corresponding to address information subjected to write access in given first cache memory means in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

wherein each of said first status identification means further comprises first exclusive state identification means for, when the given first status identification means is valid land has an ownership, identifying whether or not only corresponding first cache memory means and one second cache memory means connected to said corresponding first cache memory means through one first connection means in all said first cache memory means and all said second cache memory means exclusively have address information associated with data written by a corresponding processor;

each of said second status identification means further comprises second exclusive state identification means for, among all said second cache memory means, when address information corresponding to the given second status identification means is valid and has an ownership, identifying whether or not only corresponding second cache memory means exclusively has address information associated with data written by said corresponding processor;

first exclusive state setting means for setting, in an exclusive state, the first status identification means corresponding to the address information of said given first cache memory means in which information is written by said corresponding processor;

second exclusive state setting means for setting, in an exclusive state, the second status identification means corresponding to address information equal to an address at which data is written by said corresponding processor in said one second cache memory means connected to said corresponding first cache memory means set in the exclusive state through said one first connection means;

first means for, when the first status identification means corresponding to given address information which is replaced to assure an area for storing another address information has an ownership, and data information corresponding to the given address information is written back to the corresponding second memory means, canceling an exclusive state of the second status identification means corresponding to the given address information of said corresponding second cache memory means; and means for, when the second status identification means corresponding to address information equal to an address in a shared read request on the corresponding first connection means is in a valid state, has an ownership, and is in an exclusive state, inhibiting a reply to the shared read request without using said first inter-first-cache transfer identification means.

4. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information;

further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address, information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request;

wherein said first status identification means arranged in each of said first cache memory means comprises first ownership identification means which, when address information corresponding to given first status identification means is valid, has a function of identifying whether or not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership or writing back data associated with the address information to said memory means;

first ownership state setting means for setting, in an ownership state, the first status identification means corresponding to address information subjected to write access in given first cache memory means in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

first shared read request issuing means for, when address information equal to an address from which data is read out by a given processor is not present in one first cache memory means corresponding to said given processor, or when the first status identification means corresponding to the address information equal tot he read address is in an invalid state, causing said one first cache memory means to issue and share read requests, onto one first connection means;

first data supply means for causing another first cache memory means, which is connected to said one first connection means, has address information equal to an address in the shared read request, includes the valid first status identification means corresponding to the address information, and has an ownership, to supply data information corresponding to the address information to said one first cache memory means which issued the shared read request in order to reply to the shared read request on said one first connection means;

first inter-first-cache transfer identification means for identifying that data information is transferred between the plurality of first cache memory by said first data supply means;

means for, when said first inter-first-cache transfer identification means identifies that data information is not transferred between the first cache memory means, causing one second cache memory means connected to said one first cache memory means which issued the shared read request through said one connection means to reply to the shared read request;

second data supply means for, when address information equal to the read address is present in said one second cache memory means which replied to the shared read request and the second status identification means corresponding to the address information is in a valid state, causing said one second cache memory means to supply data information corresponding to the address information to said one first cache memory means which issued the shared read request;

second shared read request issuing means for, when address information equal to the read address is not present in said one second cache memory means which replied to the shared read request, or when the second status identification means corresponding to the address information equal tot he read address is in an invalid state, causing said one second cache memory means to issue a shared read request onto said second connection means;

third data supply means for causing another second cache memory means, which is connected to said second connection means, has address information equal to an address in the shared read request, includes the valid second status identification means corresponding to the address information, and has an ownership, to supply data information corresponding to the address information to said one second cache memory means which issued the shared read request in order to reply to the shared read request on said second connection means;

first inter-second-cache transfer identification means for identifying that said third data supply means transfers data information between the plurality of second cache memory means; and identification replying means for, when said first inter-second-cache transfer identification means identifies that no data information is transferred between the second cache memory means, causing said memory means to reply to the shared read request.

5. An apparatus according to claim 4, further comprising:

first shared read request issuing means for, when address information equal to an address from which data is read out by a given processor is not present in one first cache memory means corresponding to said given processor, or when the first status identification means corresponding to the address information equal to the read address is in an invalid state, causing said one first cache memory means to issue a shared read request onto one first connection means;

first data supply means for causing another first cache memory means, which is connected to said one first connection means, has address information equal to an address in the shared read request, includes the valid first status identification means corresponding to the address information, and has an ownership, to supply data information corresponding to the address information to said one first cache memory means which issued the shared read request in order to reply to the shared read request on said one first connection means;

first inter-first-cache transfer identification means for identifying that data information is transferred between the plurality of first cache memory means by said first data supply means;

means for, when said first inter-first-cache transfer identification means identifies that data information is not transferred between the first cache memory means, causing one second cache memory means connected to said one first cache memory means which issued the shared read request through said one connection means to reply to the shared read request;

second data supply means for, when address information equal to the read address is present in said one second cache memory means which replied to the shared read request and the second status identification means corresponding to the address information is in a valid state, causing said one second cache memory means to supply data information corresponding to the address information to said one first cache memory means which issued the shared read request;

second shared read request issuing means for, when address information equal to the read address is not present in said one second cache memory means which replied to the shared read request, or when the second status identification means corresponding to the address information equal to the read address is in an invalid state, causing said one second cache memory means to issue a shared read request onto said second connection means;

third data supply means for causing another second cache memory means, which is connected to said second connection means, has address information equal to an address in the shared read request, includes the valid second status identification means corresponding to the address information, and has an ownership, to supply data information corresponding to the address information to said one second cache memory means which issued the shared read request in order to reply to the shared read request on said second connection means;

first inter-second-cache transfer identification means for identifying that said third data supply means transfers data information between the plurality of second cache memory means; and identification replying means for, when said first inter-second-cache transfer identification means identifies that no data information is transferred between the second cache memory means, causing said memory means to reply to the shared read request.

6. An apparatus according to claim 5, further comprising first exclusive state canceling means for, when the first status identification means corresponding to address information equal to the address in the shared read request is valid, has an ownership, and in an exclusive state in said another first cache memory means which supplies data information in response to the shared read request on said one first connection means, canceling the exclusive state of the first status identification means upon supply of the data information.

7. An apparatus according to claim 5, further comprising:

second exclusive state canceling means for, when the second status identification means corresponding to address information equal to the address in the shared read request is in a valid state, has an ownership, and is in an exclusive state in said another second cache memory means which supplies the data information in response to the shared read request on said second connection means canceling the exclusive state of the second status identification means upon supply of the data information;

data delivery request issuing means for causing said one second cache memory means which receives the data information in response to the shared read request to issue a delivery request of data information to said one first cache memory means connected to said one second cache memory means through said one first connection means;

fourth data supply means for supplying the data information corresponding to the address information to given first cache memory means which has address information equal to an address in the delivery request, includes the valid first status identification means corresponding to the address information, and has an ownership; and ownership state canceling means for canceling the ownership state of the first status identification means corresponding to the address information in said given first cache memory means which supplies the data information in response to the delivery request.

8. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information;

further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connection to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request;

wherein said first status identification means arranged in each of said first cache memory means comprises first ownership identification means which, when address information corresponding to given first status identification means is valid, has a function of identifying whether or not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership of writing back data associated with the address information to said memory means;

first ownership state setting means for setting, in an ownership state, the first status identification means corresponding to address information subjected to write access in given first cache memory in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

wherein each of said first status identification means further comprises first exclusive state identification means for, when the given first status identification means is valid land has an ownership, identifying whether or not only corresponding first cache memory means and one second cache memory means means connected to said corresponding first cache memory means through one first connection means in all said first cache memory means and all said second cache memory means exclusively have address information associated with data written by a corresponding processor;

each of said second status identification means further comprises second exclusive state identification means for, among all said second cache memory means, when address information corresponding to the given second status identification means is valid and has an ownership, identifying whether or not only corresponding second cache memory means exclusively has address information associated with data written by said corresponding processor;

first exclusive state setting means for setting, in an exclusive state, the first status identification means corresponding to the address information of said given first cache memory means in which information is written by said corresponding processor;

second exclusive state setting means for setting, in an exclusive state, the second status identification means corresponding to address information equal to an address at which data is written by said corresponding processor in said one second cache memory means connected to said corresponding first cache memory means set in the exclusive state through said one first connection means; and first exclusive state canceling means for, when the first status identification means corresponding to address information equal to the address in the shared read request is valid, has an ownership, and in an exclusive state in said another first cache memory means which supplies data information in response to the shared read request on said one first connection means, canceling the exclusive state of the first status identification means upon supply of the data information.

9. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses or a plurality of pieces of address information of said plurality of second cache memory means;

wherein each of said plurality of first cache memory means and each of said plurality f second cache memory means respectively comprise first and second status identification means for identifying status of pieces of address information in units of the plurality of address information;

further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification mans is invalidated, and setting, in an invalid state, the first status identification means, corresponding to address information equal to the address in the invalidation request on said another first connection means, in address information present in the first cache memory means connected to said another first connection means which received the invalidation request;

wherein said first status identification means arranged in each of said first cache memory means comprises first ownership identification means which, when address information corresponding to given first status identification means is valid, has a function of identifying whether or not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership of writing back data associated with the address information to said memory means;

first ownership state setting means for setting, in an ownership state, the first status identification means corresponding to address information subjected to write access in given first cache memory means in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

means for, when address information equal to an address at which data is written by a given processor is not present in one first cache memory means corresponding to said given processor, or when the first identification means corresponding to the address information equal to the address is in an invalid state, issuing an exclusive read request onto one first connection means connected to said one first cache memory means;

fifth data supply means for causing another first cache memory means, which is connected to said one connection means, has address information equal to an address in the exclusive read request, includes the valid first status identification means corresponding to the address information, and has an ownership, to supply data information corresponding to the address information to said one first cache memory means in order to reply to the exclusive read request on said one first connection means;

second inter-first-cache transfer identification means for identifying that data information is transferred between the first cache memory mean by said fifth data supply means;

first means for setting, in an invalid state, the first status identification means corresponding to the address information in other first cache memory means which are connected to said one first connection means and include the valid first status identification means corresponding to the address information equal to the address in the exclusive read request in response to the exclusive read request on said one first connection means;

means for, when said second inter-first-cache transfer identification means identifies that data information is not transferred between the first cache memory means, causing one second cache memory means connected to said one first cache memory means which issued the exclusive read request through said one first connection means to reply to the exclusive read request;

sixth data supply means for, when address information equal to the address in the exclusive read request is present in said one second cache memory means which replied to the exclusive read request, and the second status identification means corresponding to the address information is in a valid state, causing said one second cache memory means to supply data information corresponding to the address information to said one first cache memory which issued the exclusive read request;

means for causing said one second cache memory means, which is caused by said sixth data supply means to supply the data information, to issue an invalidation request onto said second connection means;

means for, when address information equal to the address of the exclusive read request is not present in said one second cache memory means which replied to the exclusive read request, or when the second status identification means corresponding to the address information equal to the address is in an invalid state, causing said one second cache memory means to issue an exclusive read request onto said second connection means;

seventh data supply means for causing another second cache memory means, which is connected to said second connection means, has address information equal to an address in the exclusive read request, includes the valid second status identification means corresponding to the address information, and has an ownership, to supply data information corresponding to the data information to said one second cache memory means which issued the exclusive read request in response to the exclusive read request on said second connection means;

second inter-second-cache transfer identification means for identifying that data information is transferred between the second cache memory means in response to the exclusive read request on said second connection means;

means for setting, in an invalid state, the second status identification mean corresponding to the address information in other second cache memory means, which are connected to said second connection means and include the valid second status identification means corresponding to the address information equal to the address in the exclusive read request, in response to the exclusive read request;

means for causing said other second cache memory means invalidated by said means to issue invalidation requests onto the corresponding first connection means connected to said other second cache memory means, respectively; and means for, when said second inter-second-cache transfer identification means identifies that data information is not transferred between the second cache memory means in response to the exclusive read request, causing said memory means to reply to the exclusive read request.

10. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information;

further wherein each of said first and second status identification means comprises a controller indicating whether corresponding address information is valid or invalid, and said apparatus further comprises:

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in n invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request;

wherein said first status identification means arranged in each of said first cache memory means comprises first ownership identification means which, when address information corresponding to given first status identification means is valid, has a function of identifying whether or not the given first status identification means has an ownership of writing back data associated with the address information to the corresponding second cache memory means;

said second status identification means arranged in each of said second cache memory means comprises second ownership identification means which, when address information corresponding to given second status identification means is valid, has a function of identifying whether or not the given second status identification means has an ownership of writing back data associated with the address information to said memory means;

first ownership state setting means for setting, in an ownership state, the first status identification means corresponding to address information subjected to write access in given first cache memory means in which information is written by a corresponding processor;

second ownership state setting means for setting, in an ownership state, the second status identification means corresponding to address information equal to an address written by said corresponding processor in given second cache memory means connected to said given first cache memory means which is set in the ownership state;

wherein each of said first status identification means further comprises first exclusive state identification means for, when the given first status identification means is valid land has an ownership, identifying whether or not only corresponding first cache memory means and one second cache memory means connected to said corresponding first cache memory means through one first connection means in all said first cache memory means and all said second cache memory means exclusively have address information associated with data written by a corresponding processor;

each of said second status identification means further comprises second exclusive state identification means for, among all said second cache memory means, when address information corresponding to the given second status identification means is valid and has an ownership, identifying whether or not only corresponding second cache memory means exclusively has address information associated with data written by said corresponding processor;

first exclusive state setting means for setting, in an exclusive state, the first status identification means corresponding to the address information of said given first cache memory means in which information is written by said corresponding processor;

second exclusive state setting means for setting, in an exclusive state, the second status identification means corresponding to address information equal to an address at which data is written by said corresponding processor in said one second cache memory means connected to said corresponding first cache memory means set in the exclusive state through said one first connection means;

means for, when address information indicted by the second status identification means has an ownership and is in an exclusive state, identifying whether or not data information associated with the address information is different from corresponding data information in one first cache memory means connected through the corresponding first connection means; and means for setting the second status identification means, corresponding to address information equal to an address, written by the given processor, of the address information present in the given second cache memory means which is connected to the given first cache memory means subjected to write access by said given processor through the corresponding first connection means, to have an exclusively different state having an ownership.

11. An apparatus according to claim 5, wherein each of said second cache memory means comprises:

first means for, when the first status identification means corresponding to given address information which is replaced to assure an area for storing another address information has an ownership, and data information corresponding to the given address information is written back to the corresponding second memory means, canceling an exclusive state of the second status identification means corresponding to the given address information of said corresponding second cache memory means; and means for, when the second status identification means corresponding to address information equal to an address in a shared read request on the corresponding first connection means is in a valid state, has an ownership, and is in an exclusive state, inhibiting a reply to the shared read request without using said first inter-first-cache transfer identification means.

12. An apparatus according to claim 9, further comprising:

means for, when another second cache memory means, which has address information equal to an address in the exclusive read request on said second connection means, includes the valid second status identification means corresponding to the address information, has an ownership, and is in an exclusive state, replies to the exclusive read request, causing the second cache memory means which supplies data information to issue an invalidation delivery request to the first cache memory means connected to the second cache memory means through the first connection means;

eighth data supply means for causing given first cache memory means, which has address information equal to an address in the invalidation delivery request, includes the valid first status identification means corresponding to the address information, and has an ownership, to supply data information requested by the invalidation delivery request; and means for setting, in an invalid state, the first status identification means corresponding to the address information of said given first cache memory means having the address information equal to the address in the invalidation delivery request.

13. An apparatus according to claim 12, further comprising:

first control means for, when address information equal to an address which is read, modified, and written by a given processor is present in one first cache memory means corresponding to said given processor, and the first status identification means corresponding to the address information is in a valid state, causing said one first cache memory means to issue an invalidation request onto the corresponding first connection means, supply data information of the address requested by said given processor to said given processor, and write the data information in said one first cache memory means after the data information is modified by said given processor; and second control means for, when address information equal to the address which is read, modified, and written by said given processor is not present in said one first cache memory means, or when the first status identification means corresponding to the address information equal to the address is in an invalid state, causing said one first cache memory means to issue an exclusive read request onto the corresponding first connection means to obtain data information requested by said given processor from another first cache memory means or the second cache memory means, to supply data to said given processor, and to write the data information in said one first cache memory means after the data information is modified by said given processor.

14. An apparatus according to claim 13, further comprising means, for when address information equal to an address subjected to read-modify-write access by a given processor is present in one first cache memory means corresponding to said given processor and the first status identification means corresponding to the address information is in a valid state, has an ownership, and is in an exclusive state, supplying data information corresponding to the address information to said given processor, writing the data information modified by said given processor in said one first cache memory means, maintaining the status of the first status identification means, and inhibiting means of issuing an invalidation request to thirst connection means.

15. An apparatus according to claim 9, wherein each of said second cache memory means comprises:

second means for, when the first status identification means corresponding to given address information which is replaced to assure an area for storing another address information has an ownership, and data information corresponding to the given address information is written back to the corresponding second memory means, canceling an exclusive state of the second status identification means corresponding to the given address information of said corresponding second cache memory means; and means for, when the second status identification means corresponding to address information equal to an address in an exclusive read request on the corresponding first connection means is in a valid state, has an ownership, and is in an exclusive state, inhibiting a reply to the exclusive read request without using said first inter-first-cache transfer identification means.

16. An apparatus according to claim 9 or 10, wherein each of said second cache memory means comprises:

means for, when the first status identification means corresponding to given address information which is replaced to assure an area for storing another address information is in a valid state and has an ownership, and data information corresponding to the given address information is written back to the corresponding second memory means, canceling a different state of the second status identification means corresponding to the given address information of said corresponding second cache memory means; and means for, when the second status identification means corresponding to address information equal to an address in an exclusive read request on the corresponding first connection means is in a valid state, has an ownership, is in an exclusive state, and is in a different state, inhibiting a reply to the exclusive read request without using said first inter-first-cache transfer identification means.

17. An apparatus according to claim 9 or 10, further comprising means for, when the given second cache memory means replies to an exclusive read request on said second connection means, the second status identification means, corresponding to the address information, of said given second cache memory means is set in an invalid state and is in a missed state, issuing an invalidation delivery request to the corresponding first cache memory means connected to said given second cache memory means through the corresponding first cache memory means.

18. An apparatus according to claim 9 or 10, further comprising means for, when the second status identification means corresponding to address information equal to a write address of the given processor is in an exclusive state in the second cache memory means connected to the corresponding first cache memory means subjected to write access by said given processor through the corresponding first connection means, inhibiting a invalidation request on said corresponding first connection means from being transmitted to said second connection means.

19. An apparatus according to claim 9 or 10, further comprising means for, when the second status identification means corresponding to address information equal to a write address of the given processor is in an exclusive state in the second cache memory means connected to the corresponding first cache memory means subjected to write access by said given processor through the corresponding first connection means, inhibiting an invalidation request by an exclusive read request on said corresponding first connection means from being transmitted to said second connection means in order to assure consistency of data.

20. An apparatus according to claim 10, further second cache memory shared state identification means for identifying, in response to a shared read request on said second connection means, that in other second cache memory means connected to said second connection means includes the second cache memory means, in each of which the second status identification means corresponding to address information equal to an address in a shared read request is in a valid state;

means for, when said second cache memory shared state identification means identifies that another second cache memory means has the valid address information, setting the status of the second status identification means, corresponding to the address information, of said another second cache memory means which issued the shared read request in a valid and shared state having no ownership; and means for, when said second cache memory shared state identification means identifies that other second cache memory means do not have the valid address information, setting the statuses of the second status identification means, corresponding to the address information, of said another second cache memory means which issued the shared read request in a valid and exclusive state having no ownership.

21. An apparatus according to claim 5 or 20, further comprising:

ninth data supply means for, when the second cache memory means in which status of the second status identification means corresponding to address information equal to an address in a shared read request is valid, has an ownership, is in an exclusive state, and is in a different state issues a delivery request to the first cache memory means above the second cache means in response to the shared read request on said second connection means, causing the first cache memory means, which has address information equal to an address in the delivery request, includes the valid first status identification means corresponding to the address information, and has an ownership, to supply data information corresponding to the address information requested by the delivery request;

means for canceling the ownership state of the first status identification means, corresponding to the address information, of the first cache memory means which supplied the data information in response to the delivery request; and means for canceling the different state of the second status identification means, corresponding to the address information, of the second cache memory means which issued the delivery request after a delivery operation is completed.

22. An apparatus according to claim 5 or 20, wherein each of said second cache memory means comprises:

means for, when the first status identification means corresponding to given address information which is replaced to assure an area for storing another address information has an ownership, and data information corresponding to the given address information is written back to the corresponding second memory means, canceling a different state of the second status identification mean corresponding to the given address information of said corresponding second cache memory means; and means for, when the second status identification means corresponding to address information equal to an address in a shared read request on the corresponding first connection means is in a valied state, has an ownership, is in an exclusive state, and is in a different state, inhibiting a reply to the shared read request without using said first inter-first-cache transfer identification means.

23. A hierarchical cache memory apparatus assembled in a multiprocessor computer system including a plurality of processors and a memory device comprising:

a plurality of first cache memory means arranged in correspondence with said plurality of processors;

a plurality of first connection means for connecting said plurality of first cache memory means in units of a predetermined number of first cache memory means to constitute a plurality of mini-cluster devices;

a plurality of second cache memory means respectively connected to said plurality of first connection means in correspondence with said mini-cluster devices, and each having all addresses of address information of the predetermined number of first cache memory means in each of said mini-cluster devices;

second connection means for connecting said second cache memory means to constitute a cluster device;

memory means connected to said second connection means and having all addresses of a plurality of pieces of address information of said plurality of second cache memory means;

wherein each of said plurality of first cache memory means and each of said plurality of second cache memory means respectively comprise first and second status identification means for identifying status of pieces of address information in units of the plurality of address information;

further wherein each of said first and second status identification means comprises a controller indicating whether corresponding address information is valid or invalid;

means for, when address information equal to an address at which information is written by a given processor is present in one first cache memory means corresponding to said given processor and the status of the first status identification means corresponding to the address information is valid, issuing an invalidation request onto one first connection means connected to said one first cache memory means;

first invalidation means for setting, in an invalid state, the first status identification means, corresponding to address information equal to an address in the invalidation request on said one first connection means, in address information present in another first cache memory means connected to said one first connection means;

second invalidation means for transmitting the invalidation request on said one first connection means to said second connection means through one second cache memory means, and setting, in an invalid state, the second status identification means, corresponding to address; information equal to the address in the invalidation request transmitted onto said second connection means, in address information present in another second cache memory means different from said one second cache memory means which transmitted the invalidation request;

third invalidation means for transmitting the invalidation request onto another first connection means connected to said another second cache memory means whose second status identification means is invalidated, and setting, in an invalid state, the first status identification means, corresponding to address information equal to the address in the invalidation request on said another first connection means, in address information present in the first cache memory means connected to said another first connection means which received the invalidation request; and first means for, when address information equal to an address written by a given processor is not present in given second cache memory means connected to a given mini-cluster device different from the mini-cluster device including the first cache memory means which is subjected to write access by said given processor, or when the second status identification means corresponding to address information equal to the address is in an invalid state, inhibiting an invalid request issued onto said second connection means upon the write access from being transmitted onto the first connection means to which said given second cache memory means is connected.

* * * * *